(12) United States Patent
Cho et al.

(10) Patent No.: US 8,572,656 B2
(45) Date of Patent: Oct. 29, 2013

(54) MOBILE TERMINAL AND METHOD OF CONTROLLING A BROADCAST OF THE MOBILE TERMINAL

(75) Inventors: Beom Seok Cho, Seoul (KR); Ki Hoa Nam, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 12/269,797

(22) Filed: Nov. 12, 2008

(65) Prior Publication Data

US 2009/0138912 A1    May 28, 2009

(30) Foreign Application Priority Data

Nov. 26, 2007    (KR) .................. 10-2007-0120830

(51) Int. Cl.
*H04N 5/445*    (2011.01)
*H04N 7/16*    (2011.01)

(52) U.S. Cl.
USPC ............. 725/47; 725/39; 725/44; 725/45; 725/46; 725/58; 725/136; 725/141; 348/553

(58) Field of Classification Search
USPC ........... 725/136, 141, 39, 44–47, 58; 348/553
See application file for complete search history.

(56) References Cited

U.S. PATENT DOCUMENTS

| | | | | |
|---|---|---|---|---|
| 5,539,822 | A * | 7/1996 | Lett | 380/211 |
| 6,209,131 | B1 * | 3/2001 | Kim et al. | 725/50 |
| 6,240,555 | B1 * | 5/2001 | Shoff et al. | 725/110 |
| 7,765,563 | B2 * | 7/2010 | Bauminger et al. | 725/9 |
| 7,890,987 | B2 * | 2/2011 | Freimann | 725/100 |
| 8,175,516 | B2 * | 5/2012 | Nakao et al. | 455/3.03 |
| 2001/0001160 | A1 | 5/2001 | Shoff et al. | |
| 2004/0158855 | A1 | 8/2004 | Gu et al. | |
| 2007/0157248 | A1 | 7/2007 | Ellis | |

FOREIGN PATENT DOCUMENTS

| | | |
|---|---|---|
| CN | 1520170 | 8/2004 |
| CN | 1878210 | 12/2006 |
| EP | 1768393 | 3/2007 |
| JP | 2004-104809 | 4/2004 |
| KR | 10-2007-0035327 | 3/2007 |
| KR | 10-2007-0043706 | 4/2007 |

OTHER PUBLICATIONS

European Patent Office Application Serial No. 08020305.2, Search Report dated Oct. 5, 2012.

* cited by examiner

*Primary Examiner* — Dominic D Saltarelli
(74) *Attorney, Agent, or Firm* — Lee, Hong, Degerman, Kang & Waimey

(57) ABSTRACT

A mobile terminal and a method for controlling a broadcast displays information on an interactive service associated with a broadcast program, the information provided prior to displaying the associated broadcast program. The present invention includes a wireless communication unit receiving interactive service information, an input unit selecting an interactive service using the received interactive service information, and a controller scheduling the execution of the selected interactive service.

27 Claims, 62 Drawing Sheets

FIG. 8B

|  | CH / Time | ABC | ... | CNN | Channel |
|---|---|---|---|---|---|
|  |  |  |  |  | Time |
| 810 | 5:00~ 6:00 | Program 1-1 ⓘ Voting | ... | Program 2-1 | Category |
|  |  |  |  |  | IS presence |
| 820 | 6:00~ 7:00 | Program 1-2 | ... | Program 2-2 ⓘ Quiz | IS type |
|  |  |  |  |  | Recent |
|  | ⋮ | ⋮ | ⋱ | ⋮ | Frequency |
|  |  |  |  |  | Preference |
|  | 11:00~ 12:00 | Program 1-K ⓘ Survey | ... | Program 2-K | Audience rating |

ABC

MOBILE TERMINAL AND METHOD OF CONTROLLING A BROADCAST OF THE MOBILE TERMINAL

Pursuant to 35 U.S.C. §119(a), this application claims the benefit of earlier filing date and right of priority to Korean Patent Application No. 10-2007-0120830, filed on Nov. 26, 2007, the contents of which are hereby incorporated by reference herein in its entirety.

FIELD OF THE INVENTION

The present invention relates to a terminal, and more particularly, to a mobile terminal and method for controlling a broadcast. Although the present invention is suitable for a wide scope of applications, it is particularly suitable for a terminal receiving and displaying a broadcast.

DESCRIPTION OF THE RELATED ART

A mobile terminal is a device which may be configured to perform various functions including data and voice communications, capturing images and video via a camera, recording audio, playing music files via a speaker system, and displaying images and video on a display. Some terminals include additional functionality supporting gaming, while other terminals are configured as multimedia players. More recently, mobile terminals have been configured to receive broadcast and multicast signals permitting content viewing such as videos and television programs.

Software and hardware improvements, as well as changes and improvements in the structural components forming the mobile terminal itself are ongoing to support and to increase the functionality of mobile terminals.

When an interactive service is associated with a currently displayed broadcast program, an indicator displayed on a screen indicates that the interactive service is available. An interactive service is a service enabling a mobile terminal to transmit data to an external server in association with the broadcast program.

However, according to the related art, the user is unable to obtain information whether the interactive service is associated with the broadcast program and information on the interconnected interactive service unless viewing the broadcast program.

Moreover, according to the related art, the user is unable to use the interactive service associated to the broadcast program unless viewing the broadcast program.

SUMMARY OF THE INVENTION

Accordingly, the present invention is directed to a mobile terminal and method of controlling a broadcast therein that substantially obviate one or more problems due to limitations and disadvantages of the related art. An object of the present invention is to provide a mobile terminal and method of controlling a broadcast in which information on an interactive service associated with a broadcast program can be provided with the broadcast program being displayed.

Another object of the present invention is to provide a mobile terminal and method of controlling a broadcast in which an operation of an interactive service associated with a broadcast program can be scheduled prior to displaying the associated broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a wireless communication unit for receiving interactive service information and broadcast information, an input unit for selecting an interactive service associated with a broadcast program using the received interactive service information, and a controller for scheduling an operation of the selected interactive service.

In another aspect of the present invention, a method of controlling a broadcast in a mobile terminal includes receiving interactive service information and broadcast information, selecting an interactive service associated with a broadcast program using the received interactive service information, and scheduling an operation of the selected interactive service.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

FIGS. 8A to 8E are diagrams of third images for displaying interactive service information in a mobile terminal according to one embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It is to be understood by those of ordinary skill in this technological field that other embodiments may be utilized, and structural, electrical, as well as procedural changes may be made without departing from the scope of the present invention.

Figure 1:
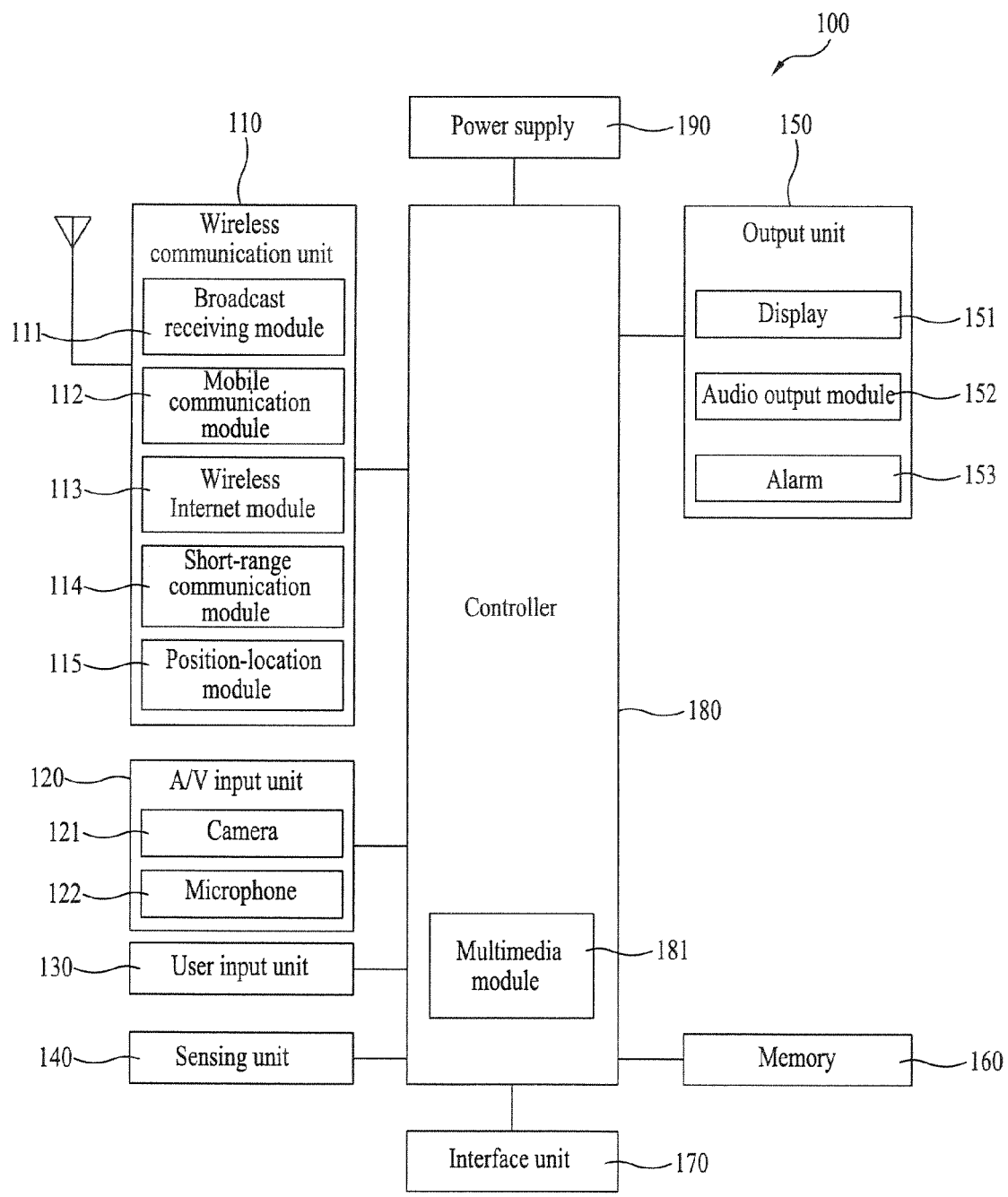
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals including mobile phones, user equipment, smart phones, computers, digital broadcast terminals, personal digital assistants, portable multimedia players (PMP), and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider. For instance, broadcast associated information may include an electronic program guide (EPG) of digital multimedia broadcasting (DMB) and electronic service guide (ESG) of the digital video broadcast-handheld (DVB-H).

The broadcast signal may be implemented as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By a nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). Receiving multicast signals is also possible. If desired, data received by the broadcast receiving module 111 may be stored in a suitable device, such as memory 160.

The mobile communication module 112 transmits/receives wireless signals to and from one or more network entities (e.g., base station, Node-B). These signals may represent audio, video, multimedia, control signaling, and data.

The wireless Internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth® and ZigBee®.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide an audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as a phone call mode, recording mode, and voice recognition mode. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones. The interface unit 170 may be configured using a wired/wireless data port, a card socket for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received, and user input received. An example of such output includes providing tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, and video. The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
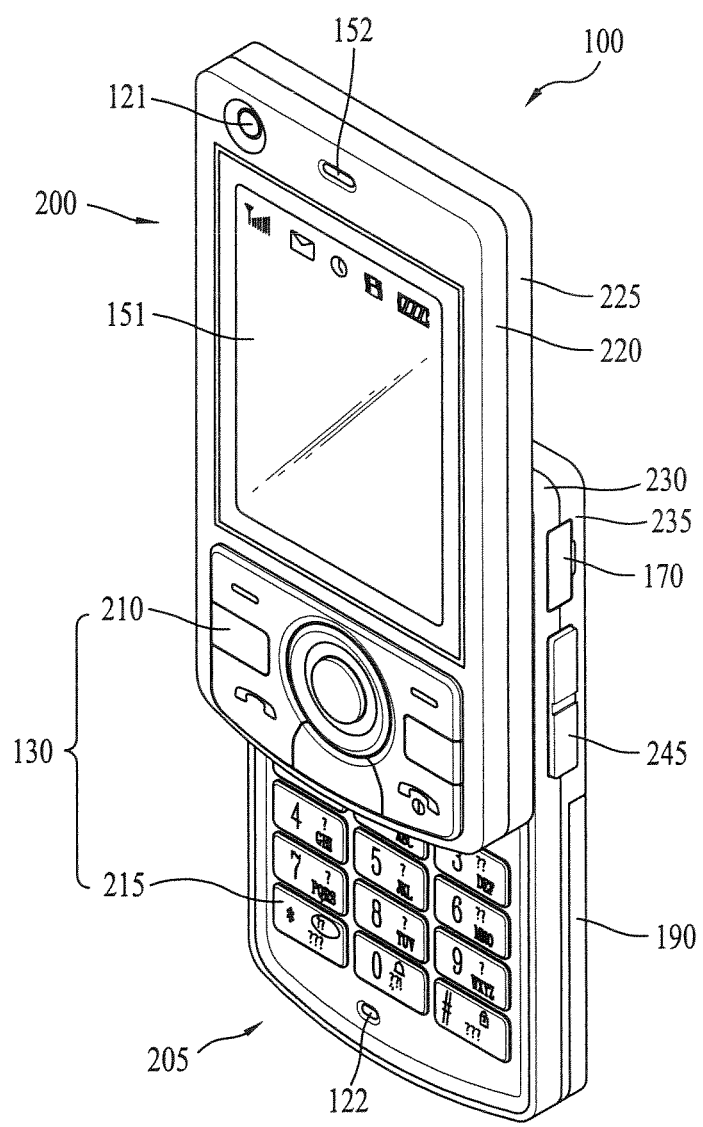
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
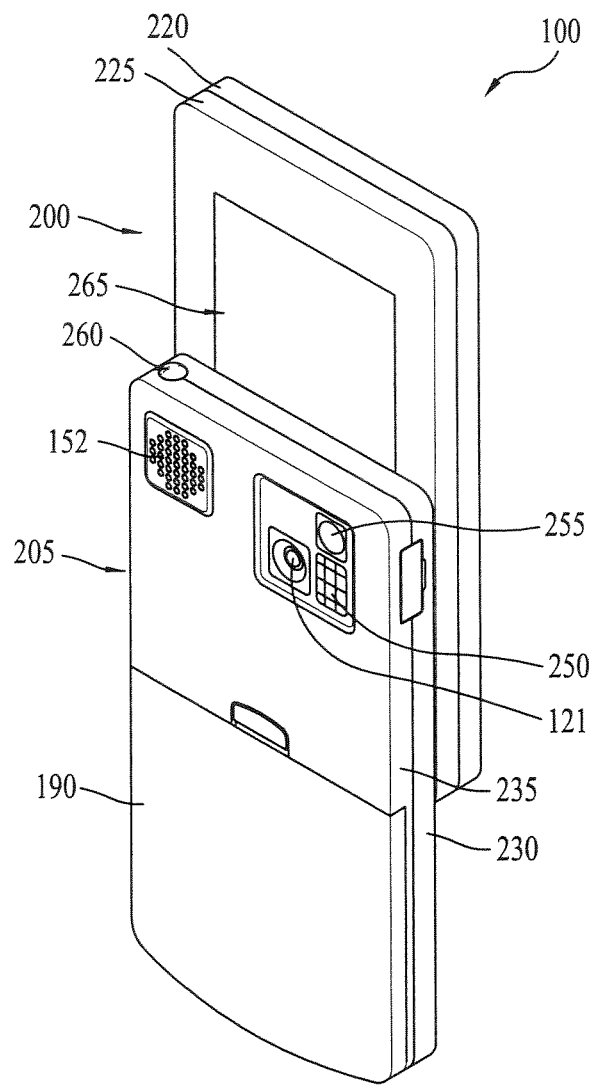
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
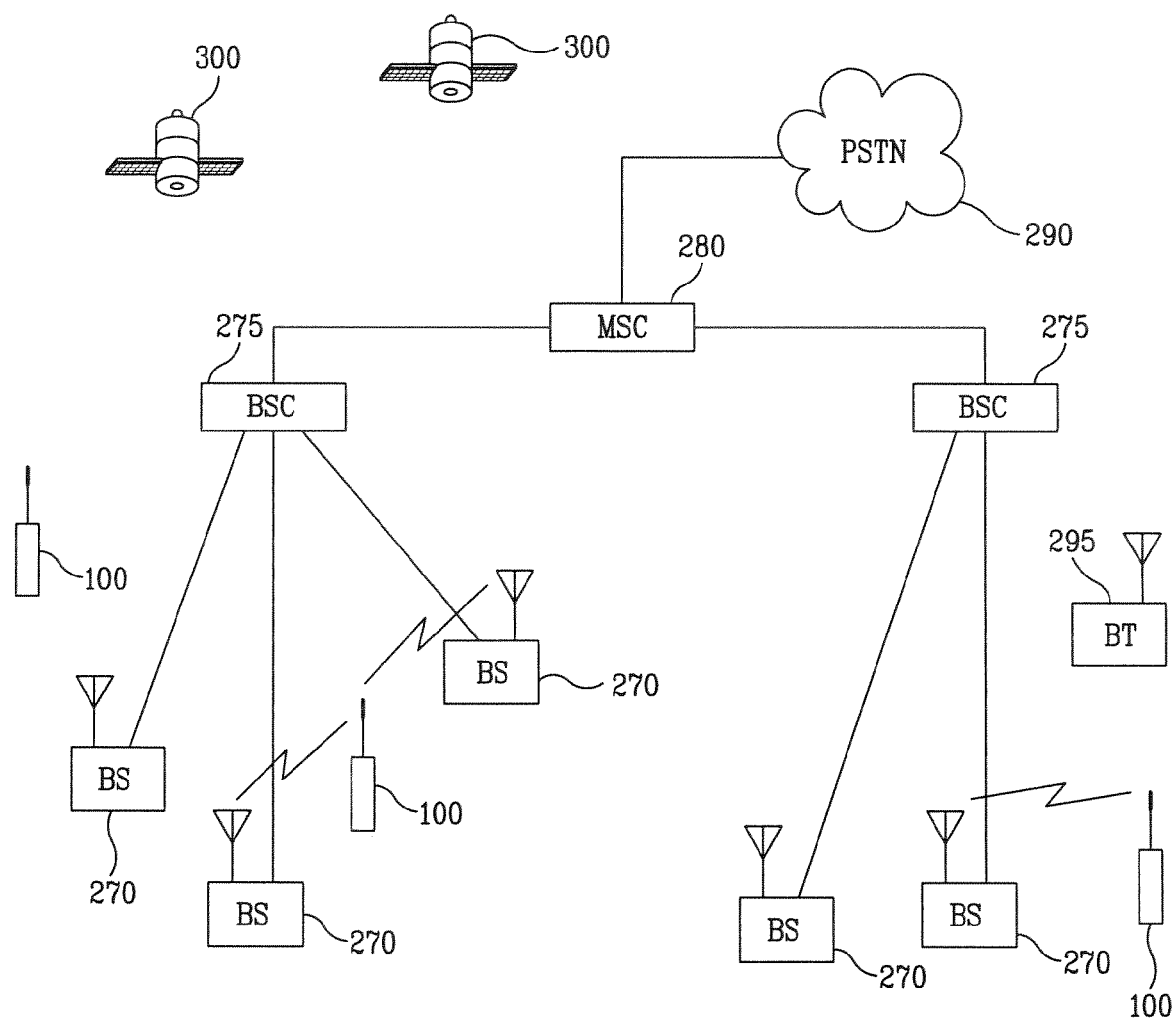
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations (BS) 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A broadcasting transmitter 295 is shown broadcasting to portable terminals 100 operating within the system. The broadcast receiving module 111 (FIG. 1) is typically configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Figure 5:
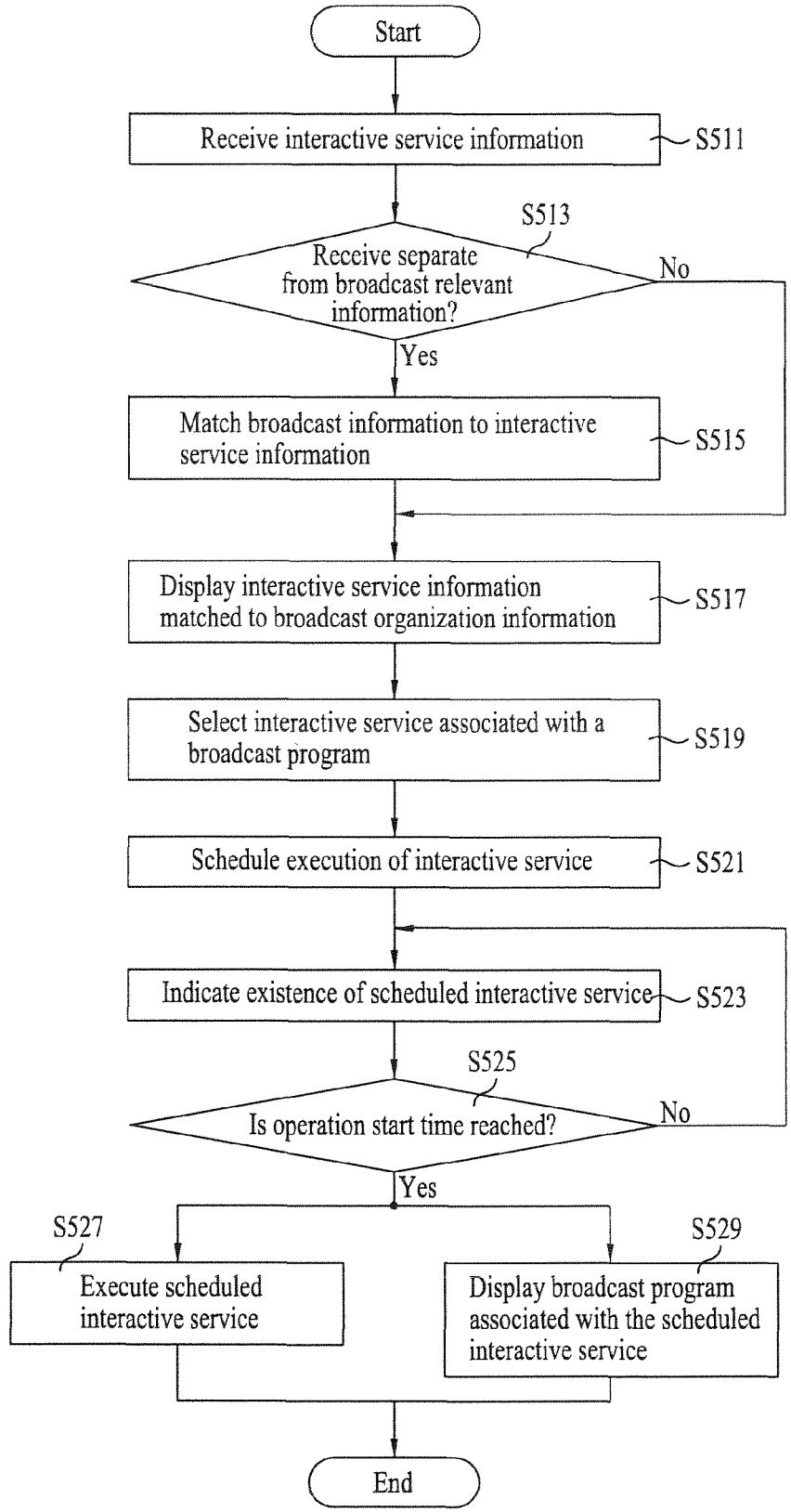
FIG. 5 is a flowchart for a method of controlling a broadcast in a mobile terminal according to one embodiment of the present invention.

Steps included in a method of controlling a broadcast in a mobile terminal according to the present invention are explained with reference to FIG. 5 as follows. FIG. 5 is a flowchart for a method of controlling a broadcast in a mobile terminal according to one embodiment of the present invention. For clarity and convenience of description, it will be assumed that a mobile terminal mentioned in the following shall include at least of the elements or components shown in FIG. 1.

Referring to FIG. 5, the terminal 100 receives interactive service information via the wireless communication unit 110 (S511).

The interactive service means a service for transceiving data between a mobile terminal and an external server. For instance, the interactive service can include at least one of voting, survey, quiz, lottery, shopping, contents download, contents upload, call connection, and message transmission/reception. The interactive service information can include at least one of an interactive service type, detailed description of interactive service, interconnected broadcast program identification information, and broadcast time information on an interconnected broadcast program.

The terminal 100 can receive the interactive service information (S511) from a broadcast network, a mobile Internet, a short-range communication network, etc.

For instance, the broadcast receiving module 111 is capable of receiving the interactive service information via a broadcast channel of a broadcast network. The broadcast channel may mean a channel separately provided for data transmission/reception.

The mobile communication module 112 is capable of receiving the interactive service information from a wireless data network such as CDMA (Code Division Multiple Access), W-CDMA (Wideband Code Division Multiple Access), EV-DO (Evolution-Data Optimized or Evolution-Data only), or HSDPA (High Speed Downlink Packet Access)/HSUPA (High Speed Uplink Packet Access) in HSPA (High Speed Packet Access).

The wireless Internet module 113 is capable of receiving the interactive service information from a mobile Internet such as WiBro (Wireless Broadband), Mobile WiMax (Worldwide Interoperability for Microwave Access), or WiFi (Wireless Fidelity).

The short-range communication module 114 is capable of receiving the interactive service information from a short-range communication network such as Bluetooth®, RFID (Radio Frequency Identification), IrDA (Infrared Data Association), UWB (Ultra Wideband), ZigBee®.

In the receiving step S511, the mobile terminal 100 receives the interactive service information by having it included in broadcast information or receives the interactive service information separately from the broadcast information.

The broadcast information is the information of a broadcast program provided via a broadcast channel and may include at least one of broadcast program identification information, broadcast program broadcast time information, broadcast program content information (e.g., title, synopsis, preview, and main character information), and information on an interactive service associated with a broadcast program. Moreover, the broadcast information can be provided in a format such as Electronic Program(me) Guide (EPG), Interactive Program(me) Guide (IPG), and Electronic Service Guide (ESG).

When receiving the broadcast information via the wireless communication unit 110, the mobile terminal 100 is able to receive interactive service information included in the received broadcast information.

Alternatively, the mobile terminal 100 is able to receive the broadcast information and the interactive service information from the wireless communication unit 110, and the broadcast information and the interactive service information can be received via the same network or via different networks.

Subsequently, the mobile terminal 100 determines whether the interactive service information and the broadcast information are separately received (S513). In particular, the respective reception determination may be carried out by the controller 180.

If the interactive service information and the broadcast information are separately received, the mobile terminal 100 matches the interactive service information to the broadcast information (S515).

The controller 180 performs (S515) the matching by determining a broadcast program associated with an interactive service using broadcast program identification information, channel identification information or broadcast time information of the interconnected broadcast program in the interactive service information, and then matches the corresponding interactive service information to the determined broadcast program. For instance, if the broadcast identification information of broadcast programs of all channels broadcasted in the same time zone are identical to each other, the controller 180 is able to carry out the determination using channel identification information. If the broadcast program and identical broadcast identification information is periodically broadcast, the controller 180 performs the determination using broadcast time information. If broadcast time information of broadcast programs of all channels are identical, the controller 180 performs the determination using broadcast identification information.

If the interactive service information and the broadcast information are not separately received, the mobile terminal 100 may omit the matching (S515). Since the interactive service information is included in the broadcast information, it is already matched.

The mobile terminal 100 stores the result of the matching between the interactive service information and the broadcast information in the memory 160.

The mobile terminal 100 displays the interactive service information on the display 151 matched to the interactive service information to broadcast organization information (S517).

The broadcast organization information is the information generated using the above-described broadcast information and provides information including broadcast time information on broadcast programs organized for channels. For instance, the broadcast organization information can be displayed as a table or a text list.

The interactive service information may be displayed (S517) when the interactive service information is requested by a user or randomly or periodically. The interactive service information also may be displayed when various applications are activated as well as when the mobile terminal 100 is in standby mode. For instance, displaying can be executed in the course of a broadcast display, multimedia playback, or audio/video communication.

Displaying the interactive service information (S517) is explained in detail with reference to the accompanying drawings. A sorting may be performed on at least one of a channel, a time zone, a category, a presence or non-presence of interactive service (IS), an IS type, a use frequency, a preferred channel order, and an audience rating order.

Figure 6A:
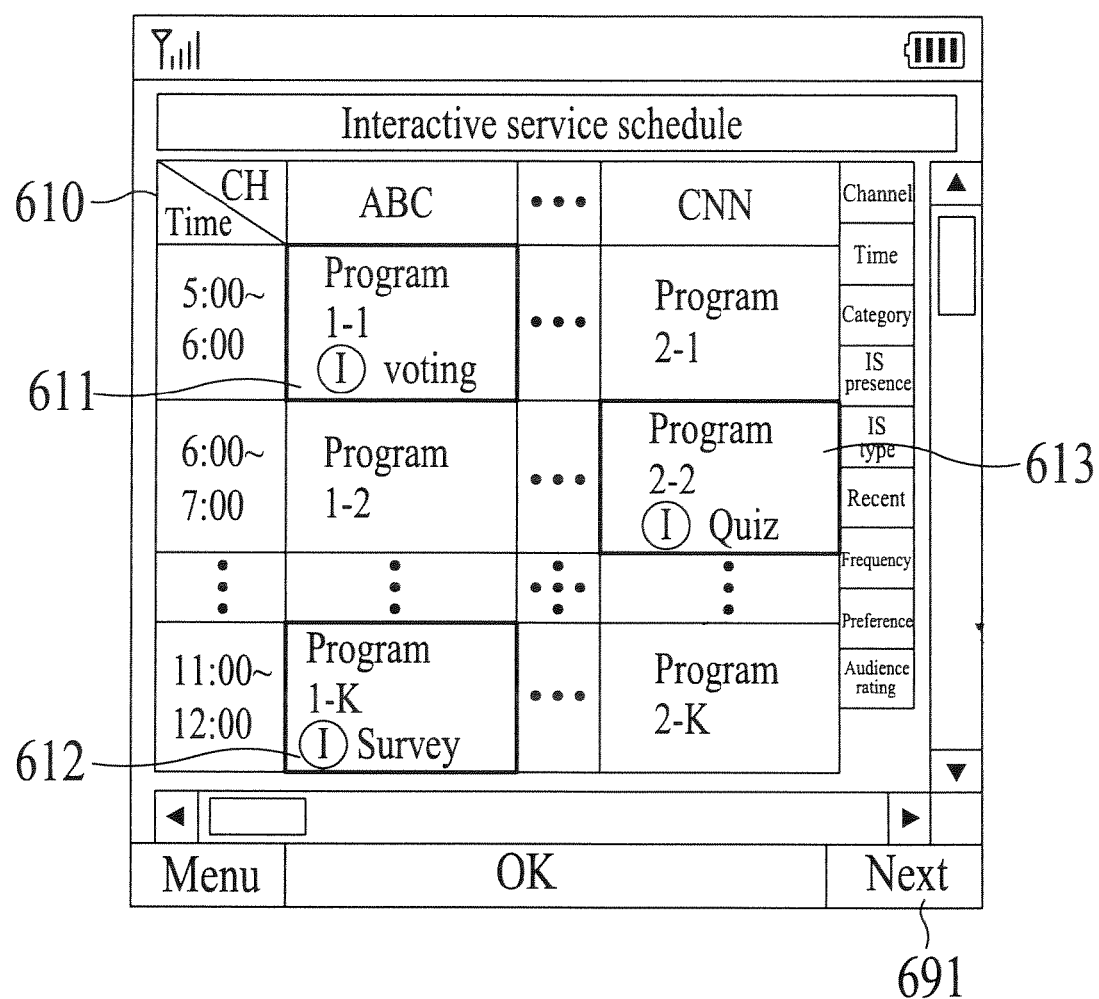
FIGS. 6A to 6C are diagrams of first images for displaying interactive service information in a mobile terminal according to one embodiment of the present invention.
Figure 6B:
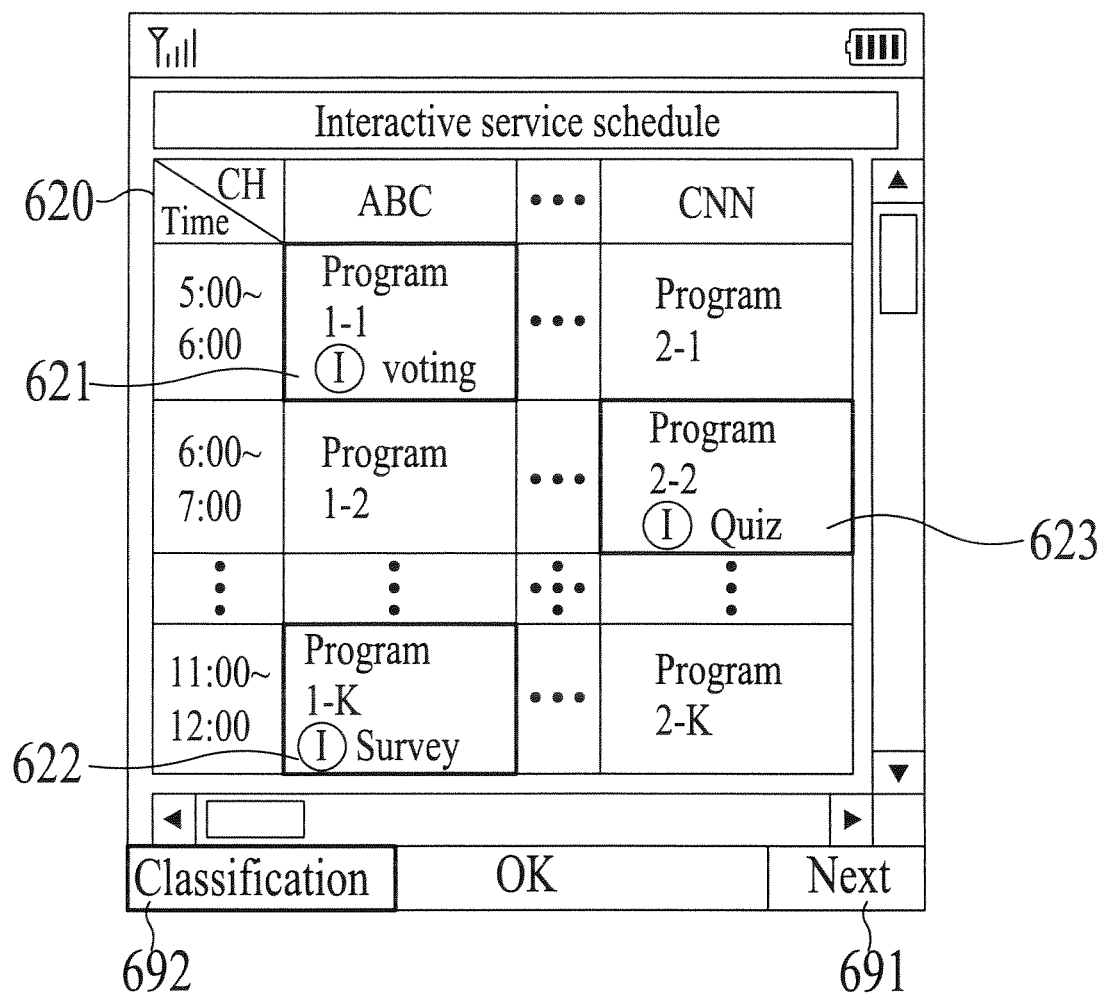
Figure 6C:
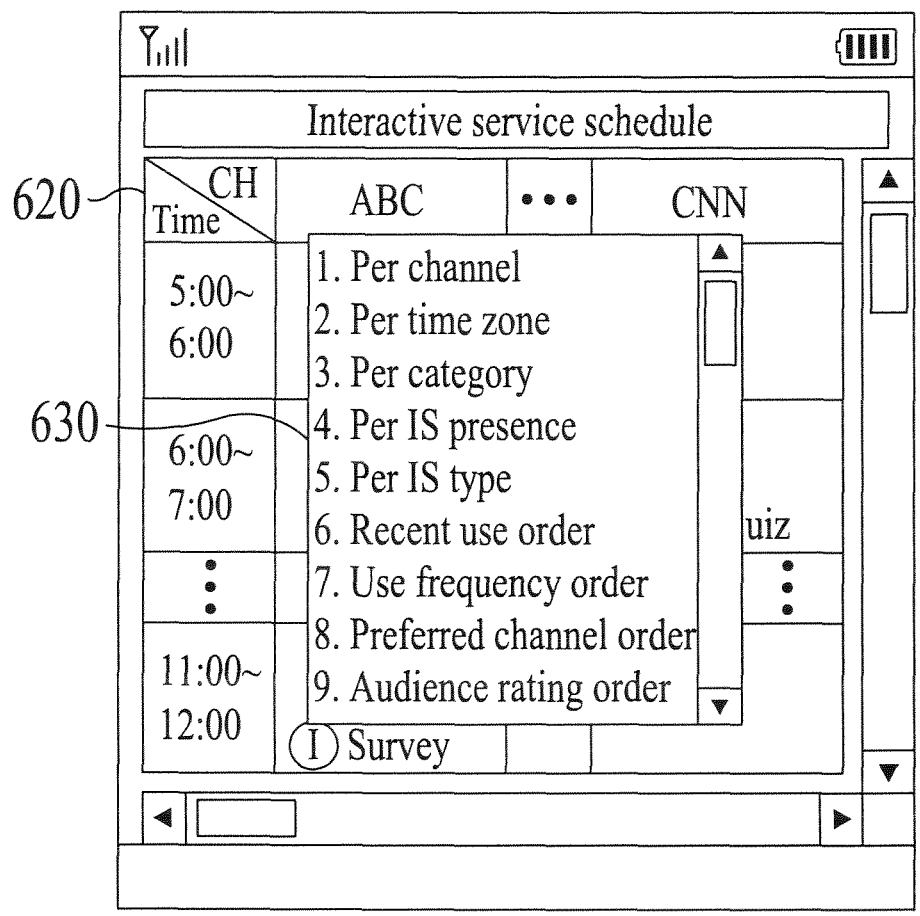

FIGS. 6A to 6C are diagrams of first images displaying interactive service information in a mobile terminal according to one embodiment of the present invention. The mobile terminal 100 displays broadcast programs 611, 612 and 613 associated with an interactive service identified by broadcast organization information 610. For instance, highlight, color, font size may be used for this identification.

Since the broadcast organization information 610 can be sorted in accordance with a sorting condition, the mobile terminal 100 can display one or more sorting conditions together with the broadcast organization information.

Referring to FIG. 6B, the mobile terminal 100 displays broadcast programs 621, 622 and 623 connected to an interactive service identified by broadcast organization information 620.

If a 'Classification' region 692 provided on a screen is selected, the mobile terminal 100 displays a list 630 constructed with sorting conditions for the broadcast organization information 620 as shown in FIG. 6C. The list 630 can be displayed using a popup window system or a multi-picture system (e.g., PIP (picture in picture), POP (picture out picture), PBP (picture by picture, etc.).

Figure 7A:
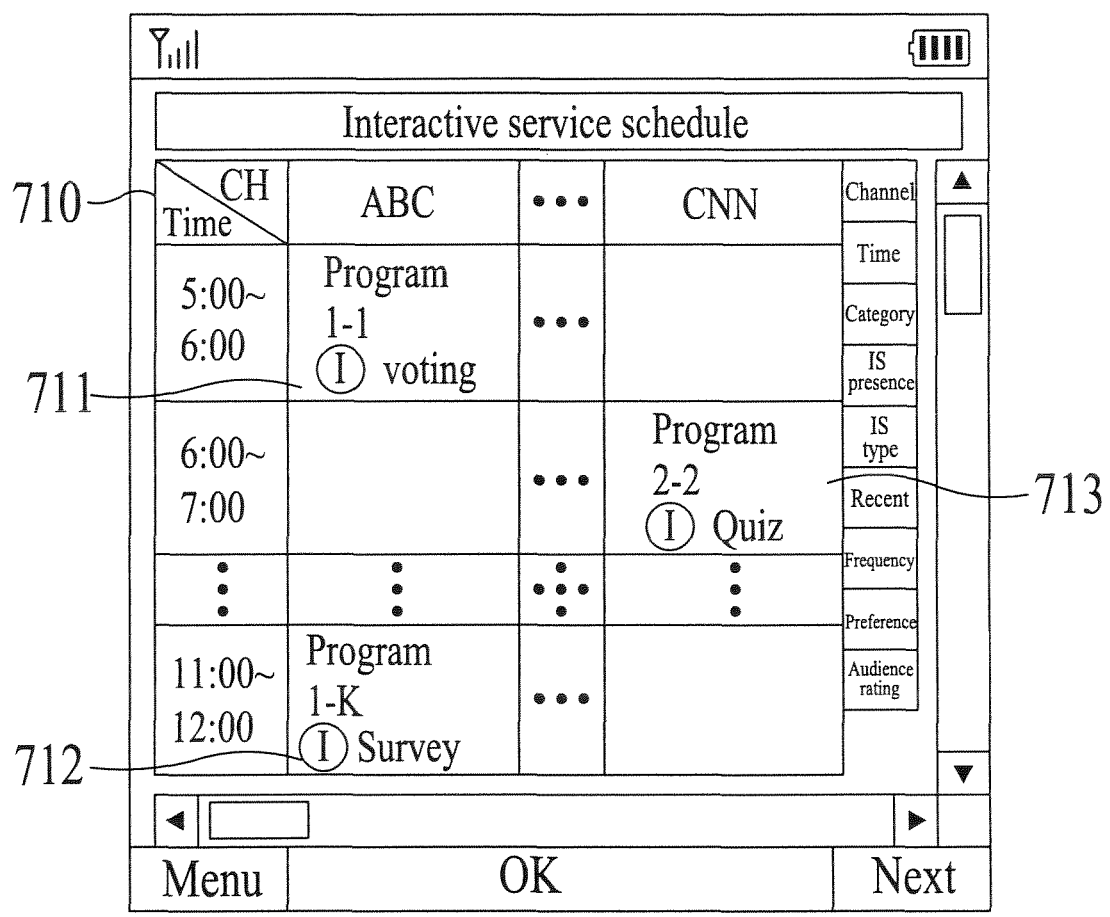
FIG. 7A to FIG. 7C are diagrams of second images for displaying interactive service information in a mobile terminal according to one embodiment of the present invention.
Figure 7B:
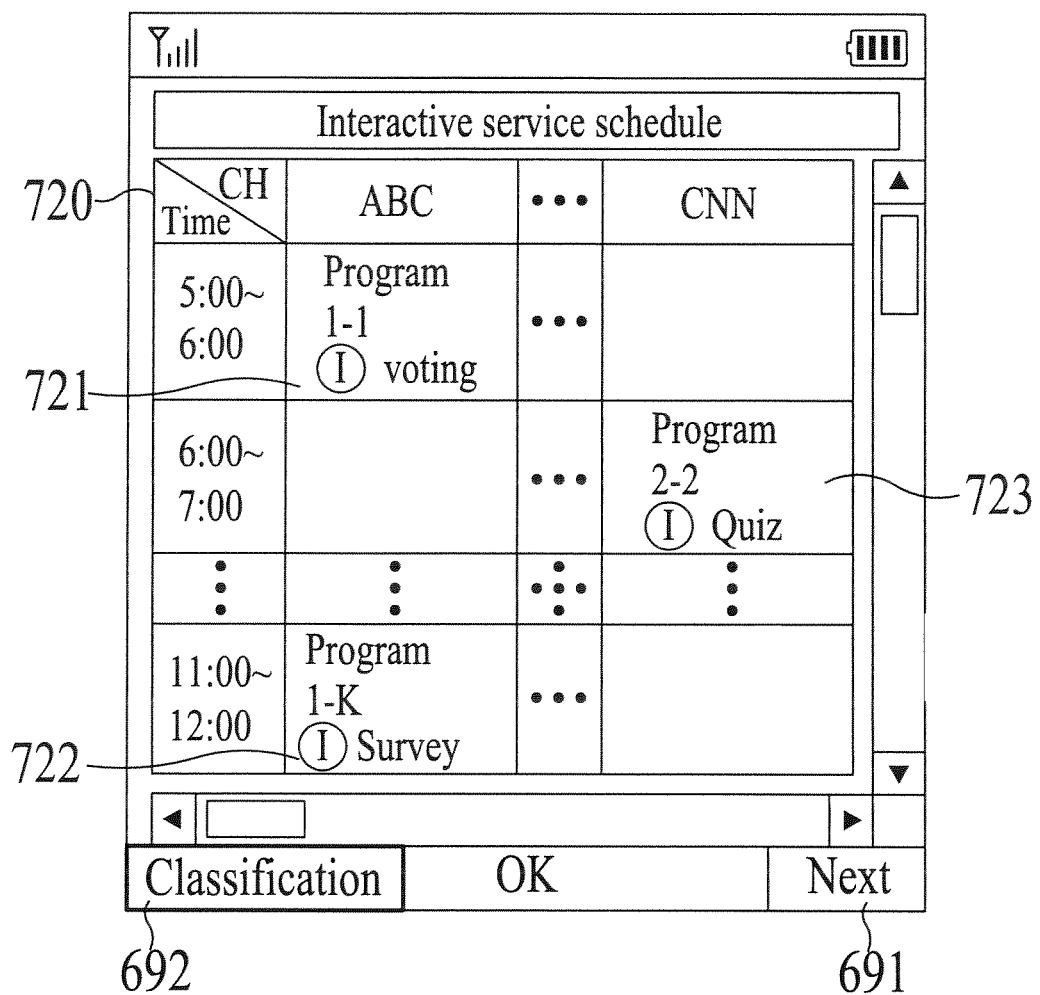
Figure 7C:
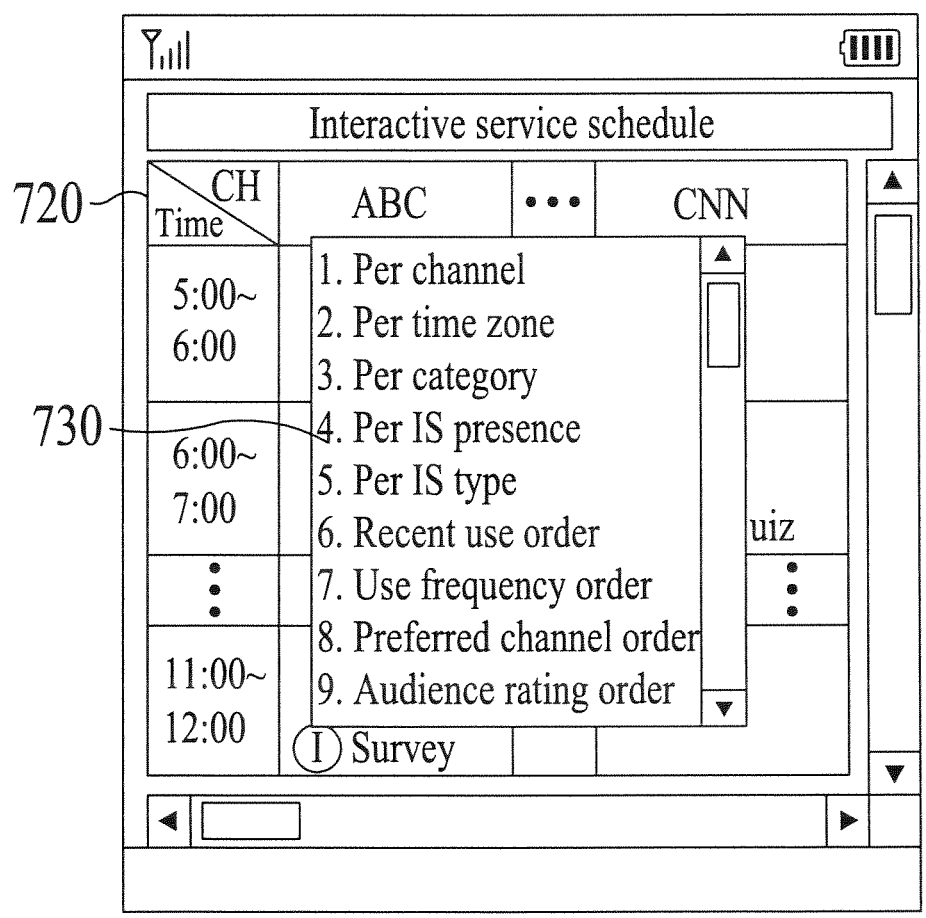

FIGS. 7A to 7C are diagrams of second images for displaying interactive service information in a mobile terminal according to one embodiment of the present invention.

Referring to FIG. 7A, the mobile terminal 100 displays broadcast programs 711, 712 and 713 associated with an interactive service on broadcast organization information 710 only. The mobile terminal 100 displays at least one sorting conditions in an index format together with the broadcast organization information 710.

Referring to FIG. 7B, the mobile terminal 100 displays broadcast programs 721, 722 and 723 associated with an interactive service identified by broadcast organization information 720. If a 'Classification' region 792 provided on a screen is selected, the mobile terminal 100 displays a list 730, shown in FIG. 7C having sorting conditions for the broadcast organization information 720(*e*).

FIGS. 8A to 8E are diagrams of third images for displaying interactive service information in a mobile terminal according to one embodiment of the present invention.

Figure 8A:
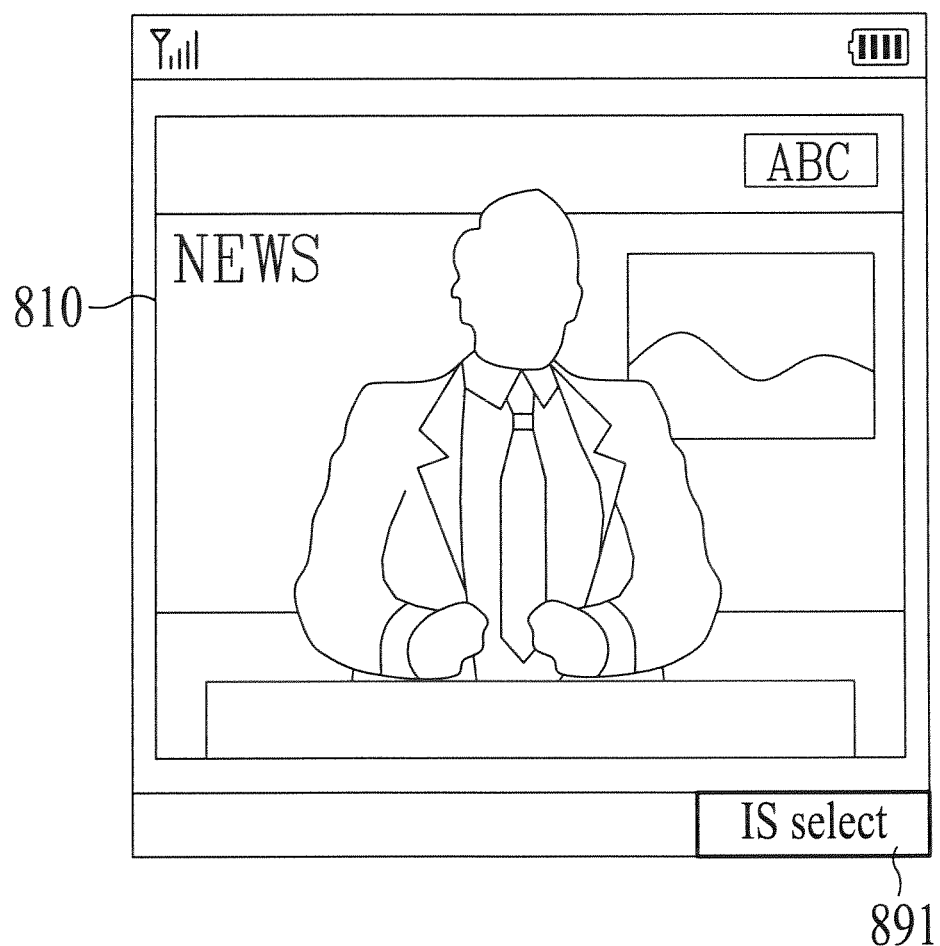

Referring to FIG. 8A, if an 'IS selection' region 891 is selected in the course of displaying a broadcast program, the mobile terminal 100 displays interactive service information as shown in FIGS. 8B to 8E.

Figure 8C:
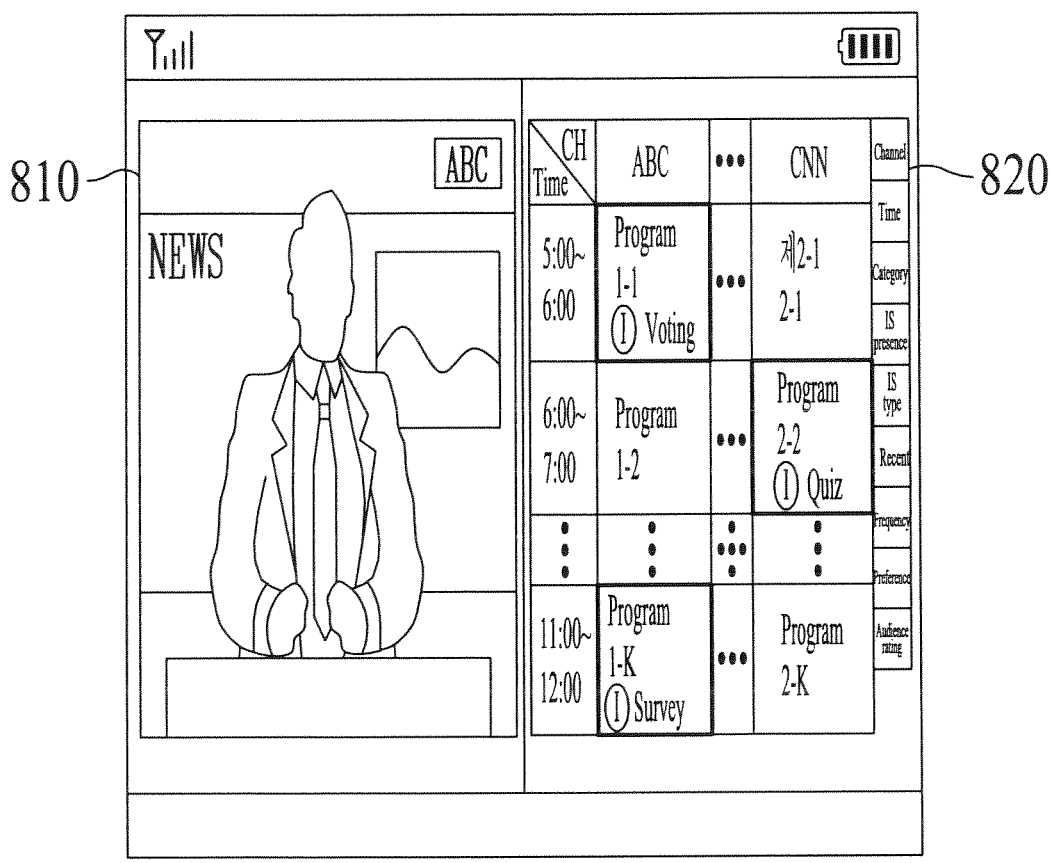

Referring to FIG. 8B, the mobile terminal 100 displays broadcast organization information 820, which identifies broadcast programs associated with an interactive service identified on a popup window or displays the broadcast organization information on one of a plurality of partitions on the display as shown in FIG. 8C, while maintaining the display of a broadcast program.

Figure 8D:
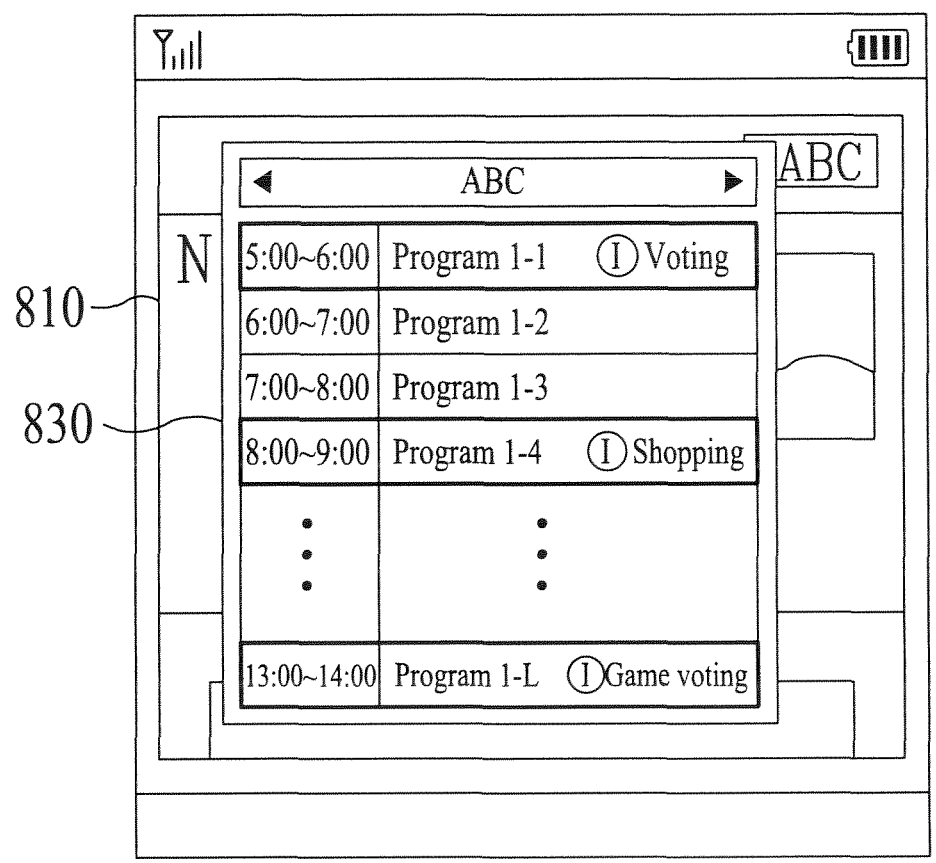
Figure 8E:
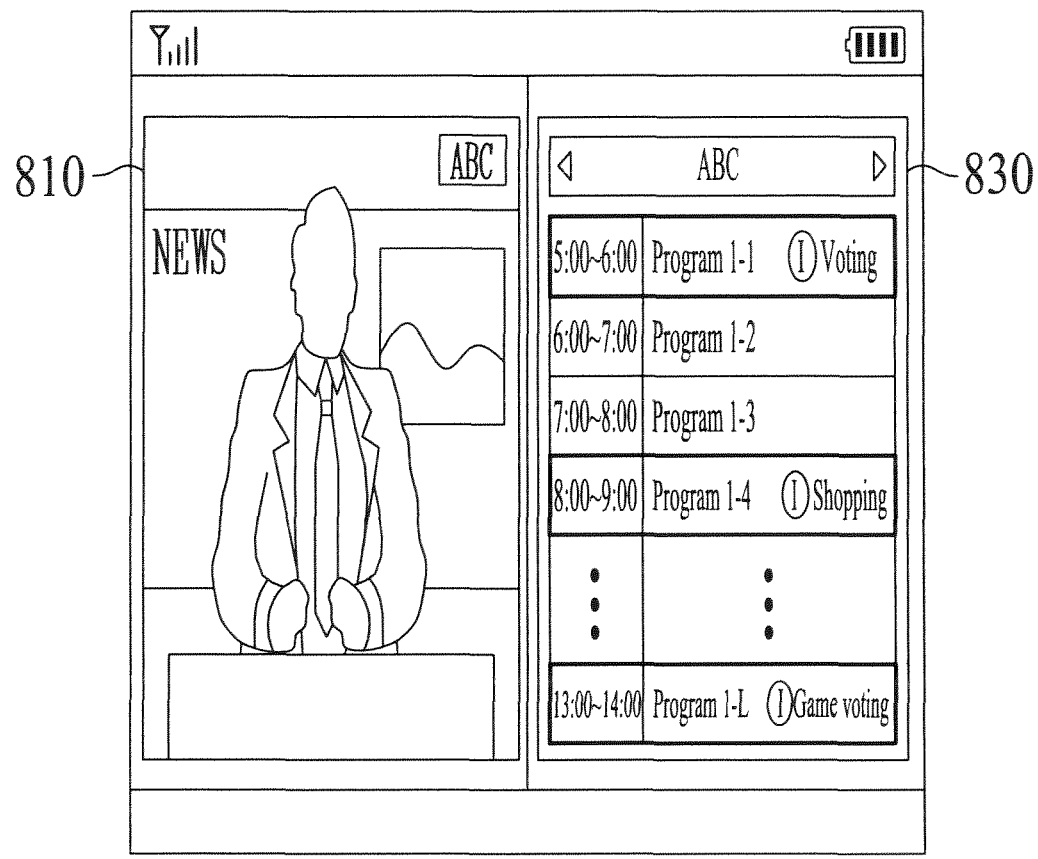

Referring to FIGS. 8D and 8E, the mobile terminal 100 displays interactive service information 830 on a popup window or displays the interactive service information on one of a plurality of partitioned pictures as shown in FIG. 8E, while displaying the broadcast program in another partition.

FIGS. 9A to 9L are diagrams of images for displaying interactive service information sorted in accordance with various sorting references in a mobile terminal according to one embodiment of the present invention.

In particular, FIGS. 9A to 9H show that interactive service information matched to broadcast organization information is displayed. FIGS. 9I to 9L show that a list is constructed with at least one or more interactive services displayed.

The description of FIGS. 9A to 9H assumes that one of the sorting conditions shown in FIG. 6A is selected. However, a sorting condition shown in FIG. 6C to 7C is applicable as well. The sorting conditions and elements constructing the sorting conditions can be determined by a user or automatically by the mobile terminal 100.

Figure 9A:
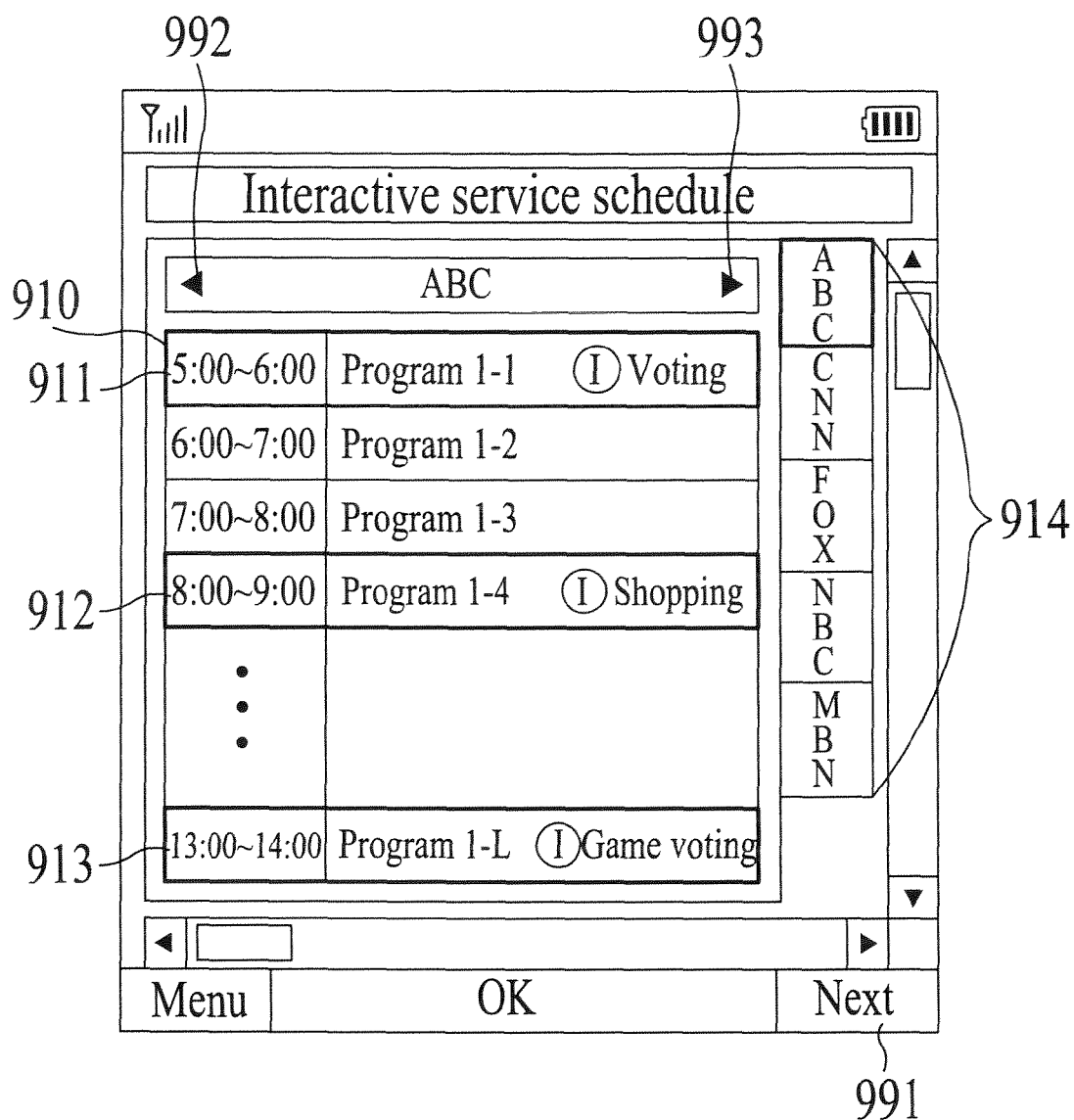
FIGS. 9A to 9L are diagrams of images for displaying interactive service information sorted in accordance with various sorting references in a mobile terminal according to one embodiment of the present invention.

Referring to FIG. 9A, if a channel is selected from sorting conditions, the mobile terminal 100 displays broadcast programs 911, 912 and 913 associated with an interactive service identified by broadcast organization information 910 for a specific broadcast channel (e.g., 'ABC').

When a plurality of selectable broadcast channels 914 are provided in an index format, a user is informed which broadcast programs are associated with the interactive service by selecting an index corresponding to the specific broadcast channel.

If one of the directional keys 992, 993 provided at the right and left sides of a currently sorted broadcast channel is selected, a next or previous channel may be selected.

Figure 9B:
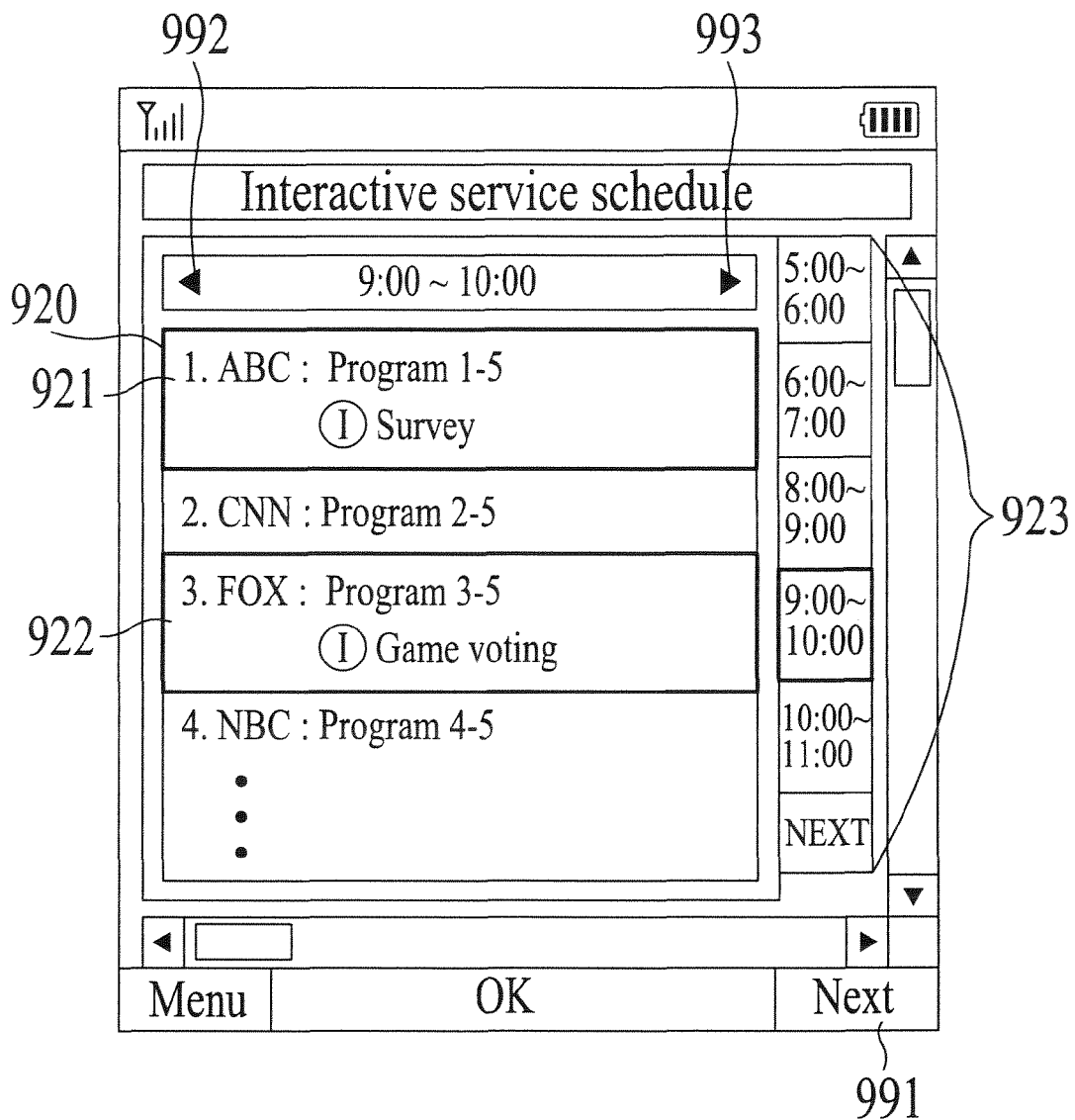

Referring to FIG. 9B, if a time period is the selected sorting condition, the mobile terminal 100 displays a list of broadcast programs 920 that belong_to a time period selected from a list of time periods 923. In FIG. 9B, individual programs 921, 922 may be selected from the list of programs occurring in the selected time period (09:00 to 10:00).

Figure 9C:
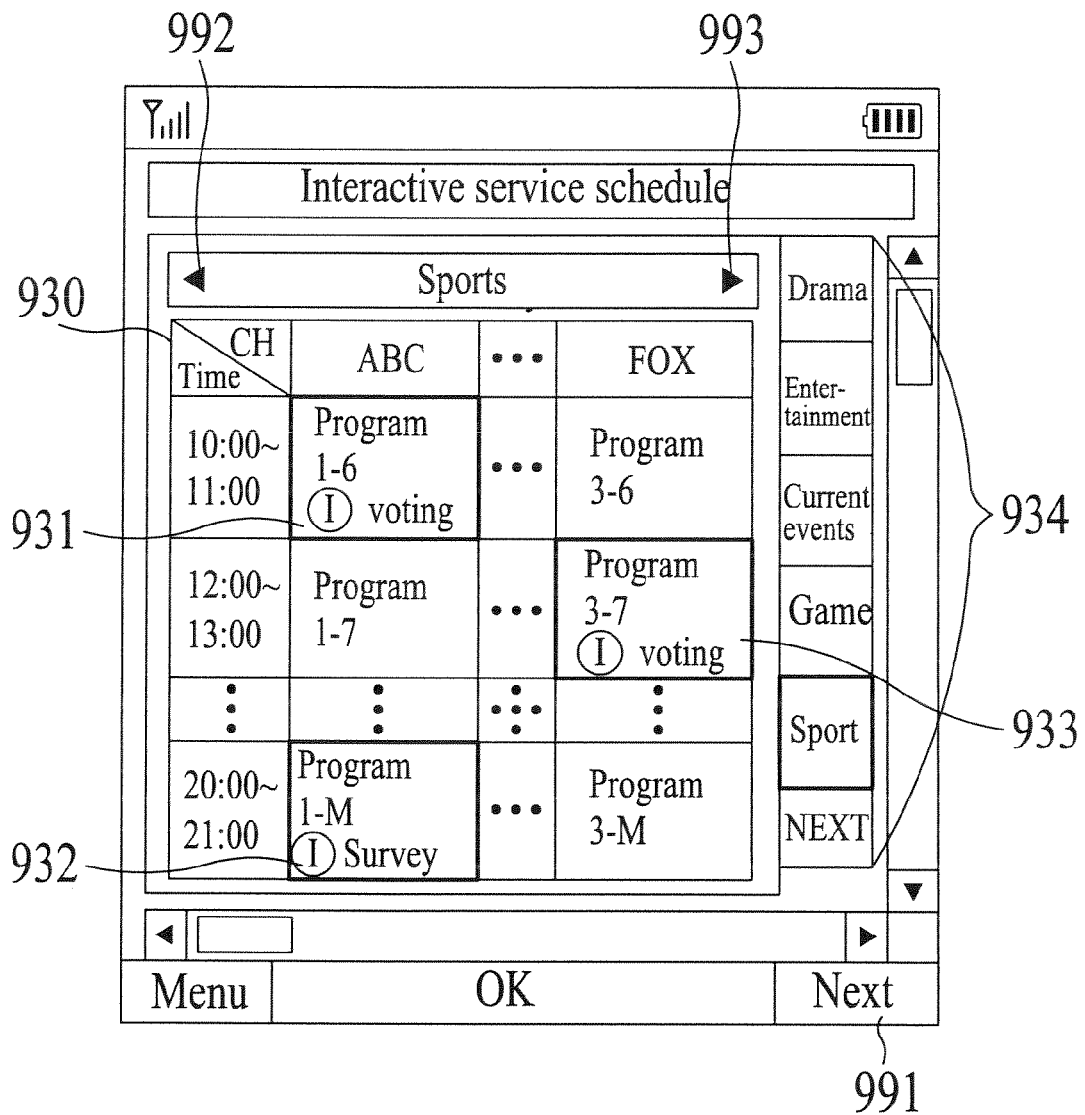

Referring to FIG. 9C, if a program category is the selected sorting condition, the mobile terminal 100 displays a list of broadcast programs 930 that belong to a category selected from a list of categories 934. In FIG. 9C, individual programs 931, 932, and 933 may be selected from the list of programs belonging to the selected category (Sports).

Figure 9D:
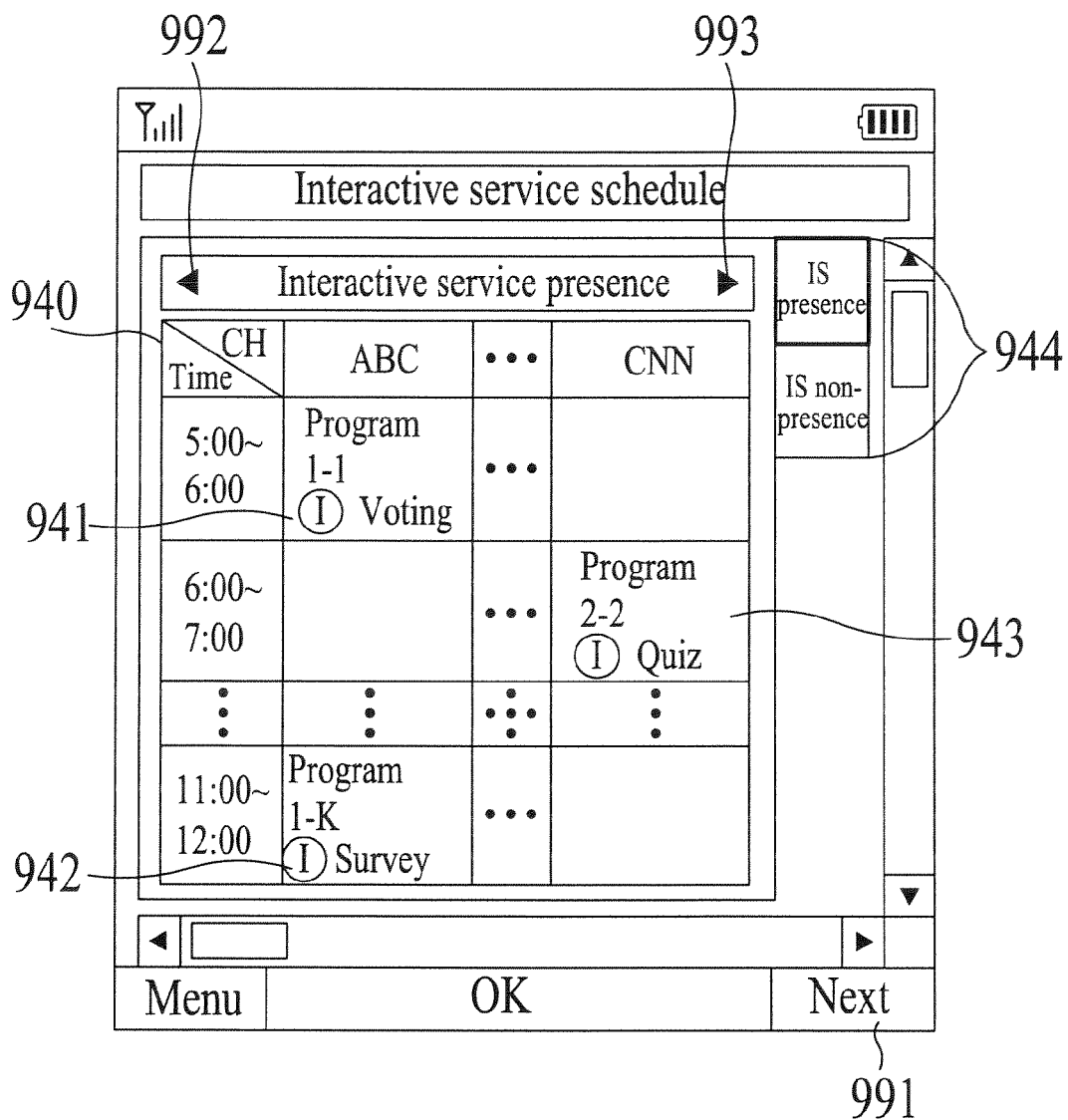

Referring to FIG. 9D, if a presence or non-presence of IS is the selected sorting condition, the mobile terminal 100 displays a list of broadcast programs 940 that are or are not selectively associated with an interactive service 944. In FIG. 9D, individual programs 941, 942, 943 may be selected from the list of programs associated with an interactive service.

If one of directional keys 992 and 993 is selected, the mobile terminal 100 displays broadcast organization information corresponding to the "IS presence" or "IS non-presence".

Figure 9E:
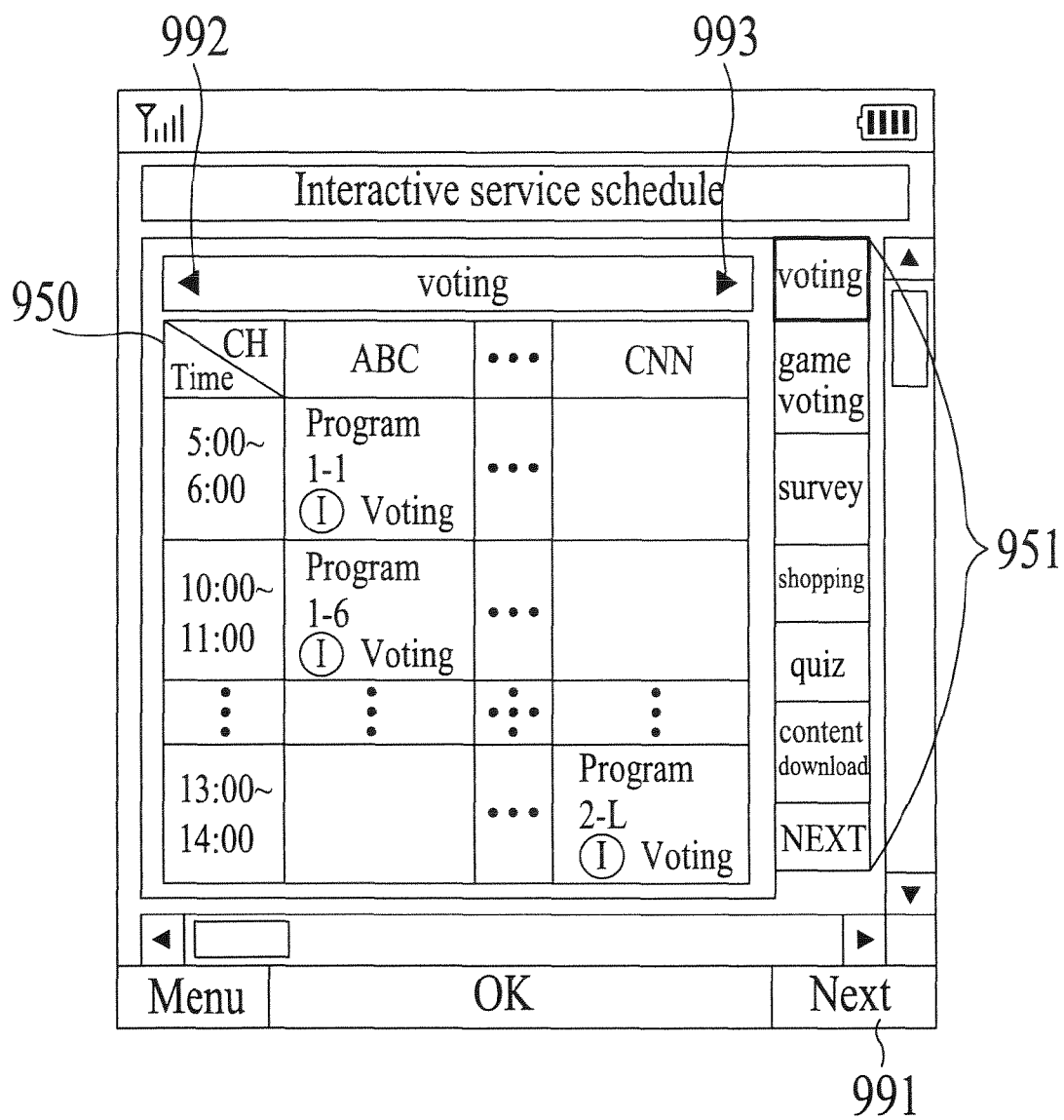

Referring to FIG. 9E, if an IS type is the selected sorting condition, the mobile terminal 100 displays a list of broadcast programs 950 that have the IS type selected from a list of IS types 951. FIG. 9E shows programs associated with the IS type 'Voting'.

If one of directional keys 992 and 993 provided at the right and left of a title of a currently sorted interactive service type is selected, the mobile terminal 100 displays broadcast programs having the next or previous IS type.

Figure 9F:
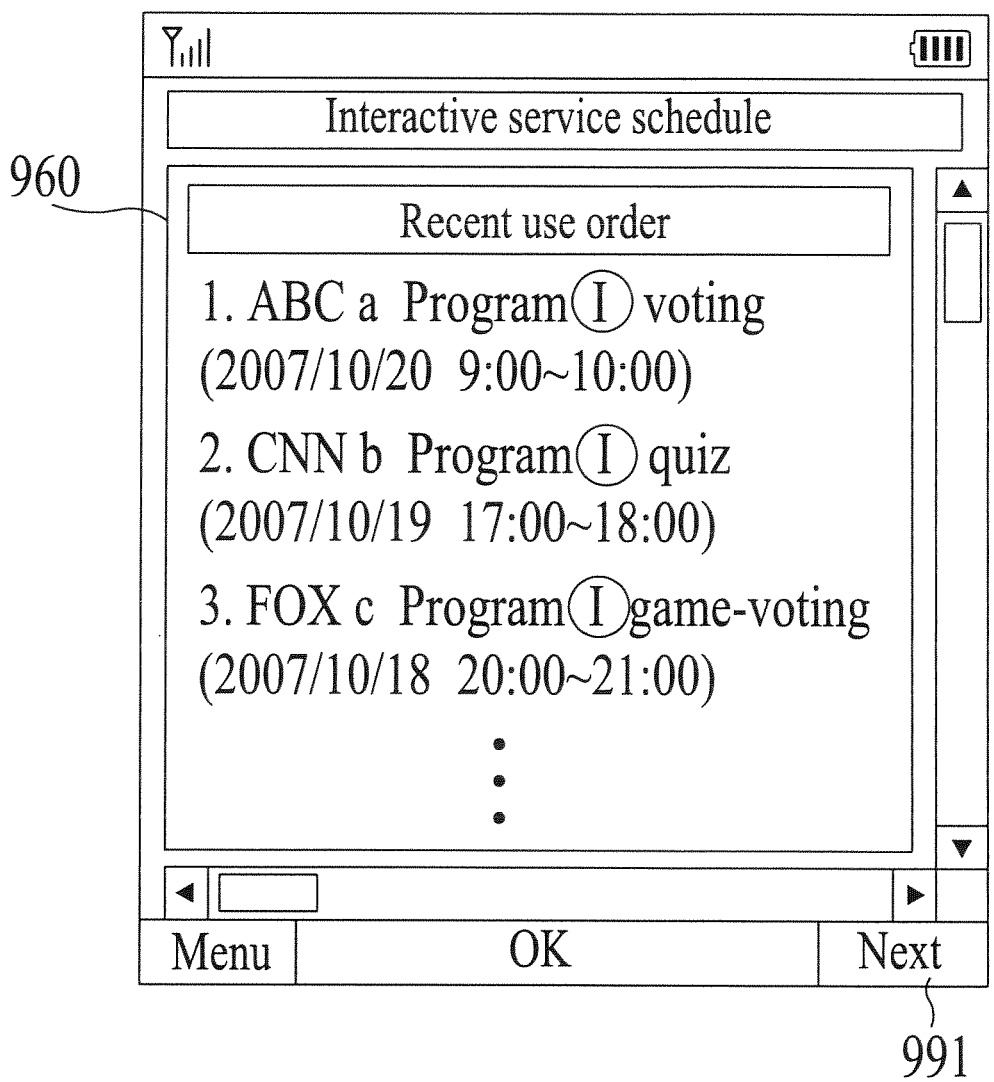

Referring to FIG. 9F, if a recent use order is the selected sorting condition, the mobile terminal 100 displays a list 960 of broadcast programs having interactive service in order of recent use.

Figure 9G:
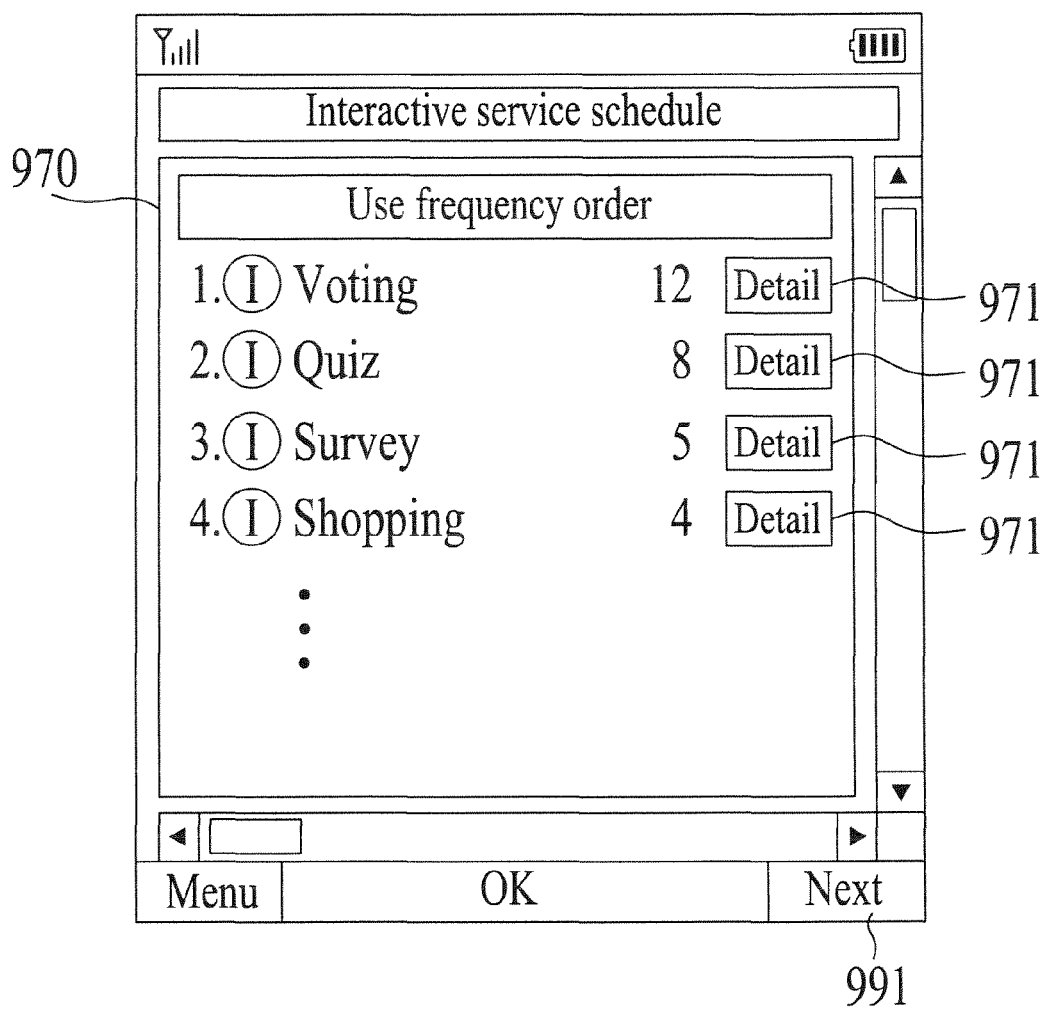

Referring to FIG. 9G, if a use frequency order is the selected sorting condition, the mobile terminal 100 is displays a list 970 of interactive services in order of frequency of use. A use count for each interactive service can be displayed. If 'detail' 971 is selected, information on broadcast programs associated with the corresponding interactive service is displayed.

Figure 9H:
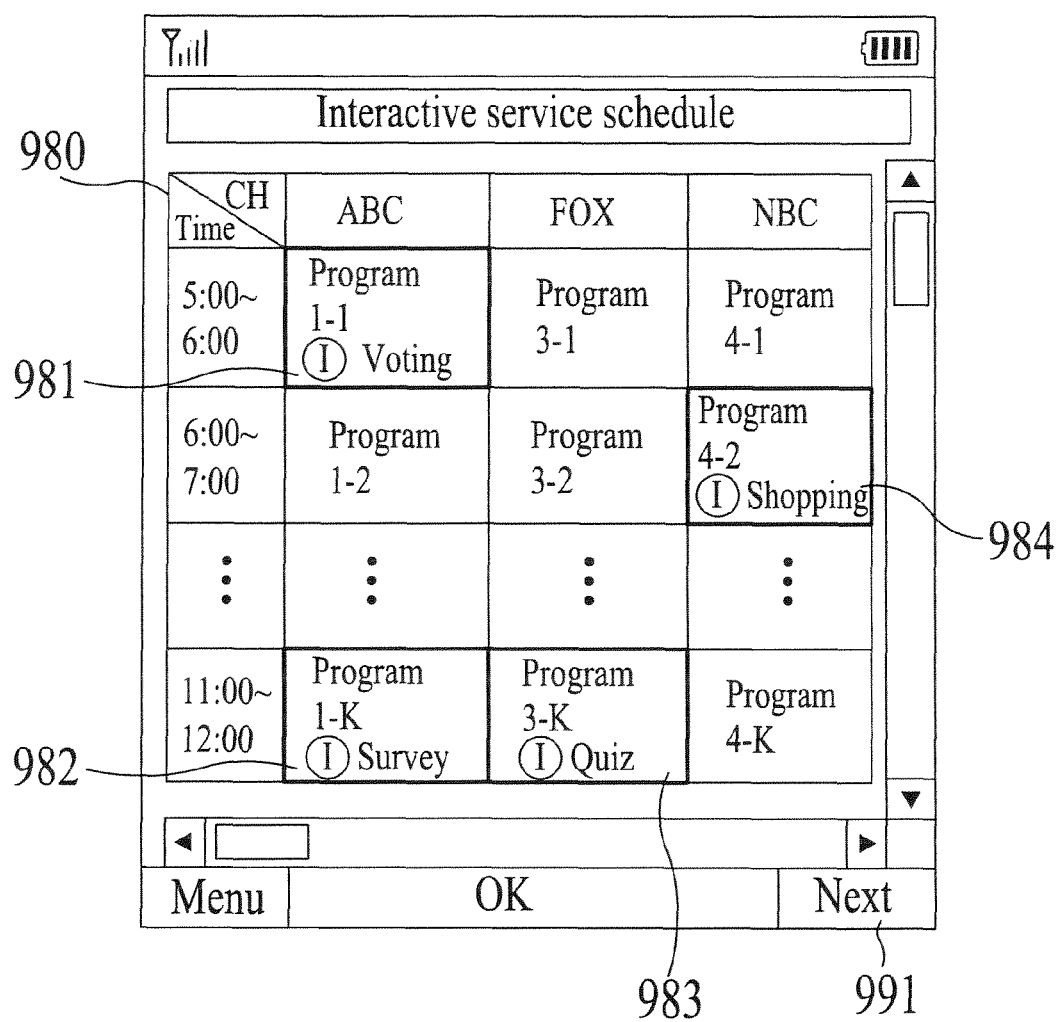

Finally, referring to FIG. 9H, if a preferred channel is the selected sorting condition, the mobile terminal 100 displays an indication of broadcast programs 980 associated with at least one preferred channel, such as broadcast programs 981, 982, 983, and 984. The preferred channel can be determined by a user or by the mobile terminal 100 in accordance with a prescribed reference (such as use frequency, recent use, and use time).

In addition, the mobile terminal 100 displays at least one of the pictures shown in FIGS. 9A to 9H using a popup window system or a partitioned picture system while continuing to display the entire broadcast organization information shown in FIG. 6A.

Figure 9I:
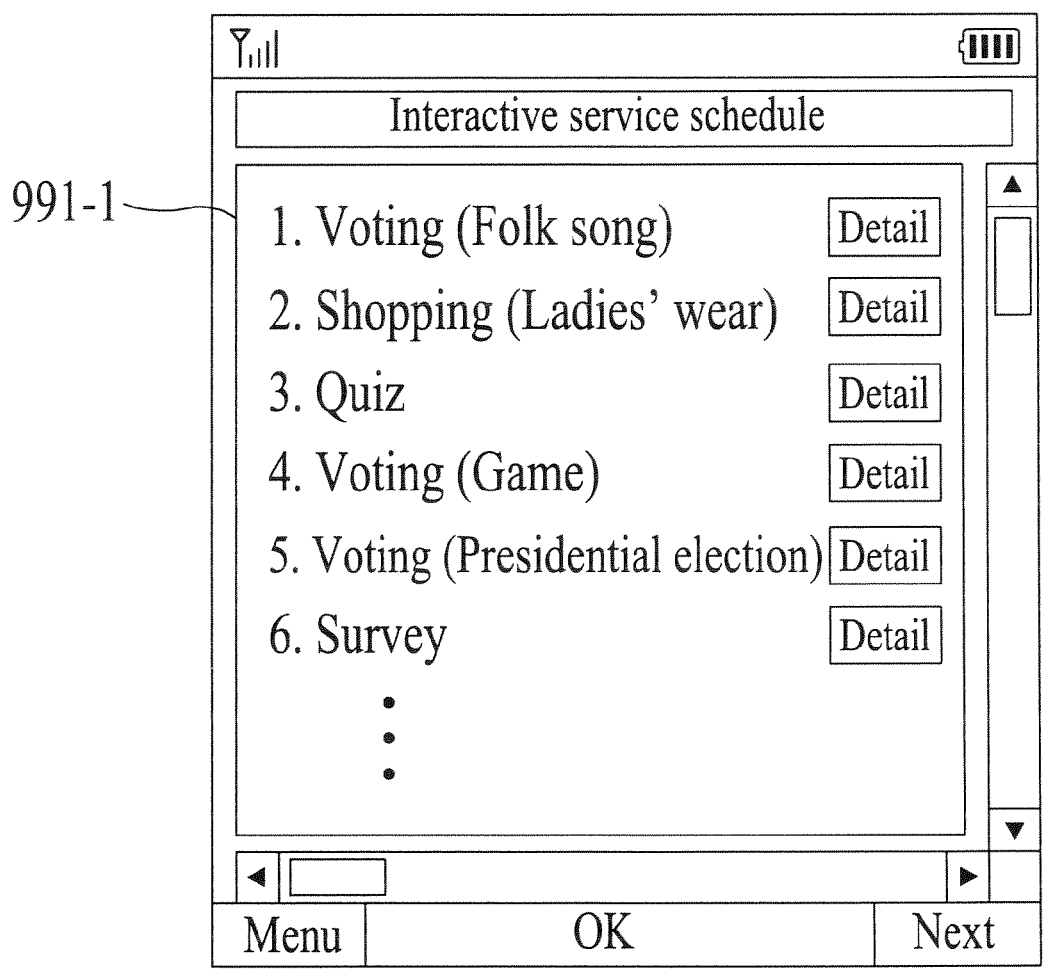

Referring to FIG. 9I, the mobile terminal 100 displays an interactive service list 991-1 of a plurality of interactive services. A type of each of the interactive services and schematic information can be displayed separately. Selecting 'Detail' will display the details of the associated interactive service.

Figure 9J:
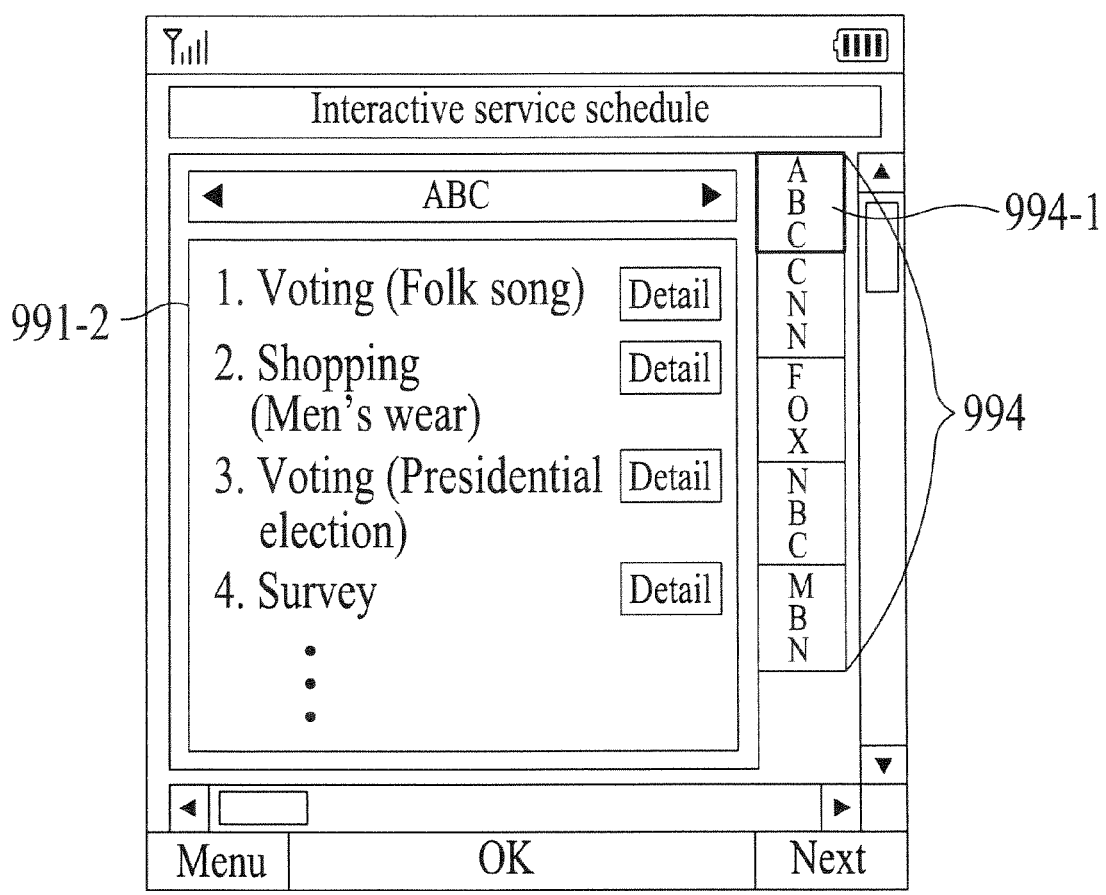
Figure 9K:
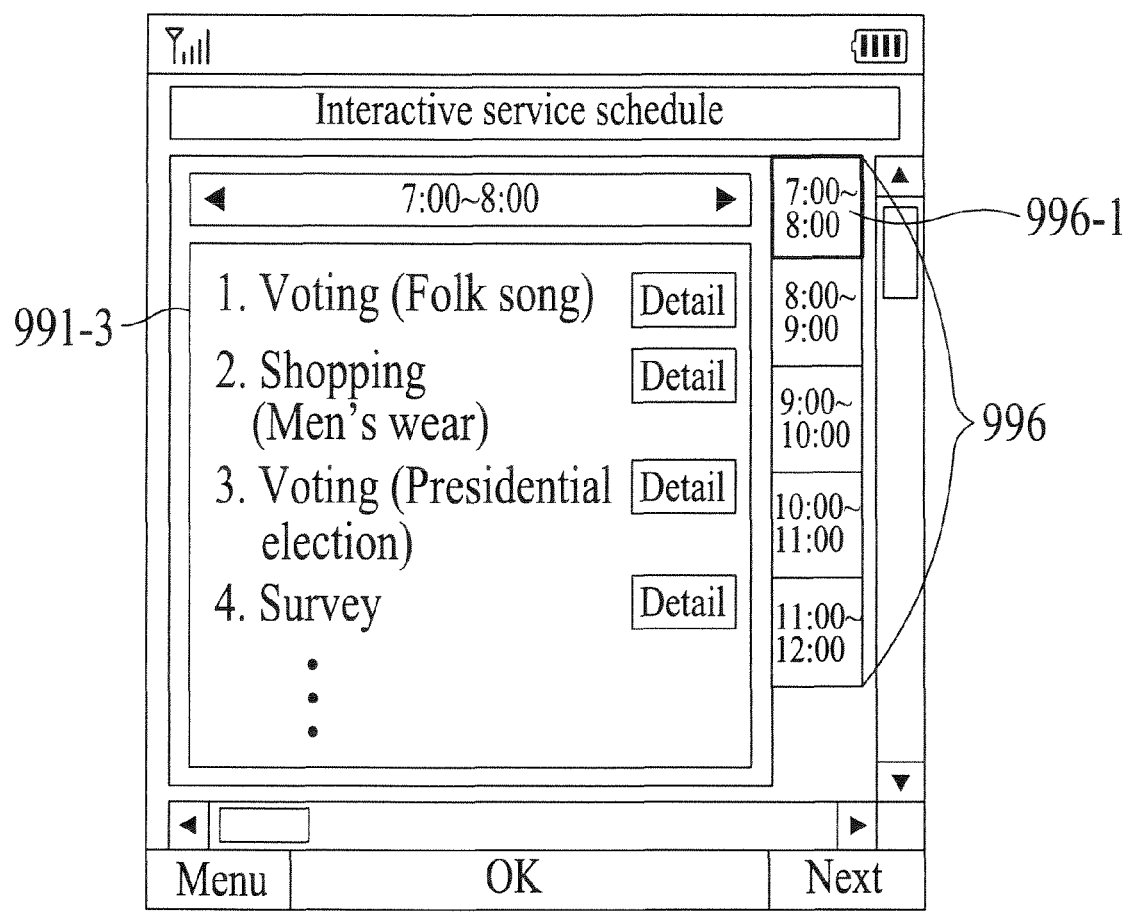
Figure 9L:
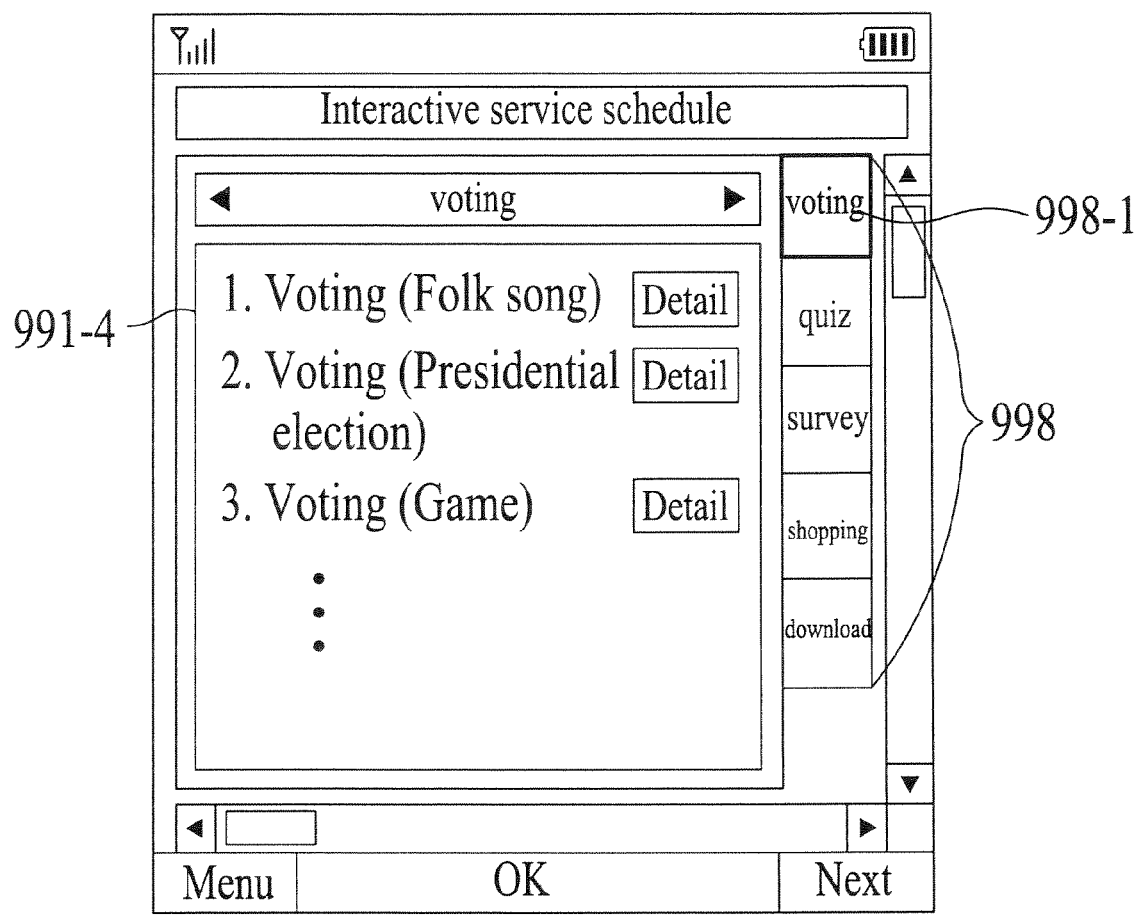

FIGS. 9J, 9K, and 9L each display different selections of interactive services. For example, interactive services 991-2 associated with a selected channel 994-1 selected from a list of channels 994 is displayed in FIG. 9J; interactive services 991-3 associated with a selected time period 996-1 selected from a list of time periods 996 is displayed in FIG. 9K; and interactive services 991-4 associated with a selected interactive service type 998-1 selected from a list of interactive service types 998 is displayed in FIG. 9L.

Referring again to FIG. 5, the mobile terminal 100, responding to the input unit 130, may select an interactive service associated with a specific broadcast program according to the broadcast organization information according to which interactive service information is displayed (S519). The terminal is also able to select an interactive service from the interactive lists displayed in FIGS. 9I to 9L.

When the user input unit 130 includes a touchscreen and the display 151, for example, the mobile terminal 100 is able to select an interactive service, using the touchscreen.

The interactive service may be selected (S519) if a broadcast program associated with the interactive service is selected from a plurality of broadcast programs shown in the broadcast organization information. For instance, the mobile terminal 100 displays detailed information and contents of the selected interactive service.

Of course, before a specific interactive service is selected, the mobile terminal 100 displays type information of an interactive service associated with a broadcast program on the broadcast organization information.

The mobile terminal 100 may also schedule a future time for the execution of the selected interactive service. A user may provide a command to schedule the future execution of the interactive service. (S521)

Since information on a broadcast time of a scheduled broadcast program and the associated interactive service is stored in the memory 160 in advance, the mobile terminal 100 may execute the scheduled broadcast program and the associated interactive service at a future time.

The details of the interactive service selection step S519 and the interactive service scheduling (S521) are explained with reference to the accompanying drawings.

FIGS. 10A to 10E are diagrams of first images for displaying a reserving process for interactive service information in a mobile terminal according to one embodiment of the present invention. For clarity and convenience, the description is with respect to an interactive service limited to 'Survey' and 'Quiz' only. It is understood that the present invention is applicable to any type of interactive service.

Figure 10A:
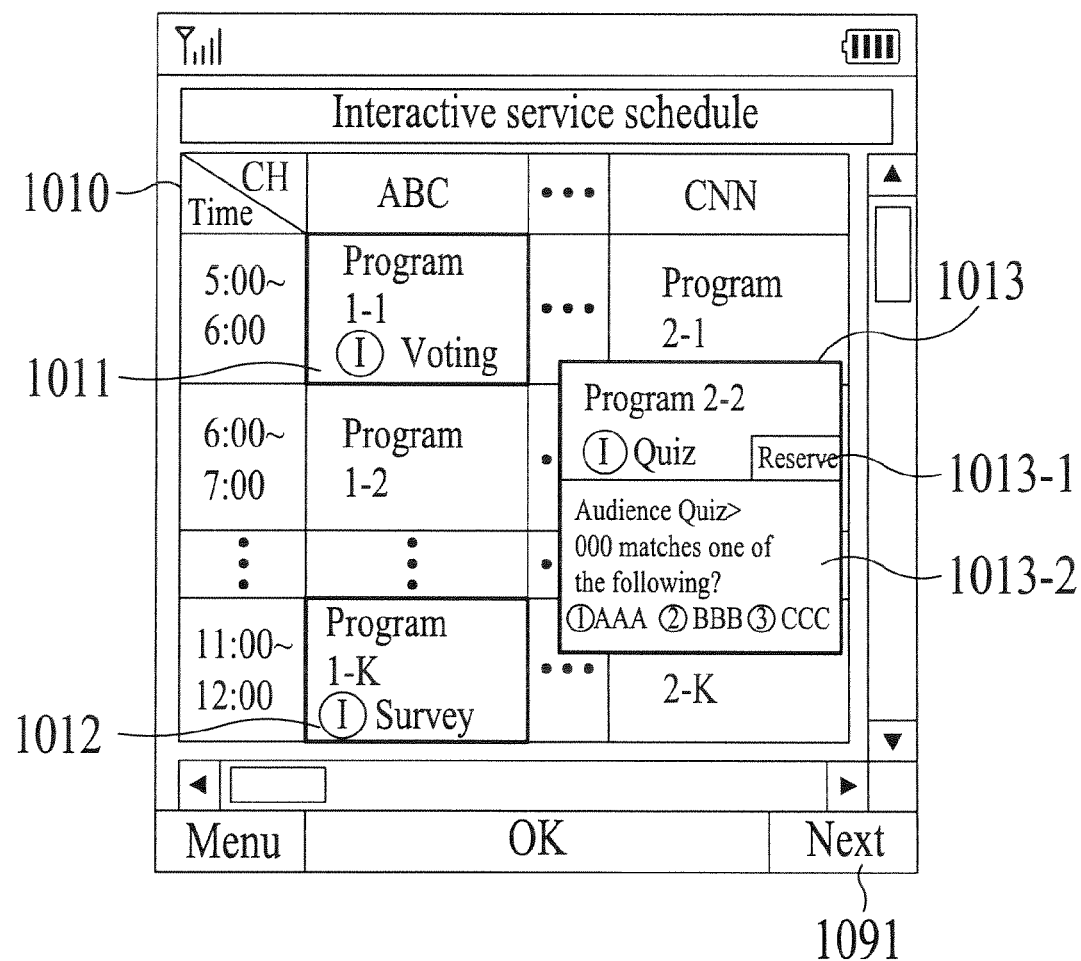
FIGS. 10A to 10F are diagrams of first images for displaying a scheduling process for interactive service information in a mobile terminal according to one embodiment of the present invention.

Referring to FIG. 10A, an interactive service 'Quiz' associated with a specific broadcast program 'program 2-2' 1013 displayed according to broadcast organization information 1010 is selected, the mobile terminal 100 displays a quiz content 1013-2 as detailed information on the 'Quiz'. If the 'Reserve' 1013-1 for the quiz is selected by a user, the mobile terminal 100 reserves an execution of the 'Quiz'.

Figure 10B:
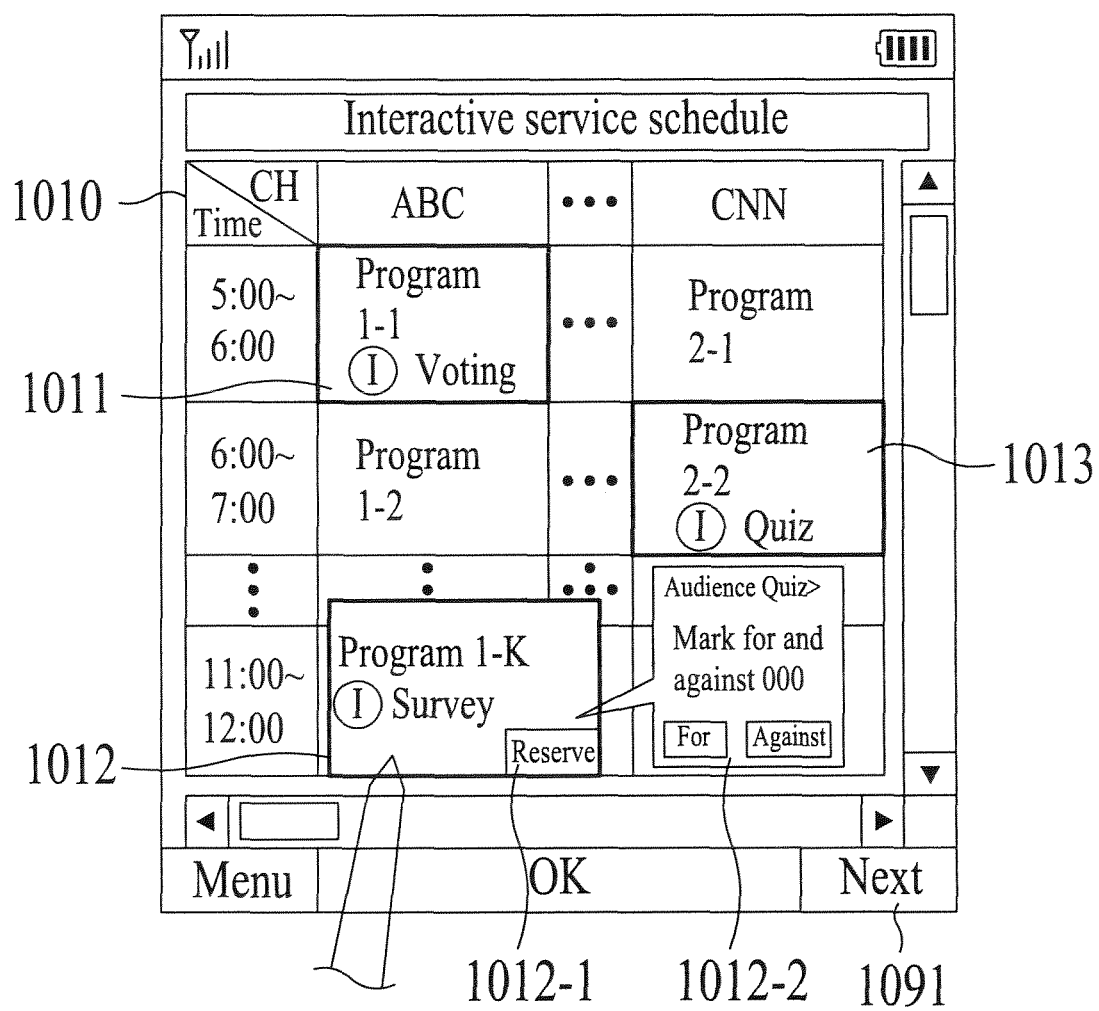

Referring to FIG. 10B, when an interactive service 'survey' associated with a specific broadcast program 'Program 1-K' 1012 displayed according to broadcast organization information 1010 is selected, the mobile terminal 100 displays survey content 1012-2 as detailed information on the 'survey'. If 'Reserve' 1012-1 for the survey is selected by a user, the mobile terminal 100 schedules the execution of the 'Survey'.

Figure 10C:
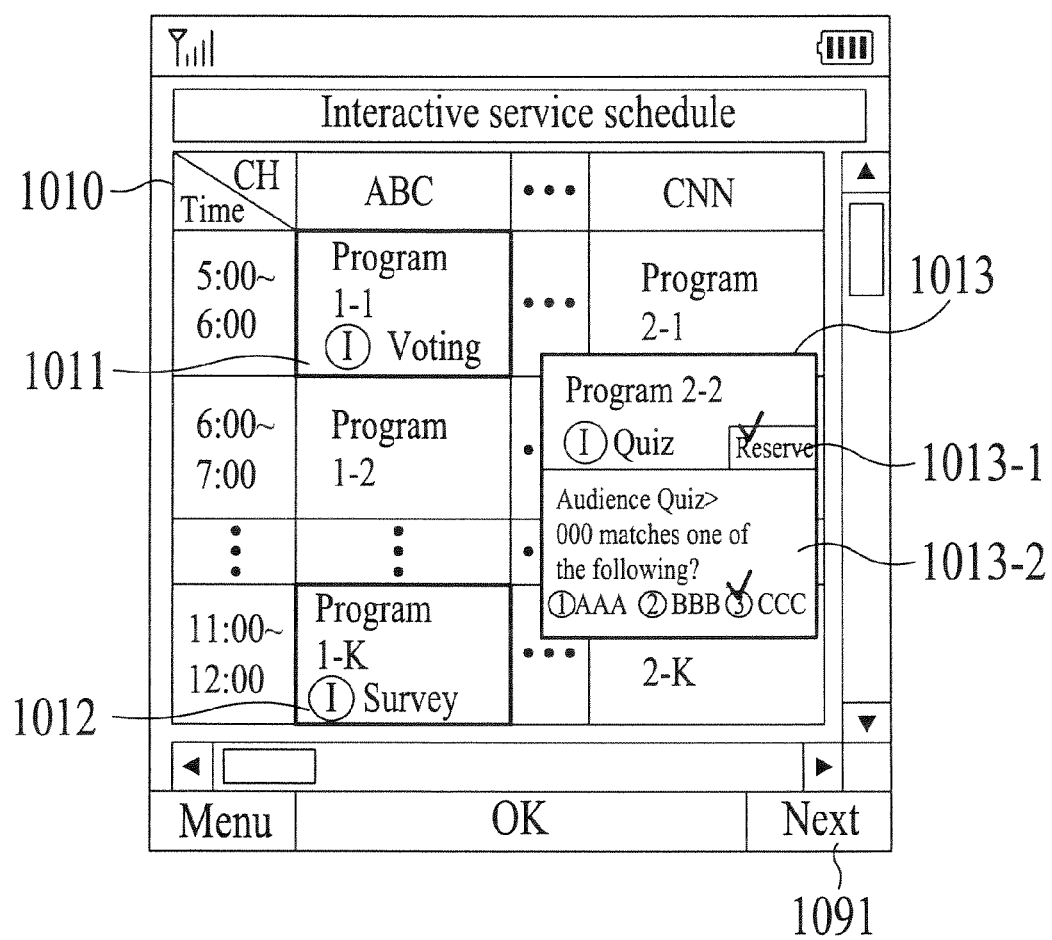
Figure 10D:
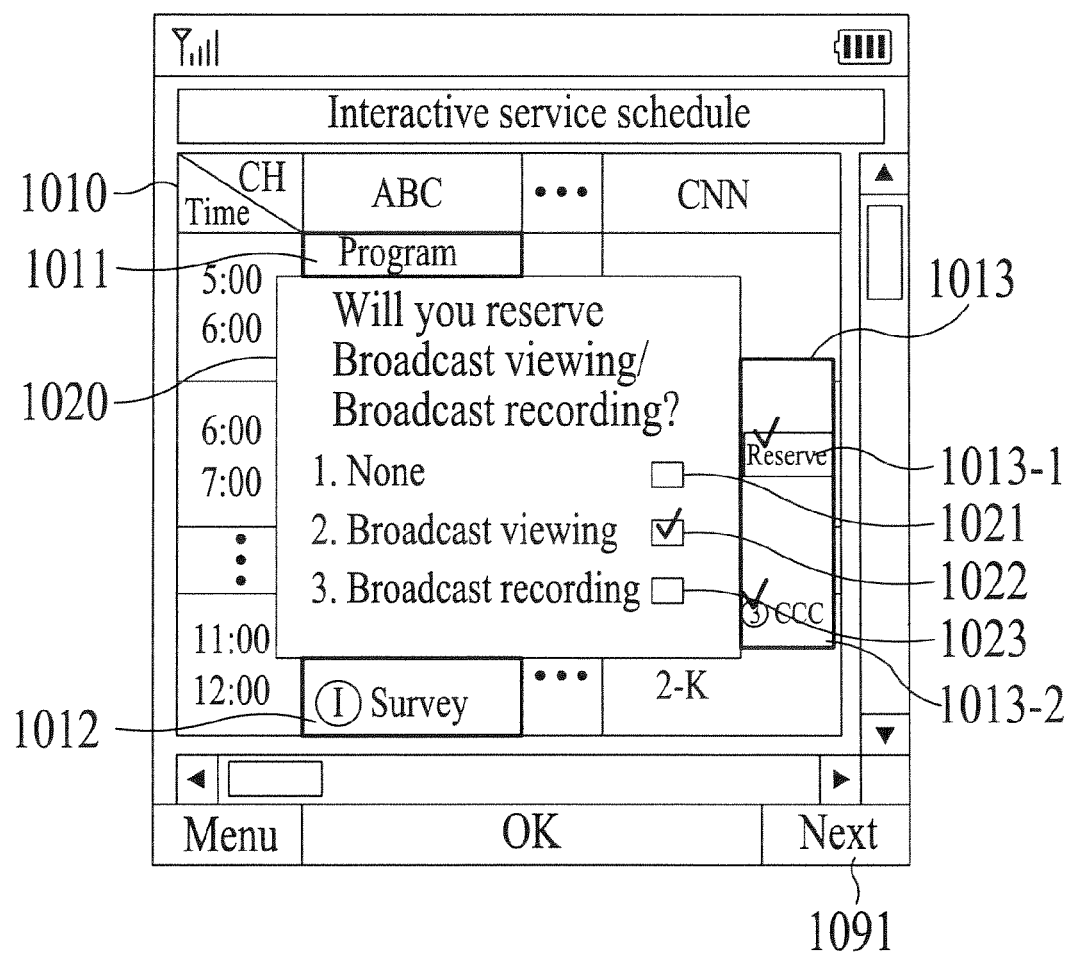

Referring to FIG. 10C, when 'Reserve' 1013-1 for an interactive service 'Survey' associated with a specific broadcast program 'Program 2-2' 1013 displayed according to broadcast organization information 1010 is selected, the mobile terminal 100 schedules the execution of the 'Survey'. For the 'Program 2-2' associated with the scheduled 'Survey', the mobile terminal 100 selects one of 'None' 1021, 'Broadcast viewing' 1022, and 'Broadcast recording' 1023. If 'None' is set, the 'Survey' is executed only. If 'Broadcast viewing' is scheduled, the mobile terminal 100 receives and displays the scheduled 'Survey' and the 'Program 2-2'. If the 'Broadcast recording' is selected, the mobile terminal 100 receives and records the scheduled 'Survey' and the 'Program 2-2' (FIG. 10D).

A user opinion for an interactive service may not be selected with only a schedule selected. The mobile terminal 100 may automatically receive and display a broadcast program associated with a scheduled interactive service. A user joins the scheduled interactive service while viewing the associated broadcast program.

Figure 10E:
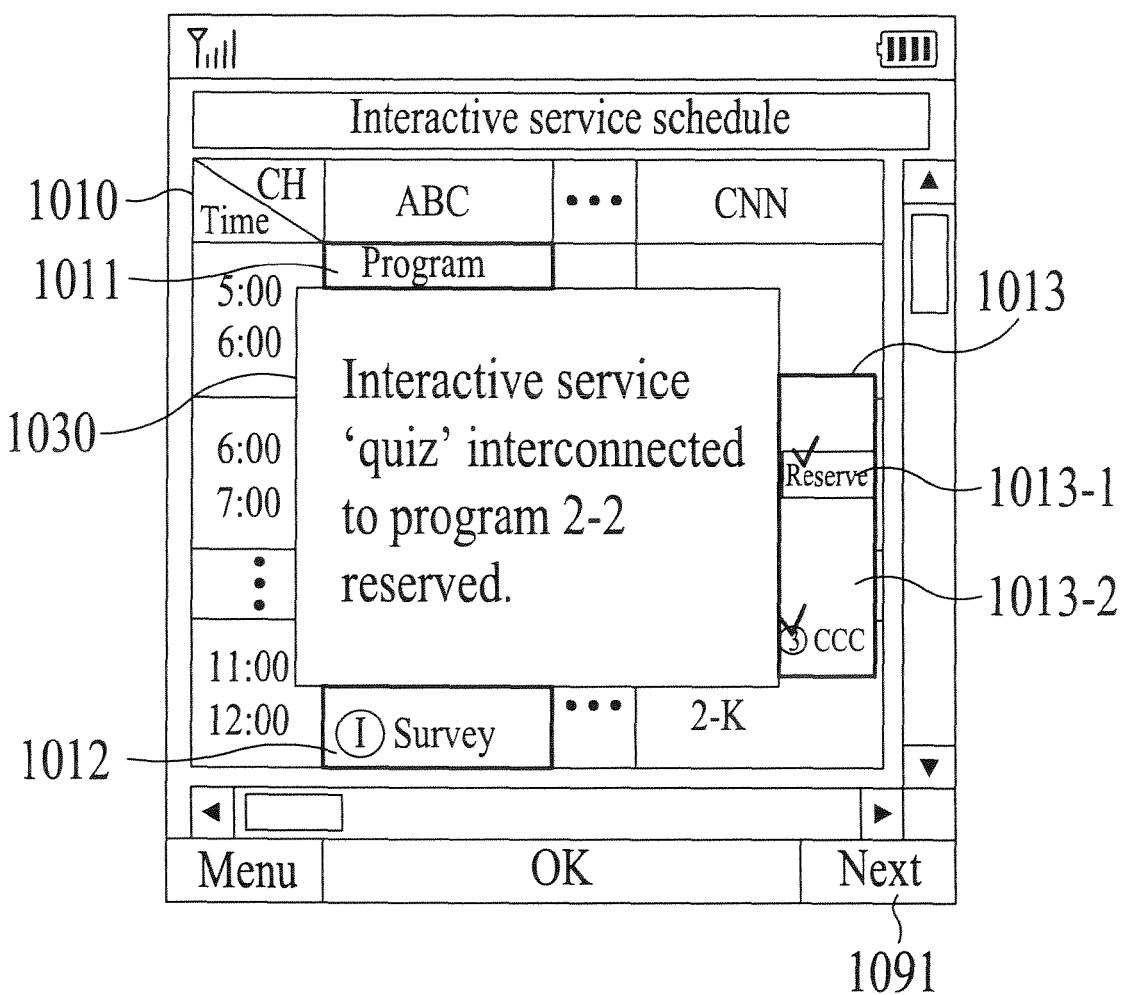

If the schedule of the interactive service is successfully executed, the mobile terminal 100 displays a statement 1030 announcing that the schedule of the interactive service has been completed (FIG. 10E).

Figure 10F:
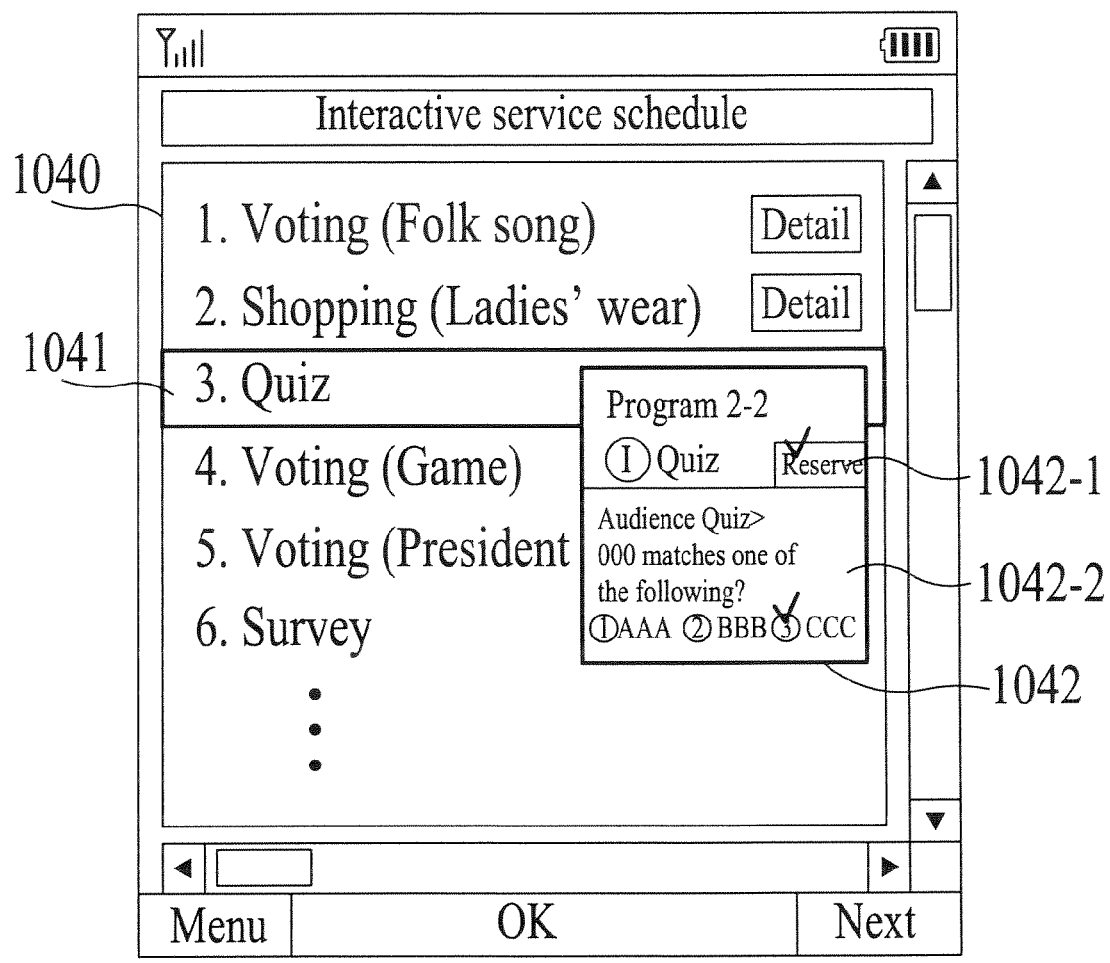

Referring to FIG. 10F, if an interactive service "Quiz" 1041 is selected from an interactive list 1040, the mobile terminal 100 displays the quiz content 1042-2. If 'Reserve' 1042-1 for the quiz is selected by a user, the mobile terminal 100 reserves an execution of the 'Quiz'.

Figure 11A:
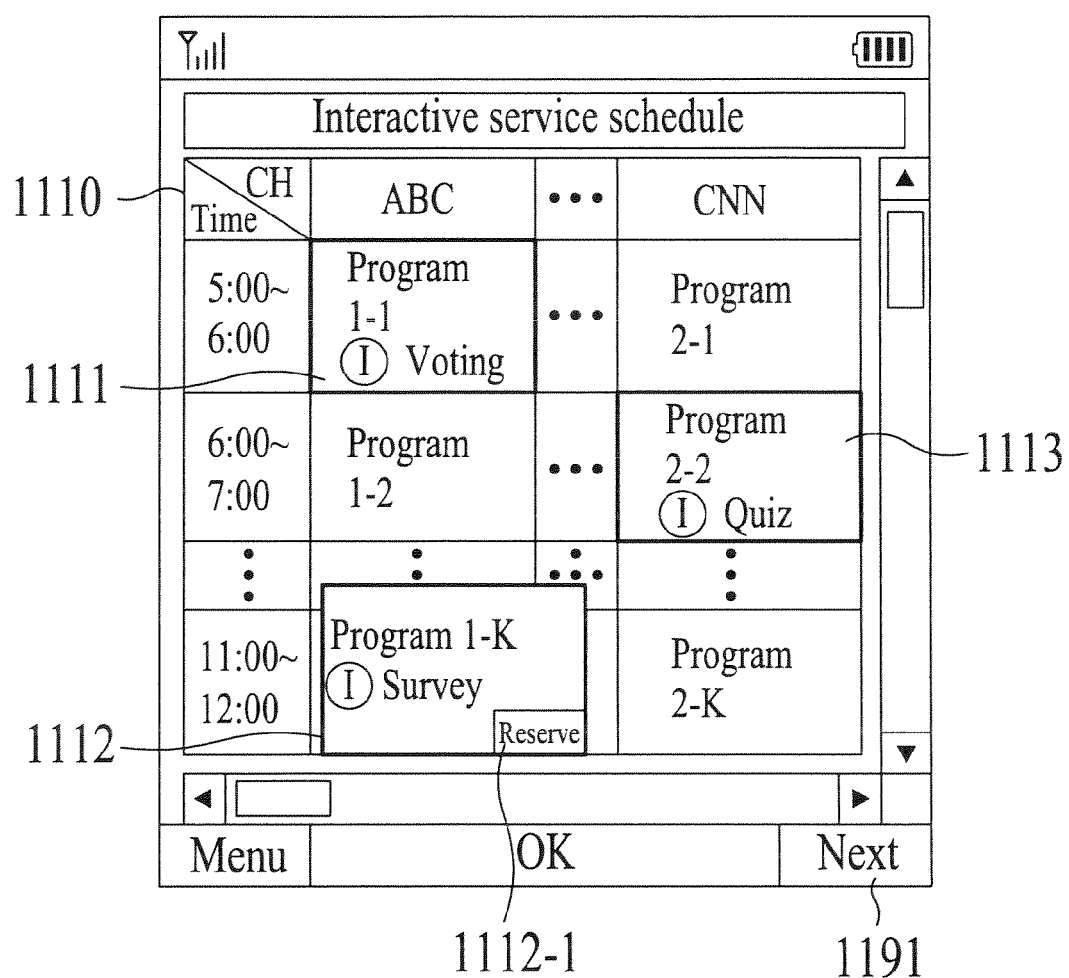
FIGS. 11A to 11C are diagrams of second images for displaying a scheduling process for interactive service information in a mobile terminal according to one embodiment of the present invention.
Figure 11B:
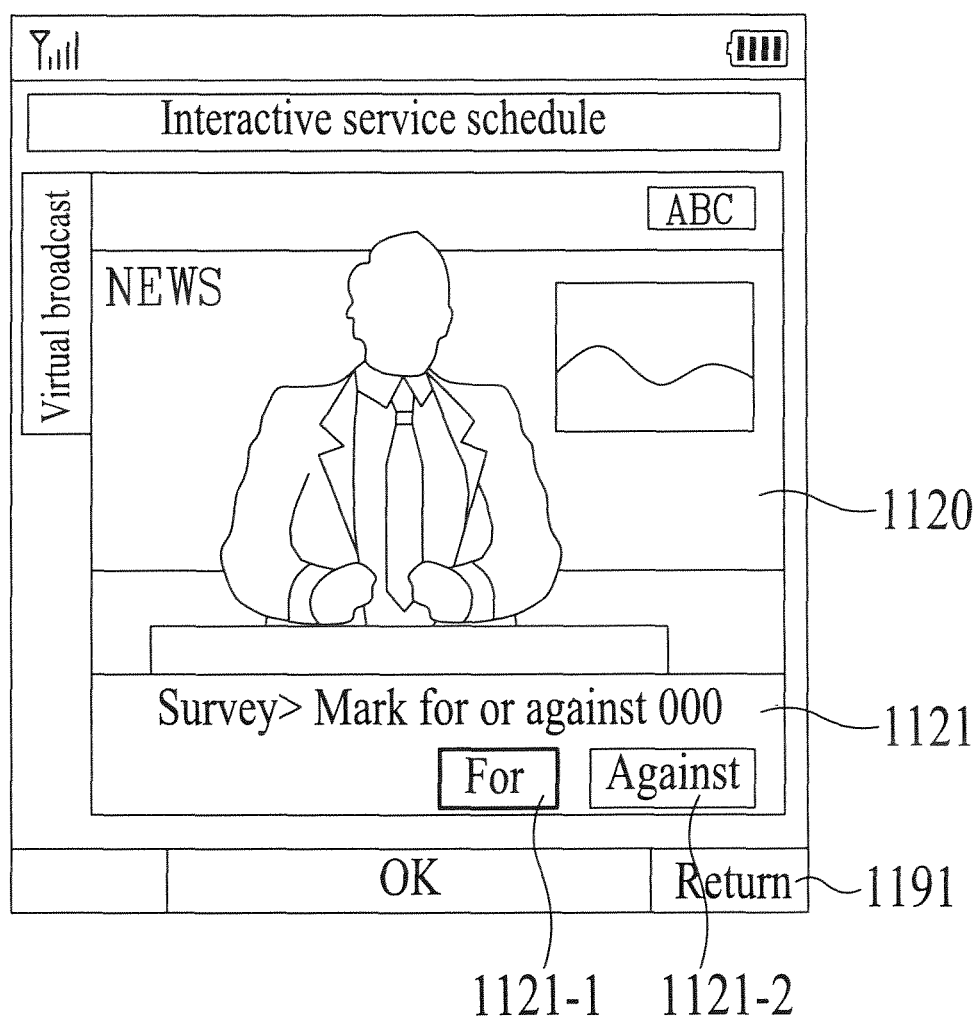
Figure 11C:
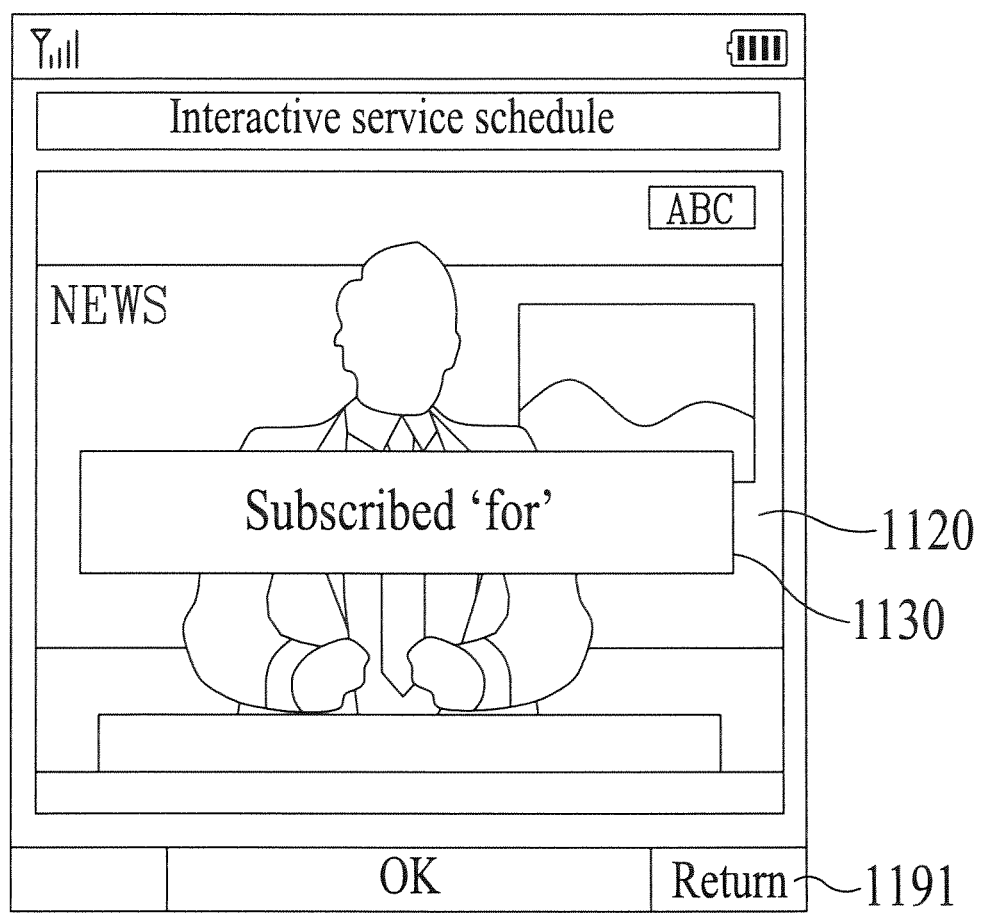

FIG. 11A to FIG. 11C show second images for displaying a scheduling process for interactive service information in a mobile terminal according to one embodiment of the present invention.

Referring to FIG. 11A, if an interactive service associated with a specific broadcast program 'Program K-1' 1112 displayed according to broadcast organization information 1110 is selected, the mobile terminal 100 displays survey content 1112-1.

If 'Reserve' 1112-1 for the survey is selected by a user, the mobile terminal 100, as shown in FIG. 11B, displays the 'Survey' 1121 on a lower portion of the screen by displaying a virtual broadcast program 1120. The user may respond to the survey, the mobile terminal 100 displays an acknowledgement 1130 shown in FIG. 11C

Referring again to FIG. 5, the mobile terminal 100 indicates a scheduled interactive service using the alarm 153 (S523). The mobile terminal 100 uses vibration, an alarm sound, a lamp flickering, a voice, or a popup window to indicate the scheduled interactive service (S523). Although an application is being executed with or without a standby mode, the mobile terminal 100 displays an indicator indicating an interactive service on a prescribed area of a screen.

The interactive service may be scheduled for execution at a predetermined time ahead of a start time of the interactive service, periodically, or randomly. The predetermined time can be determined by the user or automatically by the mobile terminal 100. Moreover, the mobile terminal 100 announces a broadcast cancellation or a broadcast time change via the alarm 153.

Indicating a scheduled interactive service (S523) is explained with reference to the accompanying drawings.

Figure 12A:
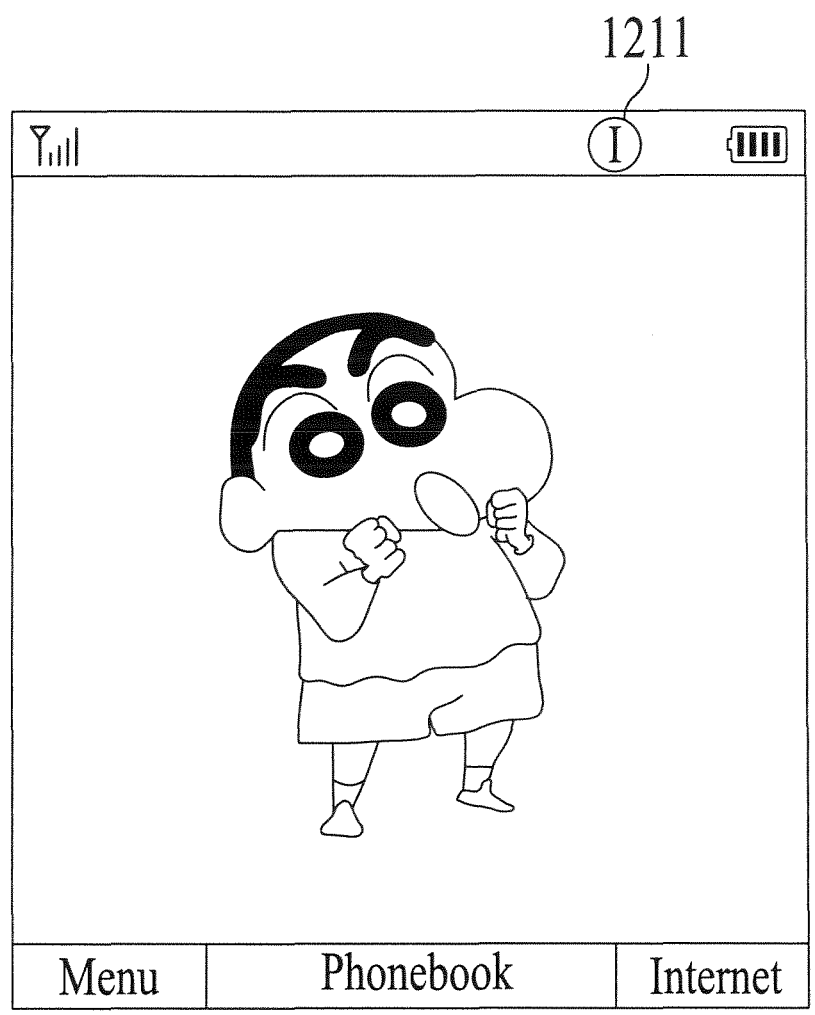
FIGS. 12A to 12H are diagrams for providing alarm information in conjunction with a scheduled interactive service in a mobile terminal according to one embodiment of the present invention.

FIGS. 12A to 12H are diagrams for providing alarm information to a user in conjunction with an interactive service scheduled in a mobile terminal according to one embodiment of the present invention. Referring to FIG. 12A, the mobile terminal 100 in a standby mode displays an indicator 1211 indicating that there is a scheduled interactive service.

Figure 12B:
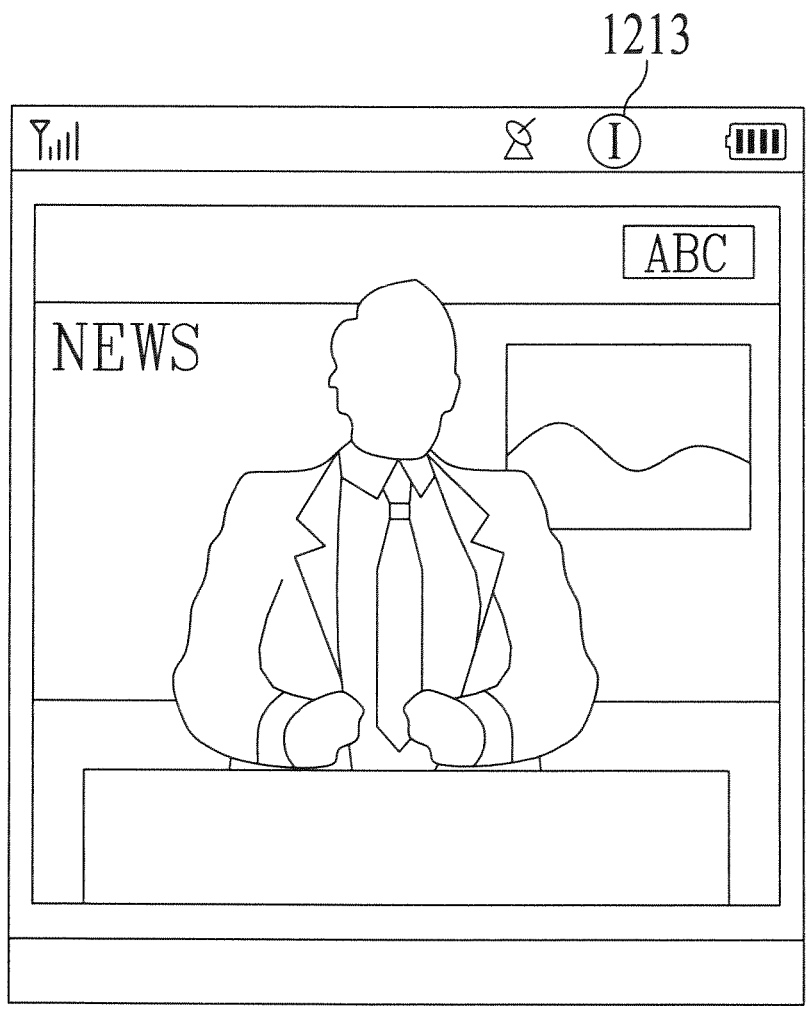

As shown in FIGS. 12A and 12B, the mobile terminal 100 displays an indicator 1211 when there is a scheduled interactive service on the screen while a broadcast is being displayed. For instance, the indicator 1211 can be set to blink or increase in size as a starting time for the scheduled interactive service nears. Alternatively, the indicator 1211 can be set to be displayed periodically despite being always displayed in a standby screen mode.

A plurality of indicators 1211 may be displayed depending upon the number of scheduled interactive services. In this case, colors or shapes of the indicators can be displayed different from each other in accordance with interactive service types. When an indicator 1211 is selected, the indicator displays detailed information on a scheduled interactive service as well.

Figure 12C:
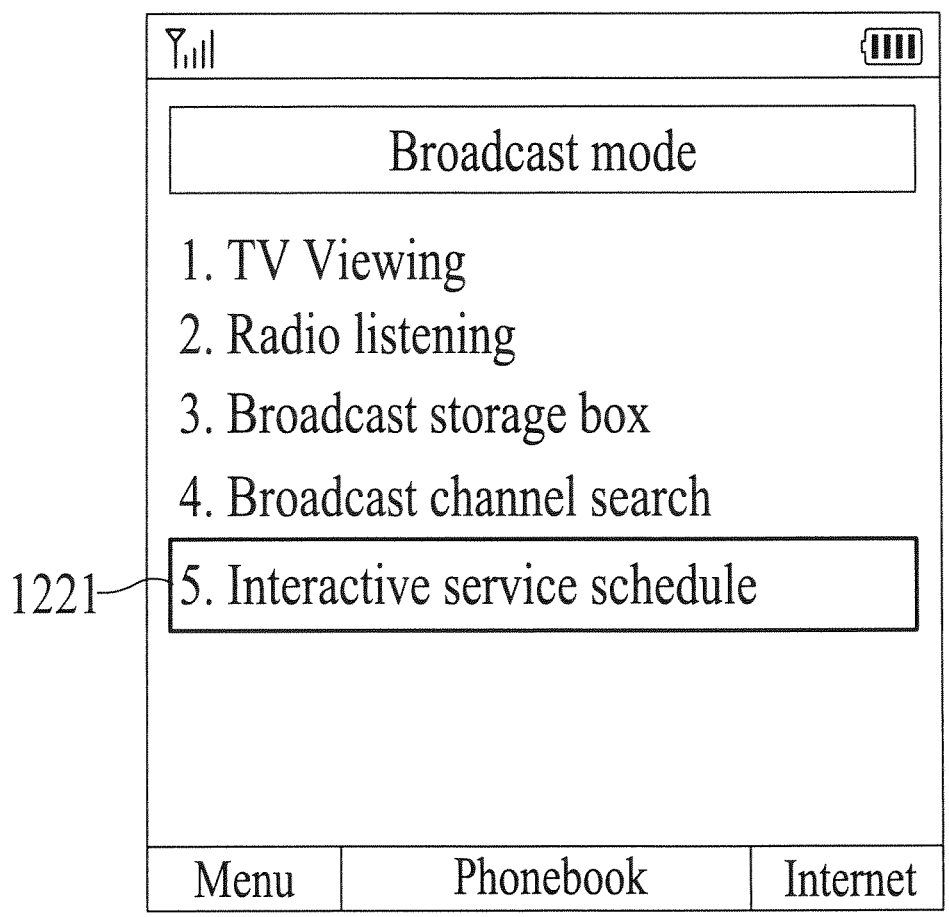
Figure 12D:
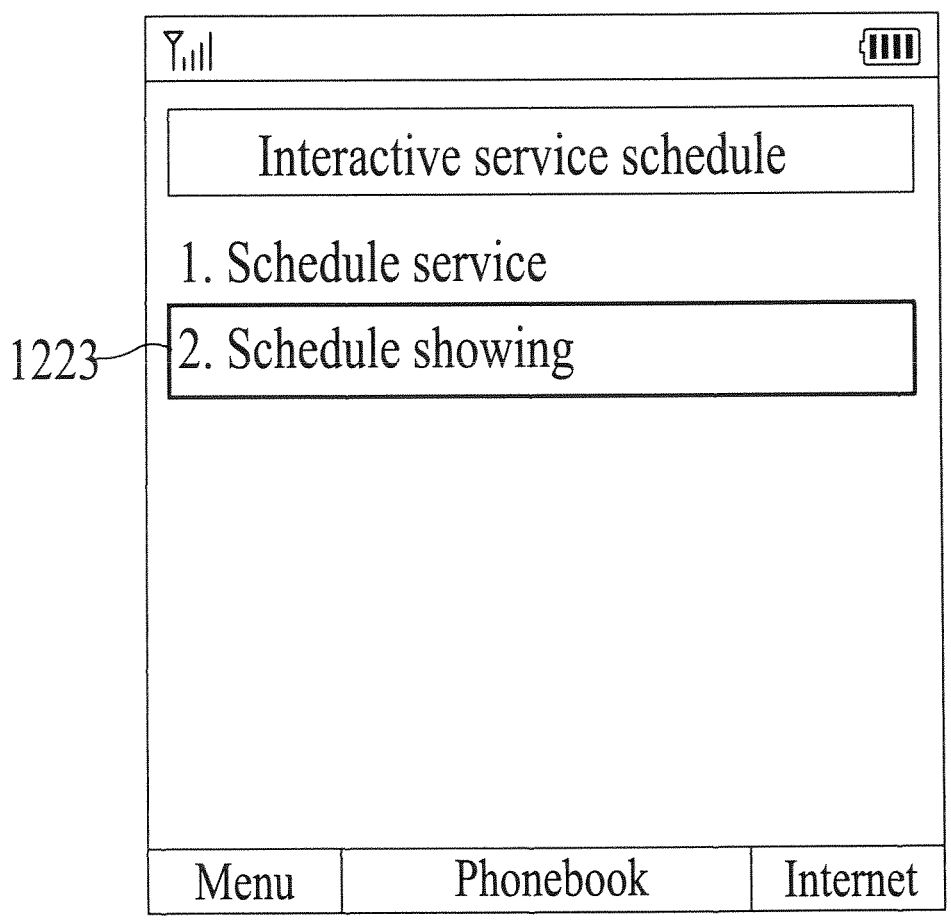
Figure 12E:
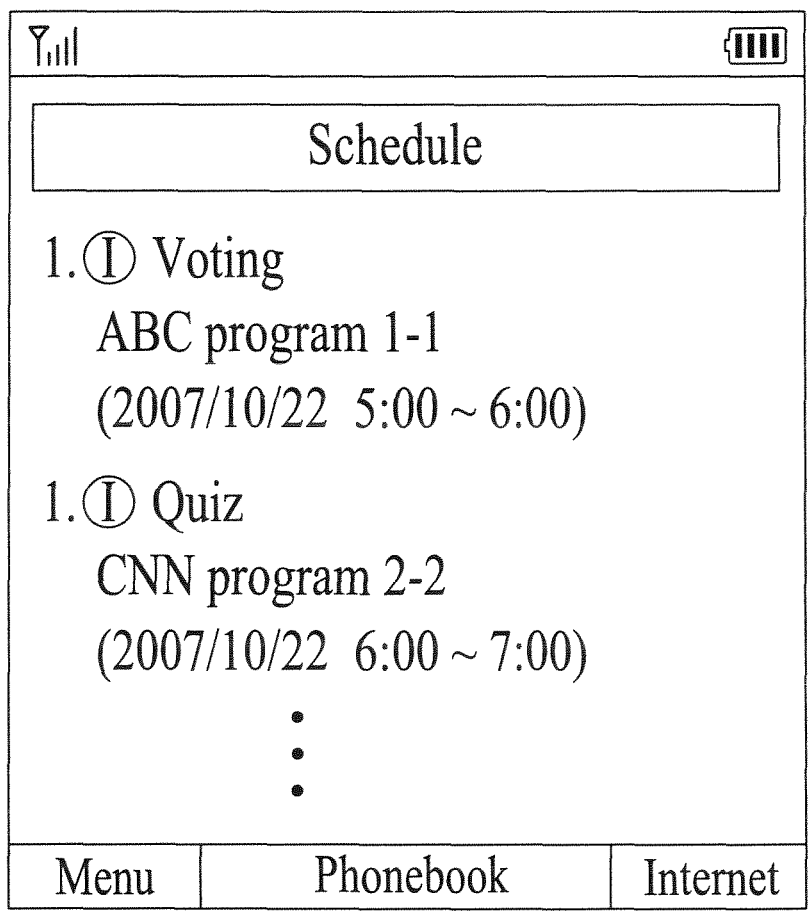

Referring to FIGS. 12C to 12E, as a broadcast mode is entered, if a 'Schedule' item is selected from 'Interactive service schedule', the mobile terminal 100 displays a list of the scheduled interactive services on a screen. A user is able to confirm information on a scheduled interactive service at any time.

Figure 12F:
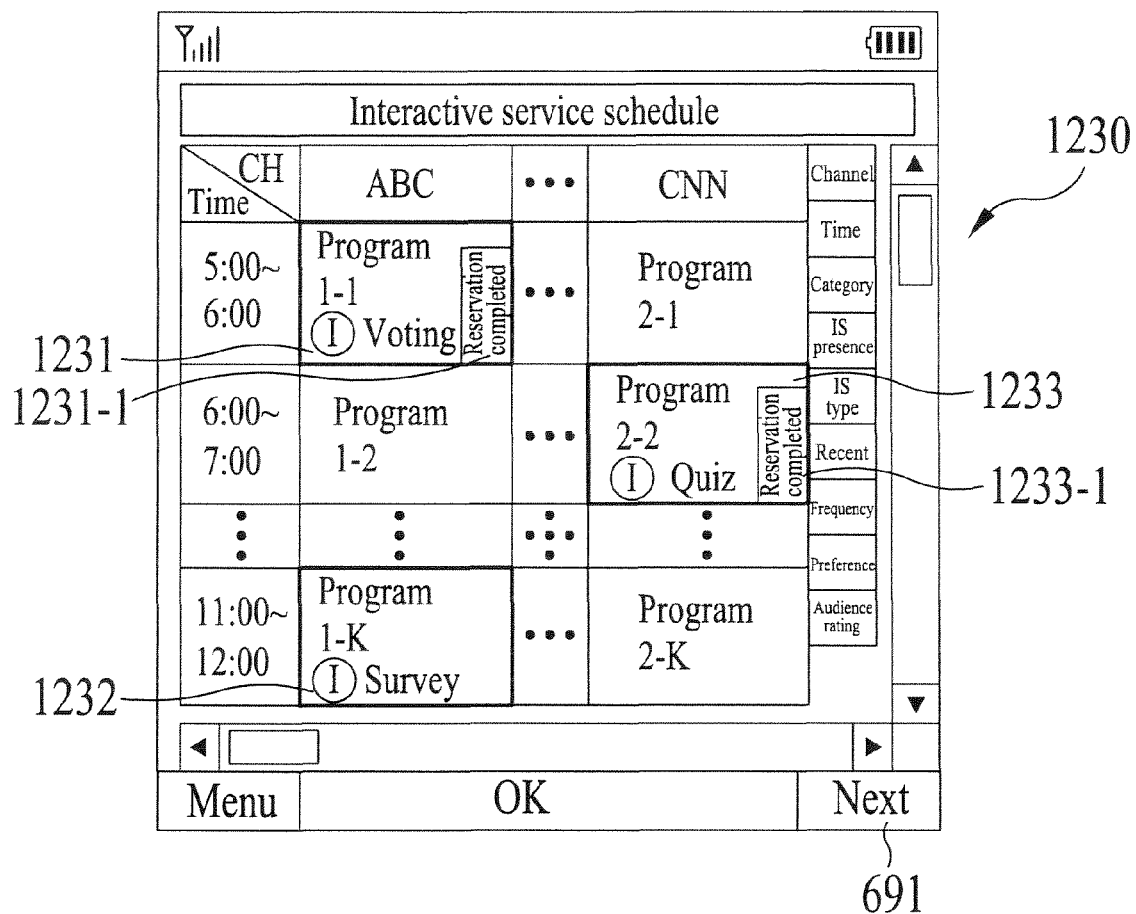

Referring to FIG. 12F, the mobile terminal 100 displays scheduled interactive services 1231, 1232 and 1233 identified on the broadcast organization information 1230. A user is able to confirm information on a scheduled interactive service using the broadcast organization information.

Figure 12G:
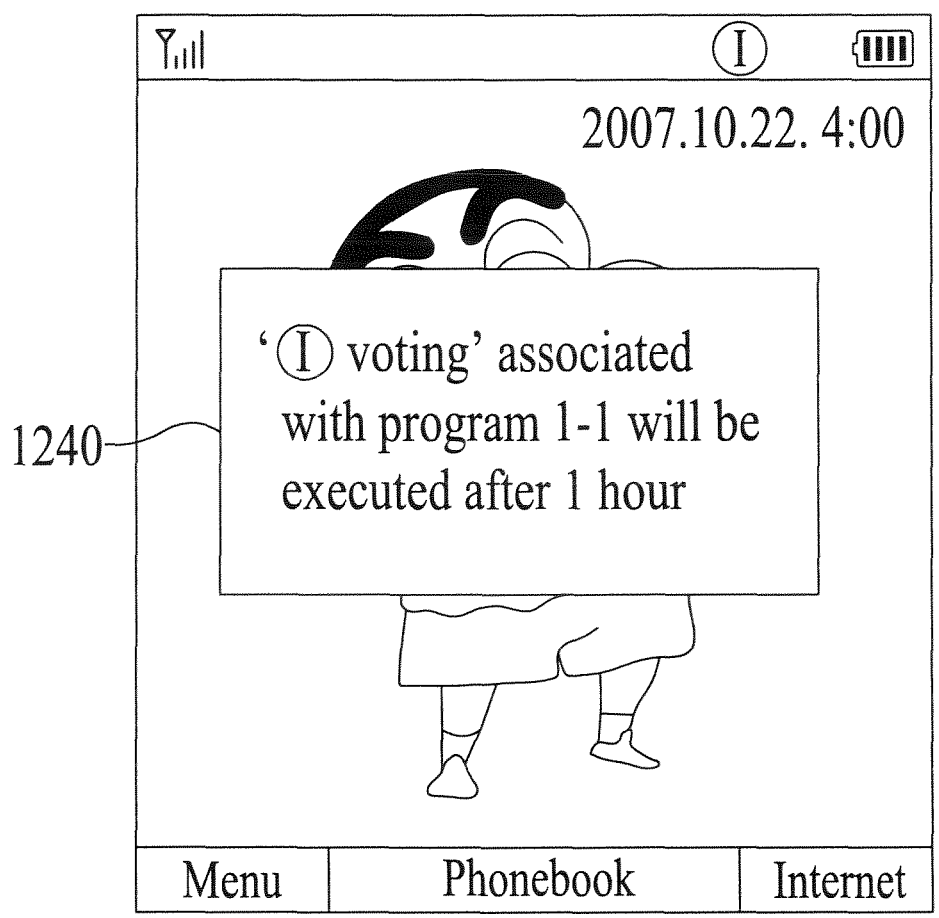

Referring to FIG. 12G, by, the mobile terminal 100 displays an indication 1240 that the scheduled interactive service will be started a predetermined period before the start time of a scheduled interactive service.

Figure 12H:
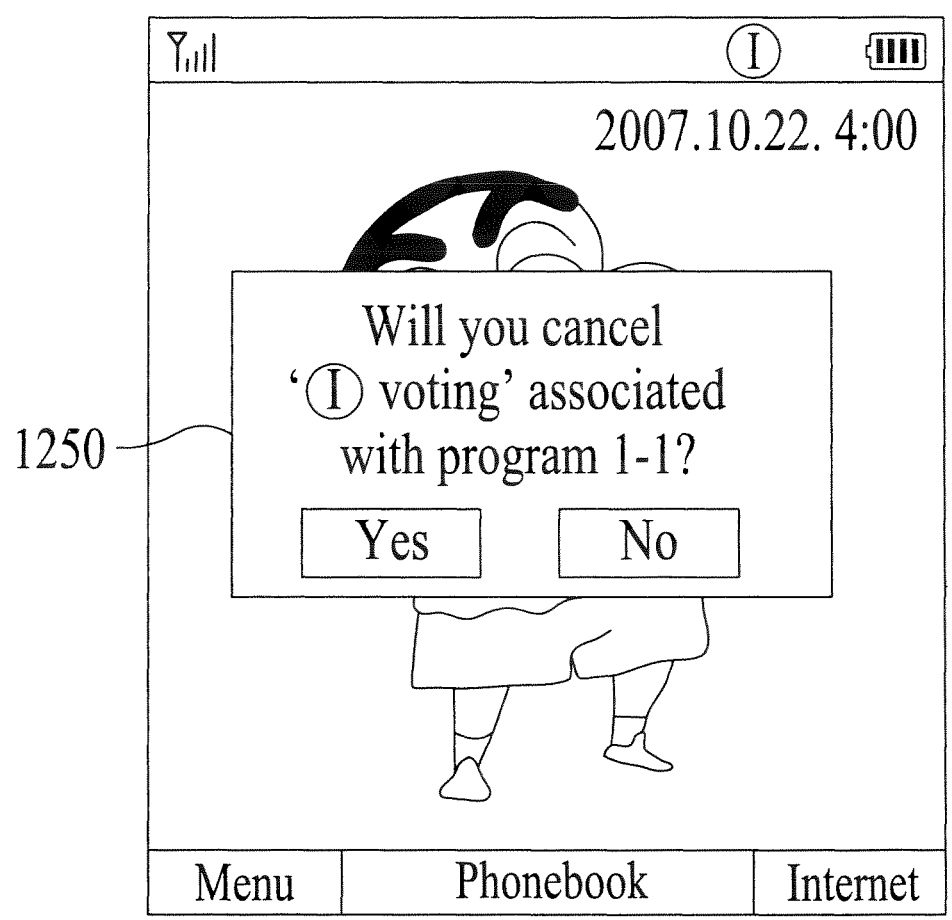

Finally, referring to FIG. 12H, the mobile terminal 100 displays a statement 1250 a predetermined period before the start time of a scheduled interactive service querying whether to cancel the scheduled interactive service. This provides an opportunity to cancel the interactive service.

The above descriptions for FIGS. 12A to 12H are applicable an application execution as well as a standby mode.

Figure 13A:
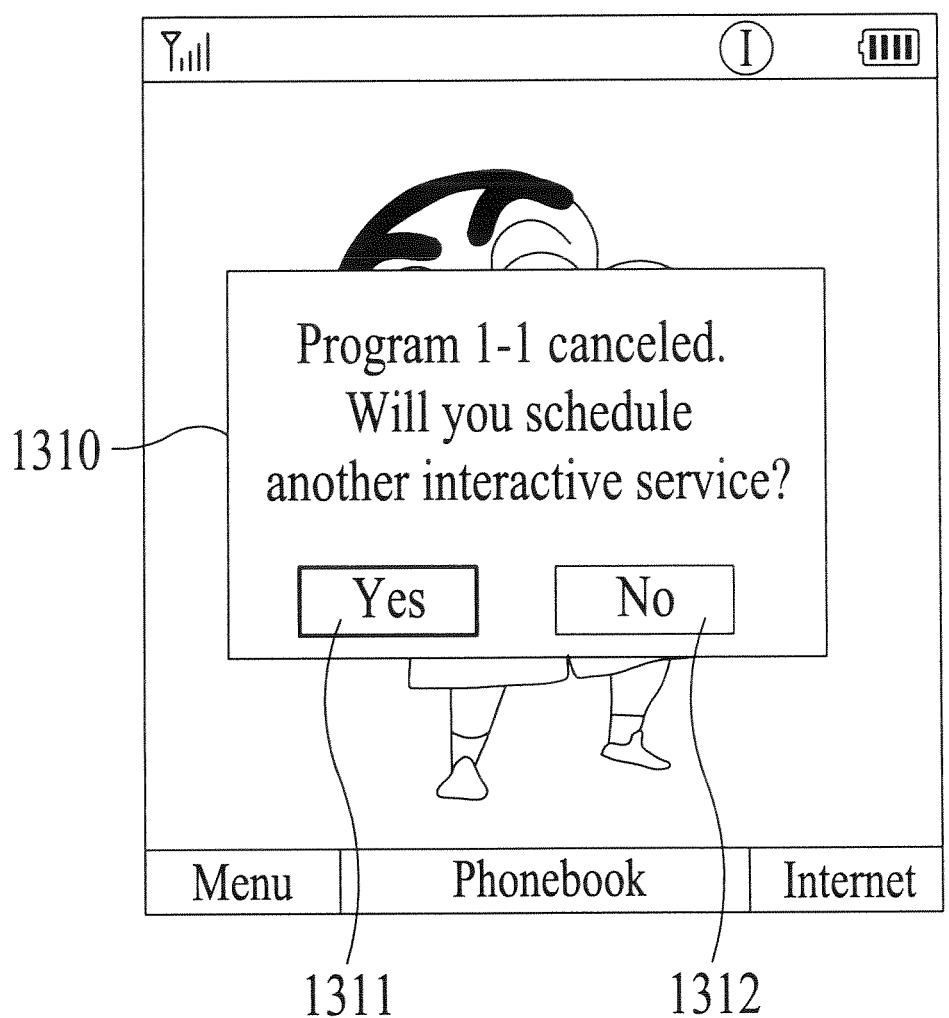
FIGS. 13A to 13C are diagrams for images of cancellation and change of a broadcast program associated with a scheduled interactive service in a mobile terminal according to one embodiment of the present invention.
Figure 13B:
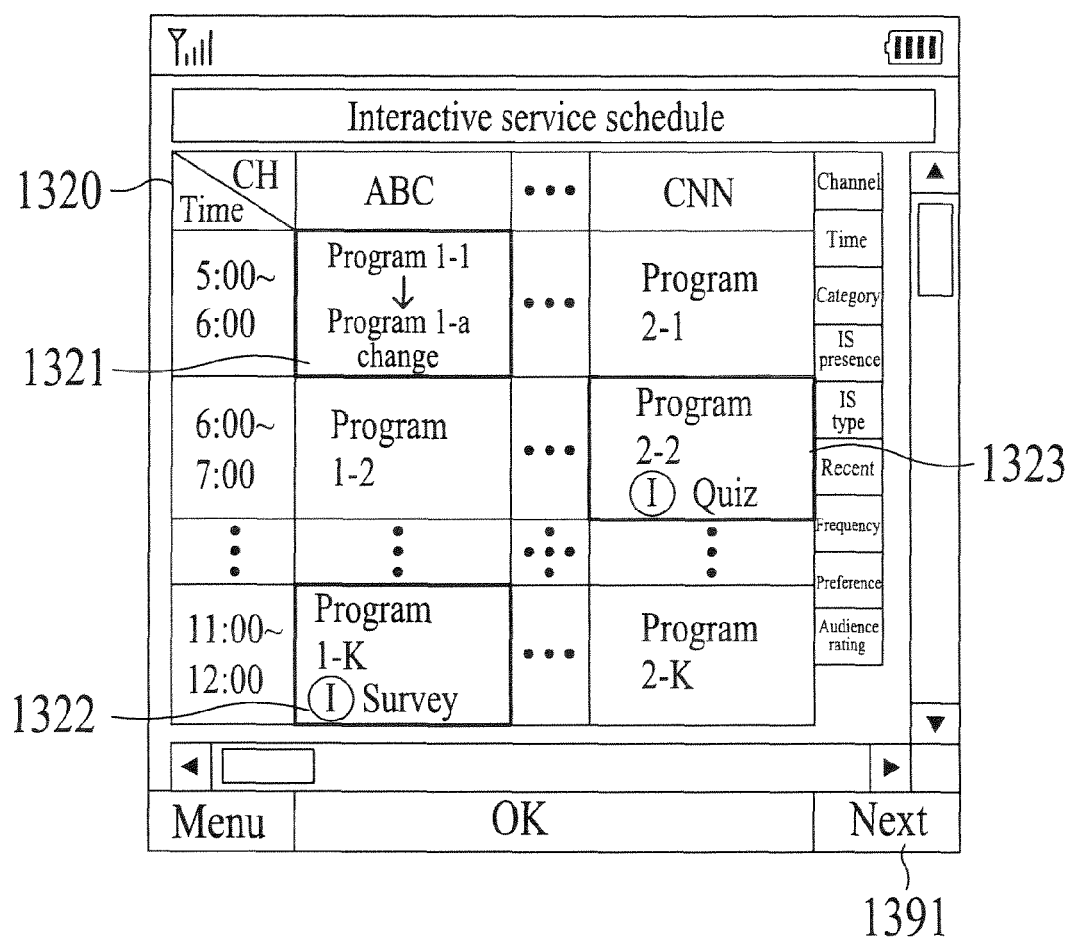
Figure 13C:
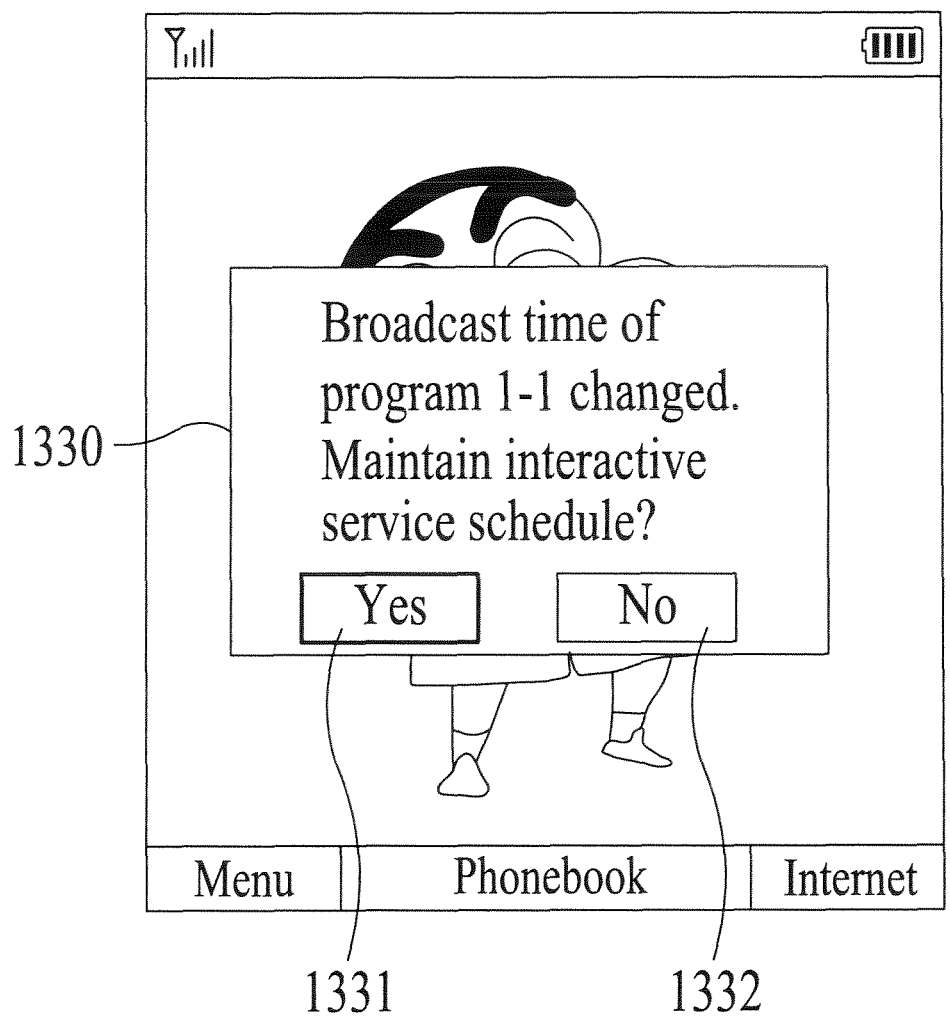

FIG. 13A to FIG. 13C show images of cancellation and change of a broadcast program associated with an interactive service scheduled in a mobile terminal according to one embodiment of the present invention.

Referring to FIG. 13A, when a broadcast program associated with a scheduled interactive service is cancelled, the mobile terminal 100 displays a statement 1310 querying whether to reserve a different interactive service as well as indicating the cancellation. If 'Yes' is selected to select a schedule, the mobile terminal 100 displays broadcast organization information 1320 in FIG. 13B, on which broadcast programs associated with an interactive service are displayed.

If 'No' is selected to cancel the broadcast program, the mobile terminal 100 displays the broadcast organization information 1320 shown in of FIG. 13B.

Referring to FIG. 13C, when changing a broadcast time of a broadcast program associated with a scheduled interactive service, the mobile terminal 100 displays a statement 1330 querying whether to maintain an interactive service schedule as well as announcing the broadcast time change.

If 'YES' is selected in FIG. 13C, the mobile terminal 100 is able to change the execution time to correspond to the changed broadcast time by maintaining the interactive service schedule. If 'NO' is selected, the mobile terminal 100 is able to cancel the interactive service schedule. When changing a broadcast time of a broadcast program associated with a scheduled interactive service, the mobile terminal 100 is able to automatically maintain an interactive service schedule to correspond with the changed broadcast time.

Referring again to FIG. 5, the mobile terminal 100 determines when a start time of a scheduled interactive service is reached (S525). The determination can be performed by the controller 180.

As mentioned in the foregoing description, the mobile terminal 100 obtains information on a broadcast time or an execution time of an interactive service and stores the obtained information in the memory 160. The mobile terminal 100 is able to recognize a start time of a scheduled interactive service using the information on the broadcast time or the execution time of the interactive service in the broadcast time, which is stored in the memory 160. For instance, the start time of the scheduled interactive service can include a broadcast start time or the start time of an interactive service in a broadcast time.

As a result of the determination, if the start time is reached, the mobile terminal 100 executes the scheduled interactive service (S527) or displays a broadcast program associated with the scheduled interactive service (S529).

Executing the interactive service (S527) or displaying the associated broadcast program (S529) is automatic when the start time is reached. Alternatively, executing the service (S527) or displaying the associated broadcast program (S529) is started if a user provides an execution command a predetermined period before of the execution start time. Executing the service (S527) can be started while an application function is operating as well as while the mobile terminal 100 is in a standby mode.

Upon completing executing the interactive service (S527), the terminal 100 is able to announce the result by displaying characters or an image using the display 151, outputting a voice or a bell sound with the audio output module 152, or outputting a vibration, a flashing light, or an alarm sound with the alarm module 153.

Executing the interactive service (S527) is explained in detail with reference to the accompanying drawings. FIGS. 14A to 14E show a process for executing a scheduled interactive service according to one embodiment of the present invention.

Figure 14A:
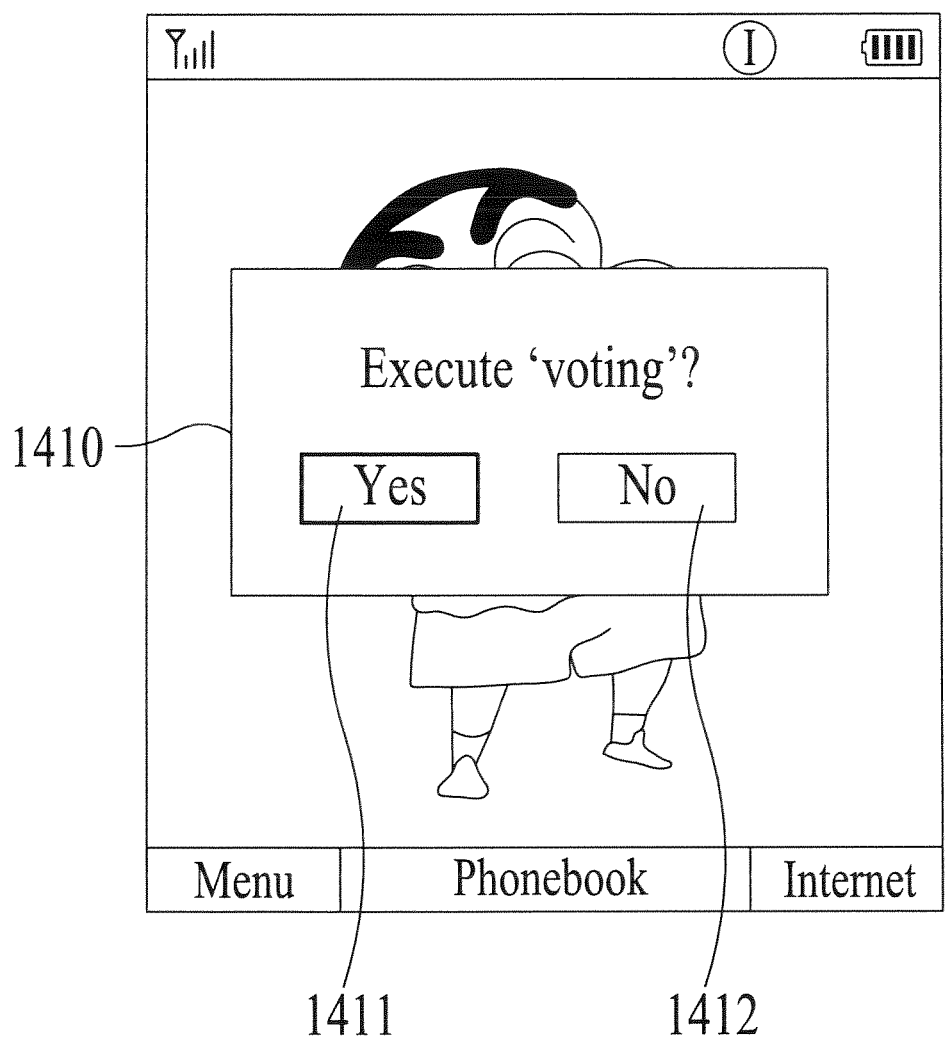
FIGS. 14A to 14E are diagrams of a screen on which a process for executing a scheduled interactive service in a mobile terminal according to one embodiment of the present invention is displayed.

Referring to FIG. 14A, if an execution start time of a scheduled interactive service 'Voting' is reached, the mobile terminal 100 displays a statement querying whether to execute 'Voting'. If 'Yes' is selected, the mobile terminal 100 executes 'Voting' and displays a progress bar showing the progress of the interactive service 'Voting' in FIG. 14B.

Figure 14B:
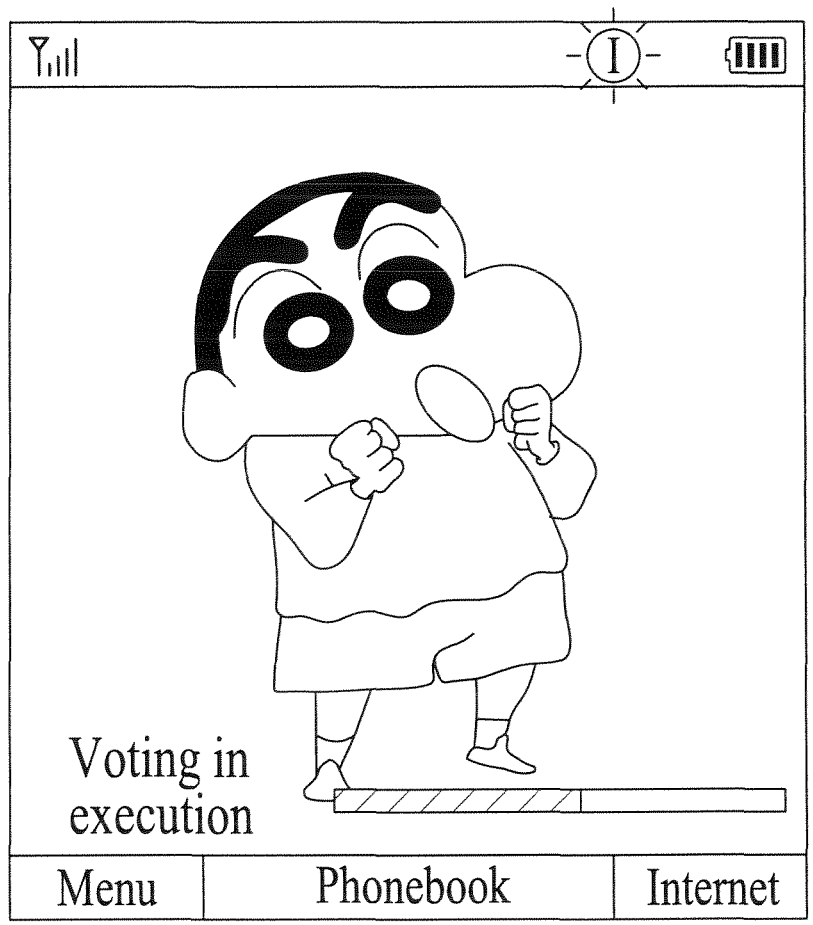
Figure 14C:
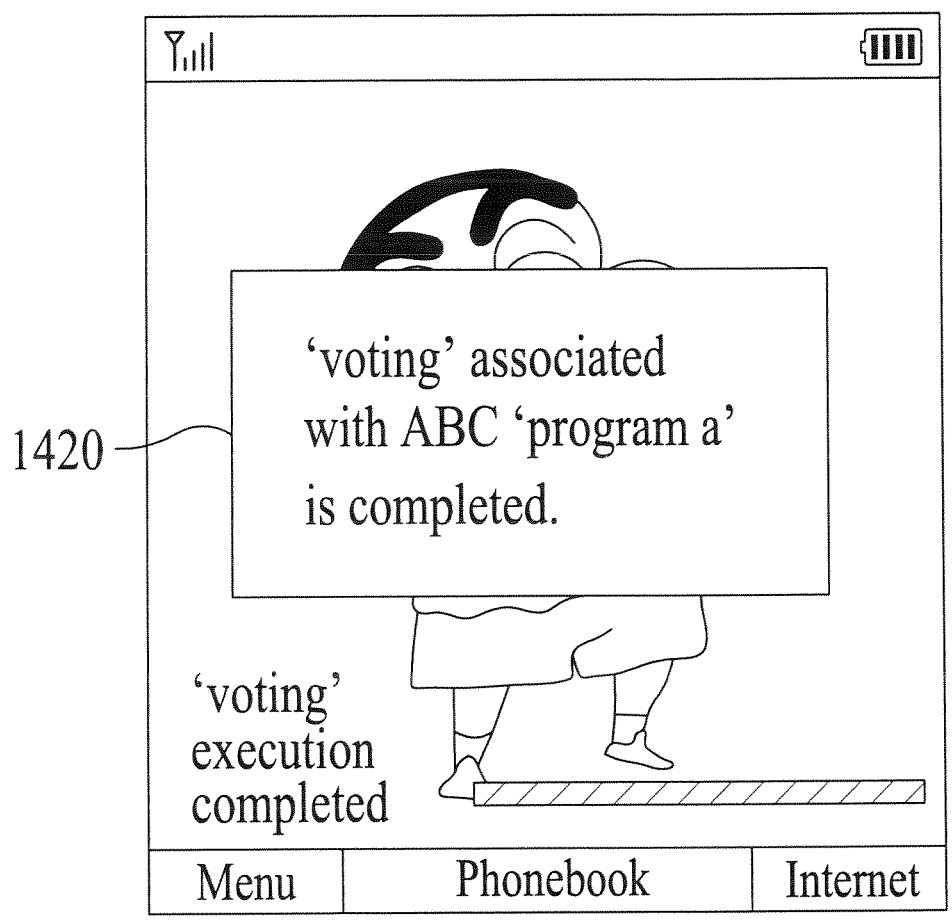

Referring to FIG. 14B, if a start time of a scheduled interactive service 'Voting' is reached, the mobile terminal 100 automatically starts 'Voting' and displays a progress extent of the process of 'Voting' on a screen. The mobile terminal 100 also displays a statement 1420 indicating that 'Voting' has been completed as illustrated in FIG. 14C.

Figure 14D:
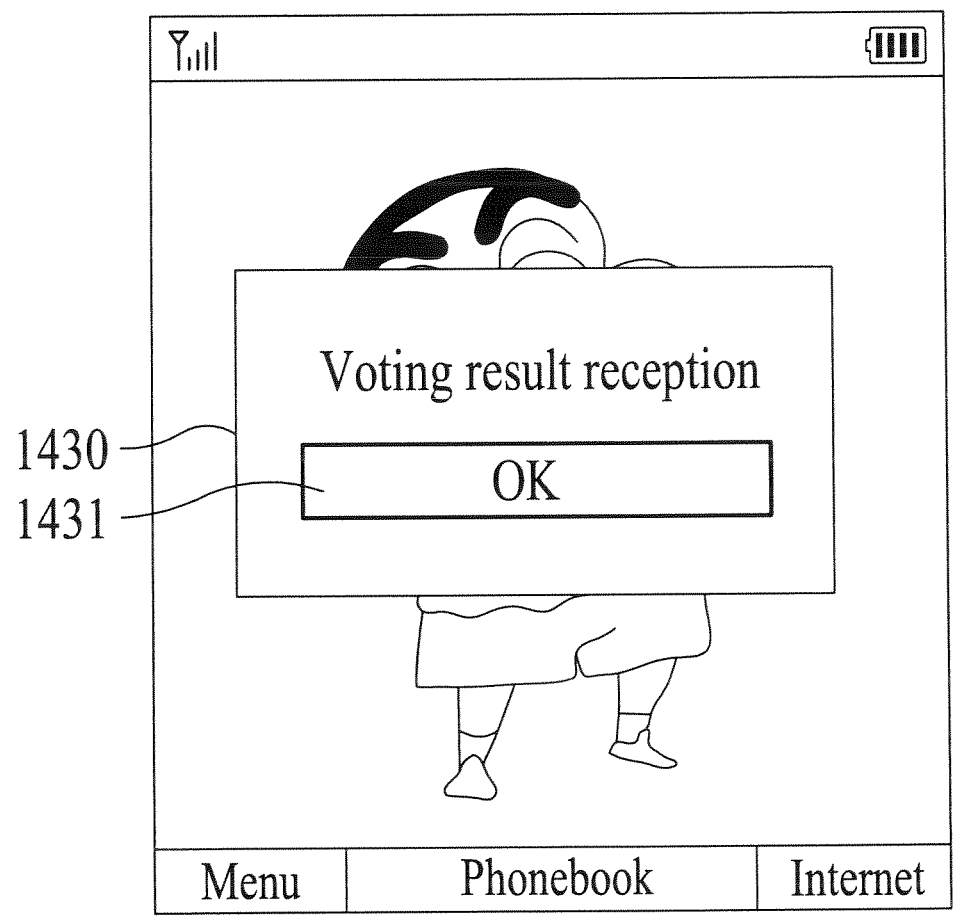
Figure 14E:
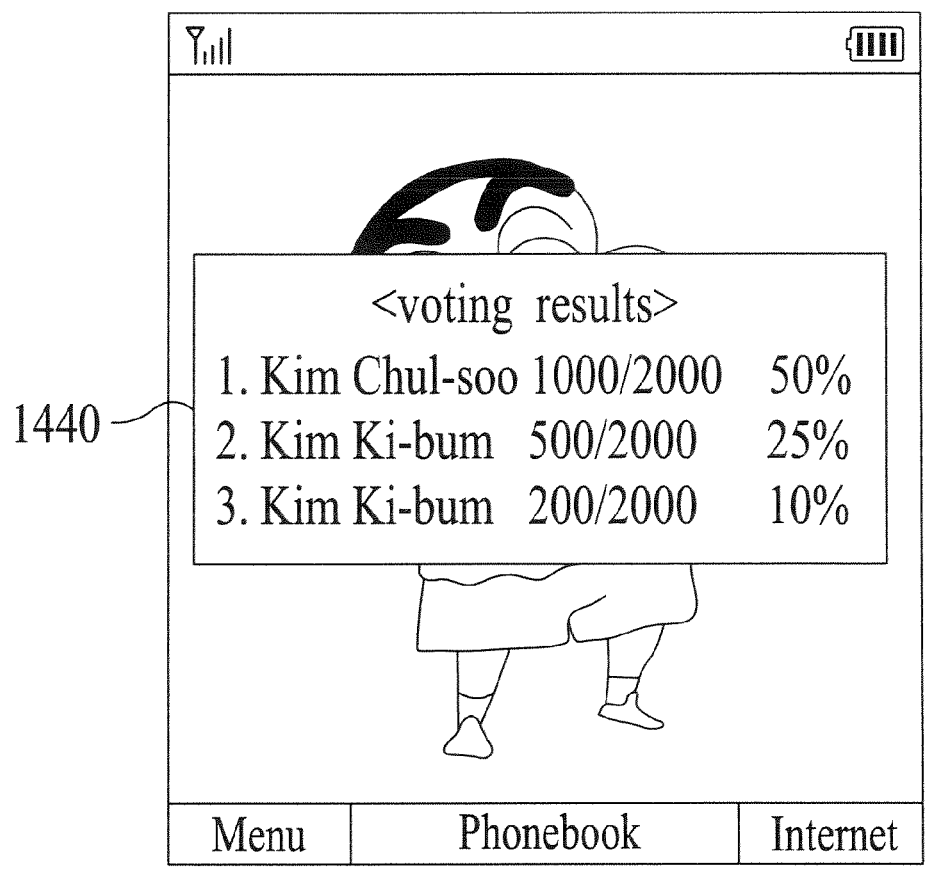

Referring to FIG. 14D, the mobile terminal 100 displays the result of the receipt of the scheduled interactive service 'Voting' via the wireless communication unit 110 from an interactive service server. If requested, the mobile terminal 100 displays a result 1440 of 'Voting' as shown in FIG. 14E.

Figure 15A:
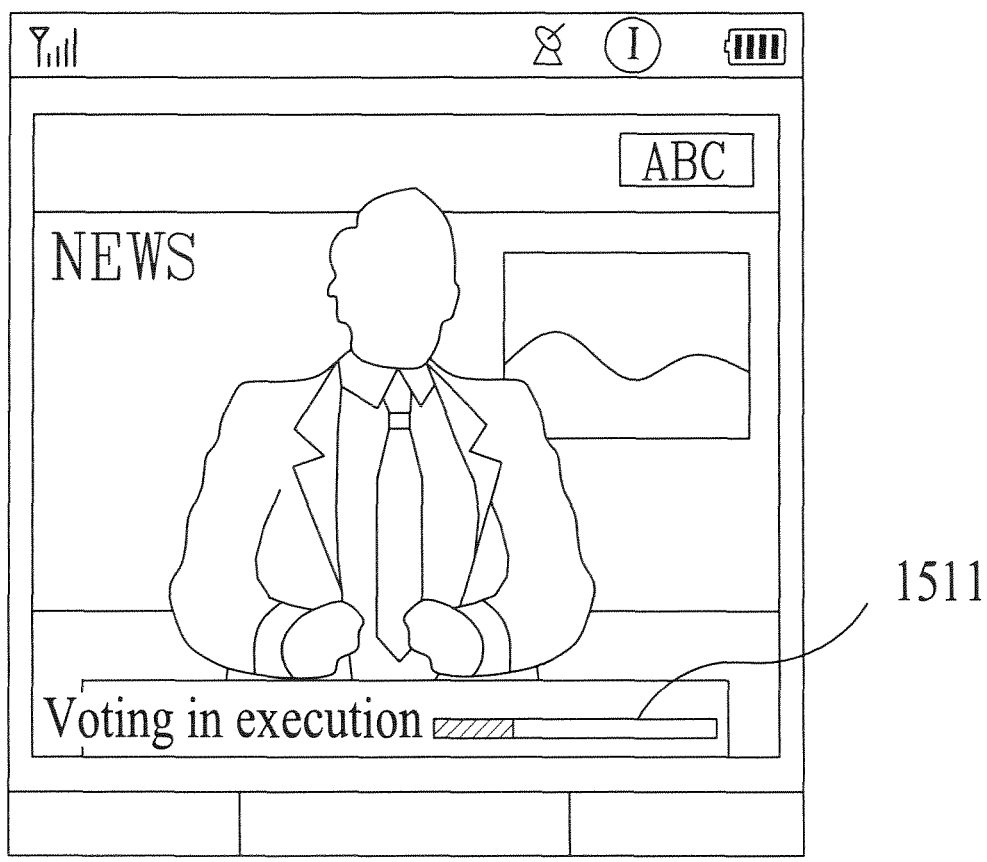
FIGS. 15A to 15C are diagrams of images for displaying a broadcast program associated with a scheduled interactive service in a mobile terminal according to one embodiment of the present invention.
Figure 15B:
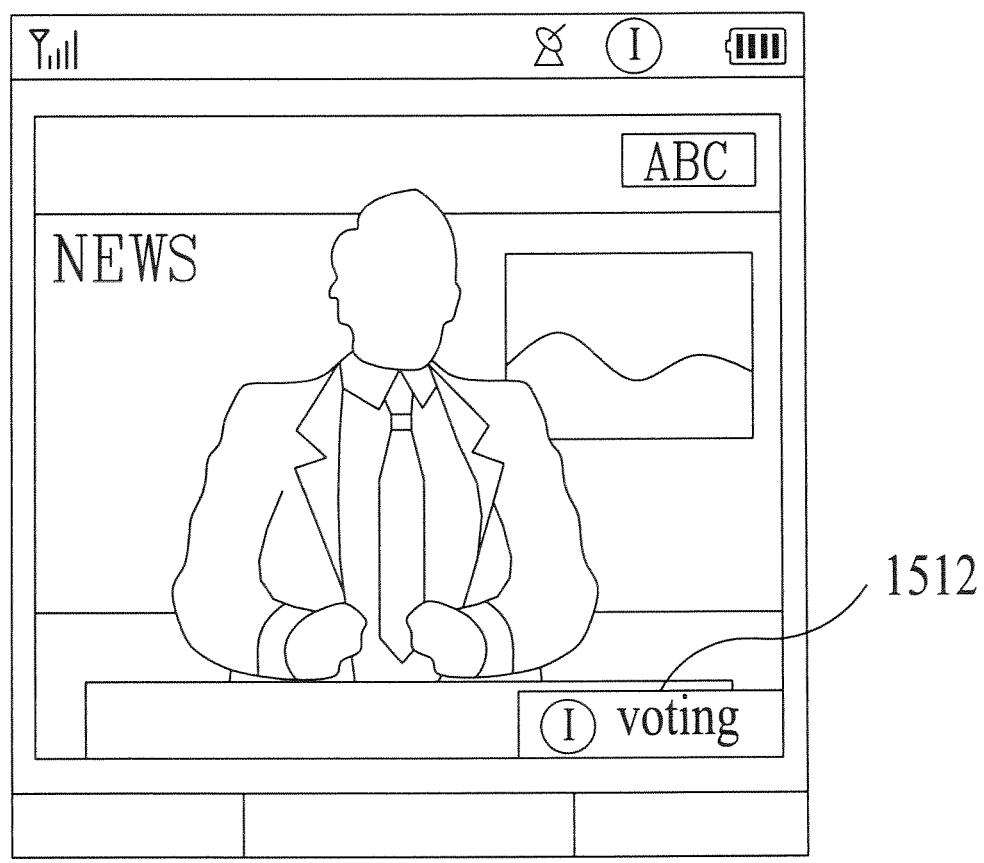
Figure 15C:
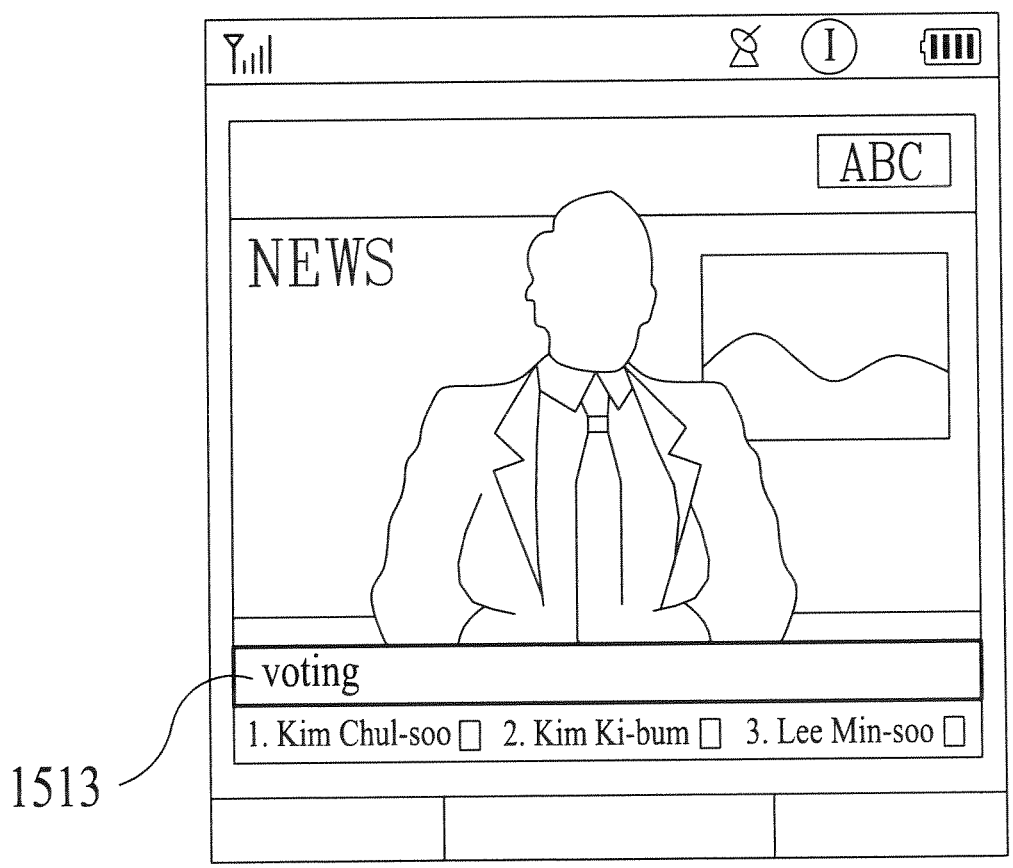

Referring again to FIG. 5, the terminal 100 displays the broadcast program associated with the scheduled interactive service (S529) as explained with reference to FIGS. 15A to 15C. FIG. 15A to FIG. 15C show a displayed broadcast program associated with a scheduled interactive service in a mobile terminal according to one embodiment of the present invention.

Referring to FIG. 15A, when a start time of a scheduled interactive service 'Voting' is reached, the mobile terminal 100 automatically executes 'Voting' while displaying a broadcast program associated with 'Voting'. In this case, a progress bar 1511 for 'Voting' can be displayed on a screen.

Subsequently, referring to FIG. 15B, when the start time of a scheduled interactive service 'Voting' is reached, the mobile terminal 100 displays an indicator 1512 indicating that 'Voting' is interconnected while displaying the associated broadcast program. If the indicator 1512 is selected, the mobile terminal 100 displays for providing an opinion for 'Voting' on a portion of the screen 1513 as shown in FIG. 15C.

FIGS. 16A to 16F show images for displaying a broadcast program associated with a scheduled interactive service according to one embodiment of the present invention. When a start time of a scheduled interactive service 'Voting' is reached while displaying a different broadcast program, the mobile terminal 100 displays a statement 1620 for querying whether to display a broadcast program associated with 'Voting'.

Figure 16A:
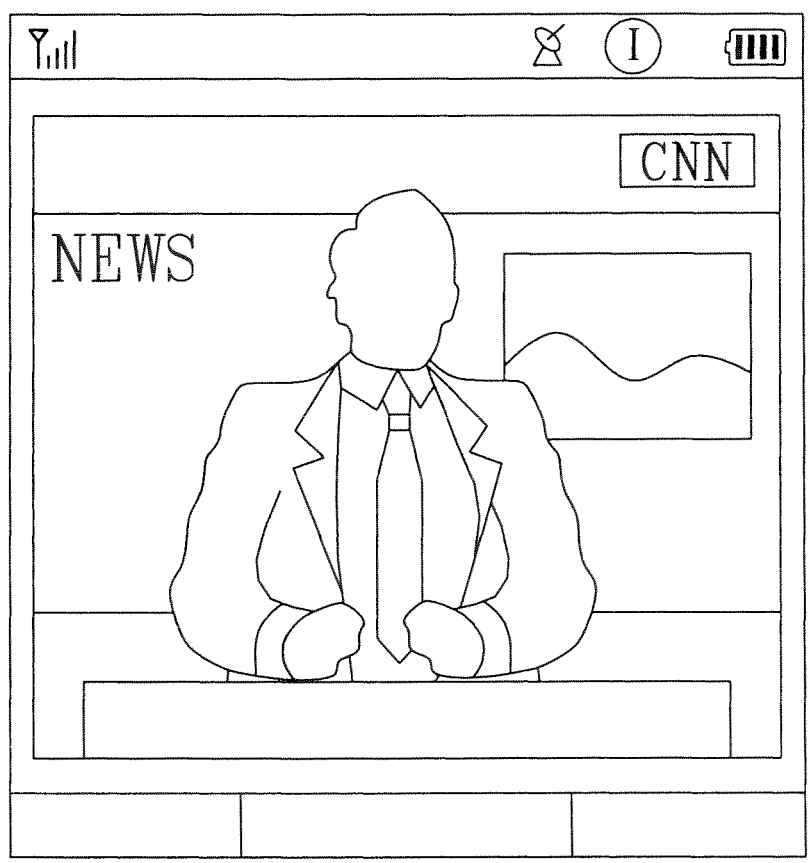
FIGS. 16A to 16F are diagrams of images for displaying a broadcast program associated with a scheduled interactive service in the course of outputting a broadcast in a mobile terminal according to one embodiment of the present invention.
Figure 16B:
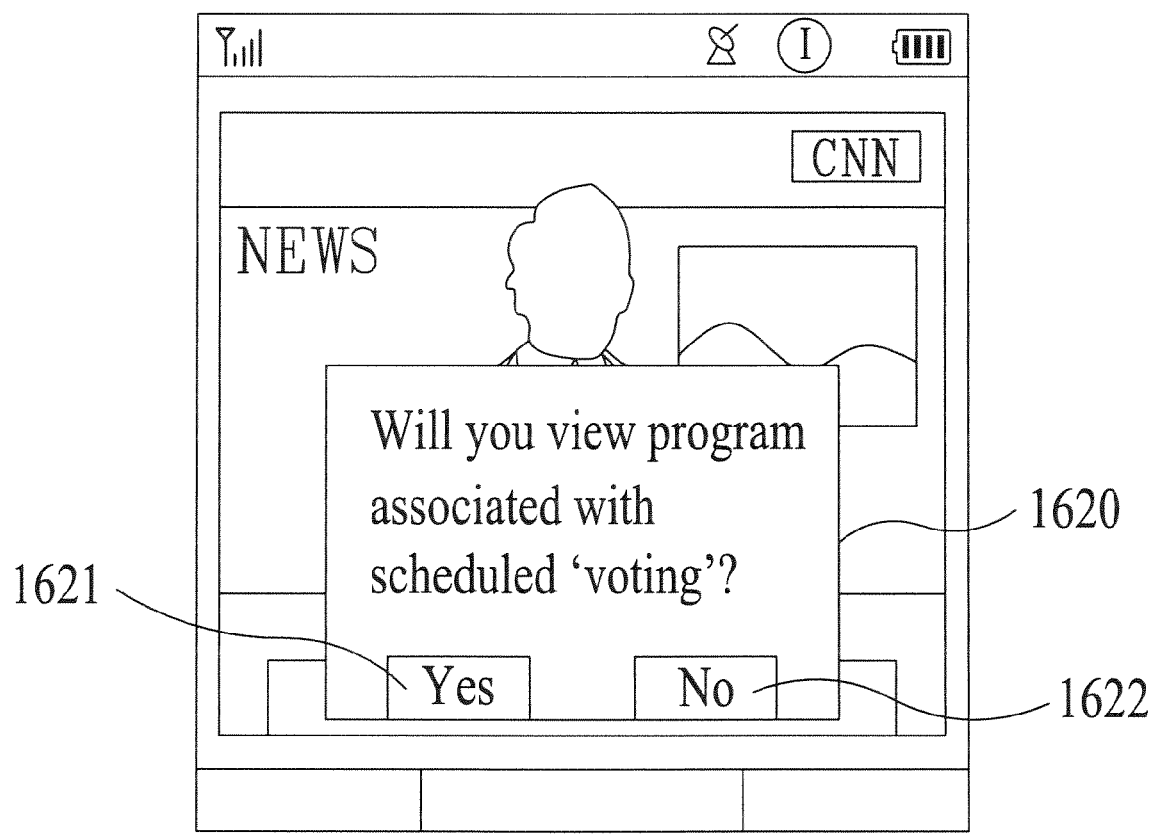
Figure 16C:
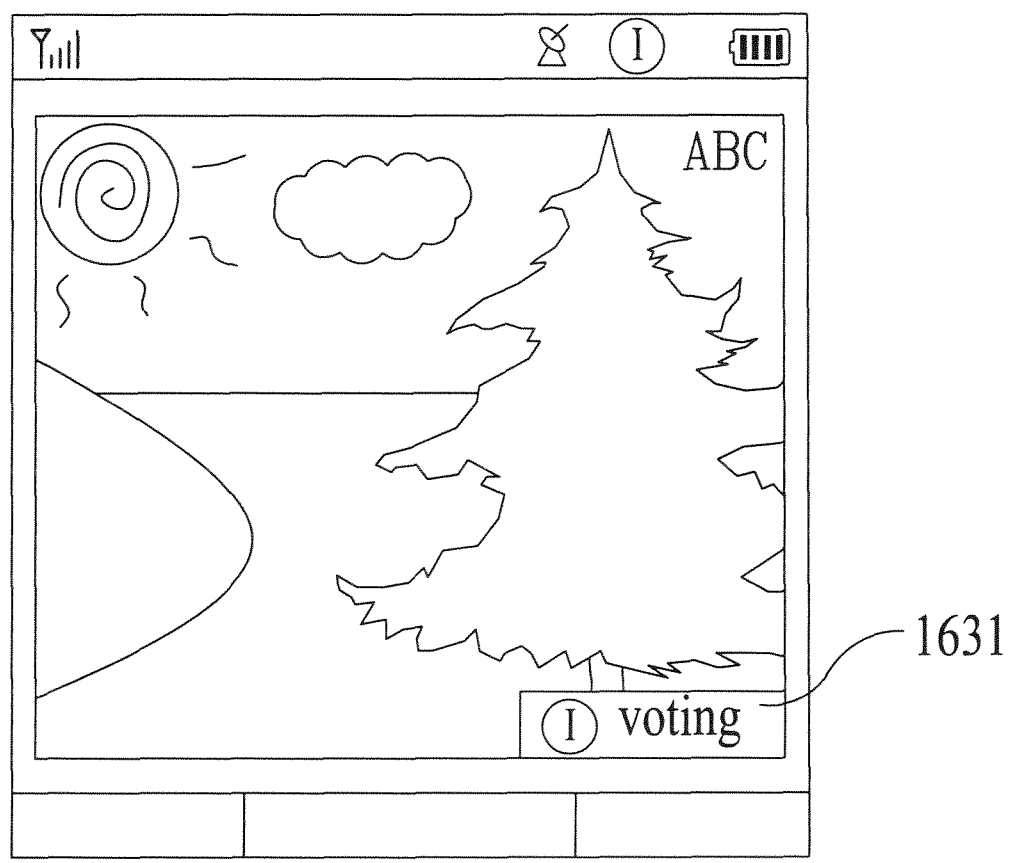

If 'Yes' 1621 is selected in FIG. 16B, the mobile terminal 100 displays an indicator 1631 indicating that 'Voting' is interconnected on a screen while displaying the broadcast program associated with the 'Voting' as shown in FIG. 16C.

Figure 16D:
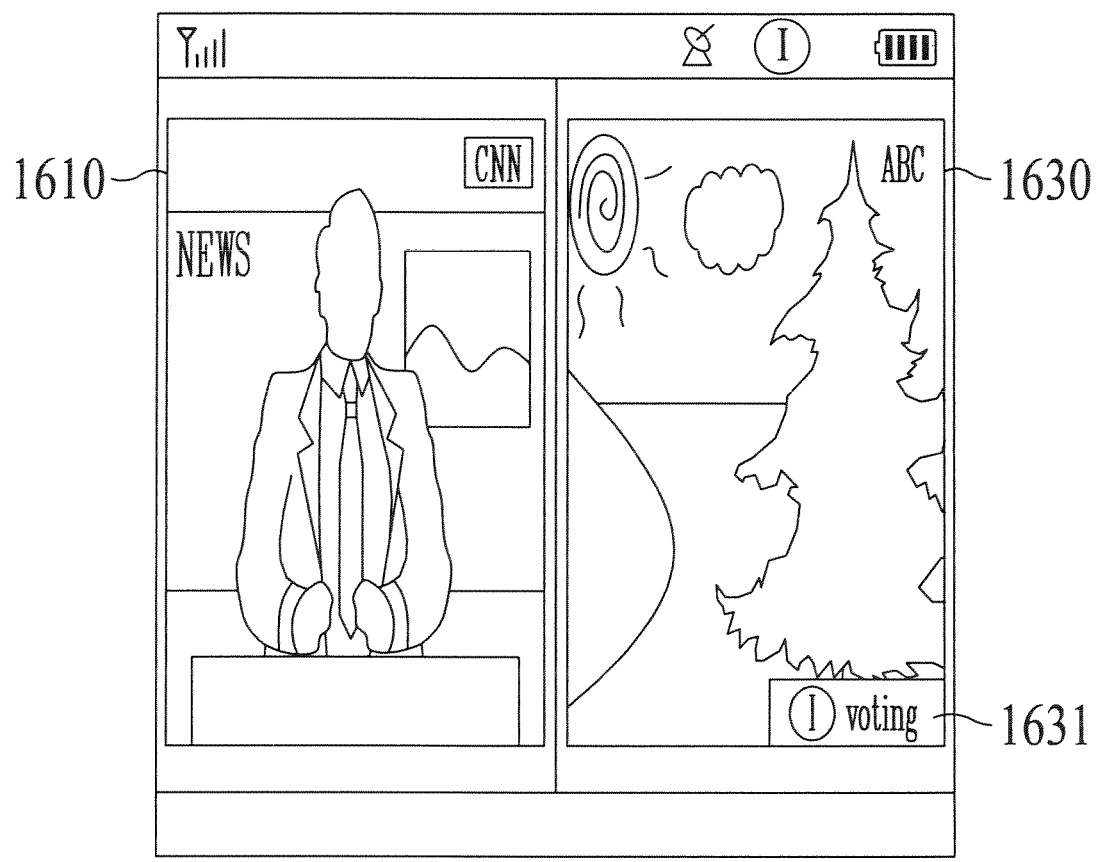

Alternatively, if 'Yes' 1621 is selected in FIG. 16B, the mobile terminal 100 displays the different broadcast program on a first portion 1610 and displays the broadcast program associated with 'Voting' on a second portion 1630, by dividing a screen into a plurality of portions as shown in FIG. 16D. In this case, the audio output module 152 provides the audio portion of either the different broadcast program or the broadcast program associated 'Voting' in according to a user's selection.

Figure 16E:
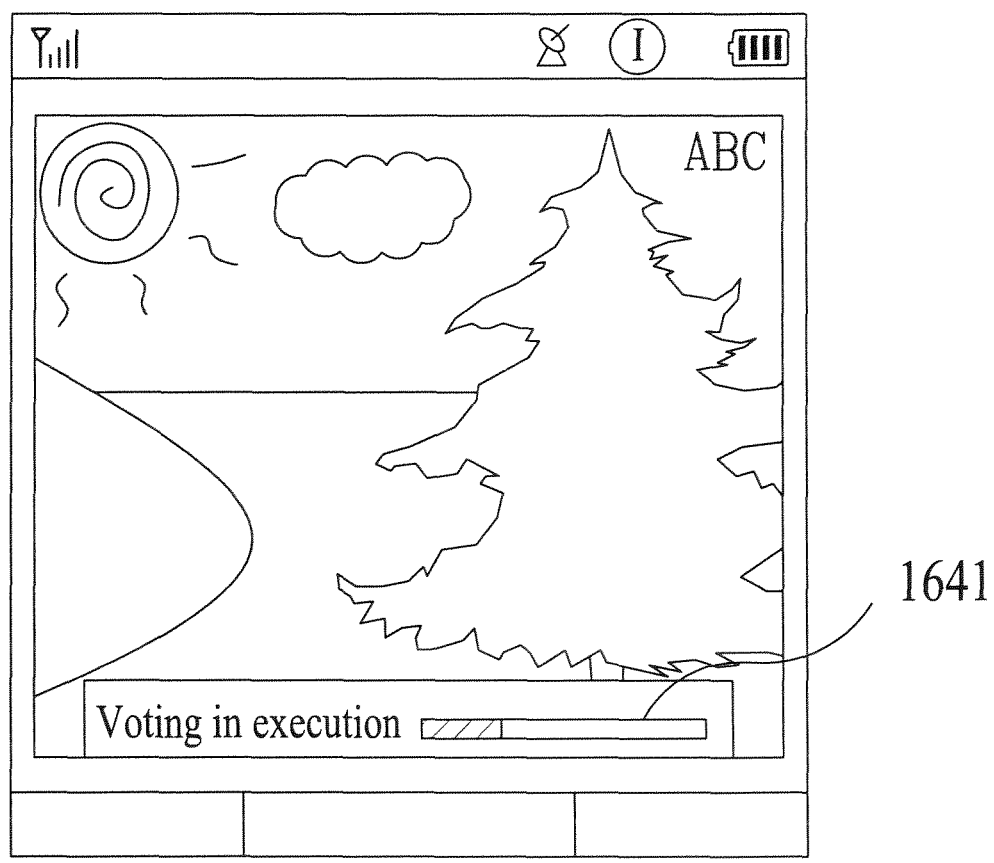

Alternatively, if 'Yes' 1621 is selected in FIG. 16B, the mobile terminal 100 automatically executes 'Voting' while outputting the broadcast program associated with 'Voting'. A progress bar 1641 of 'Voting' can be displayed on the screen as shown in FIG. 16E.

Figure 16F:
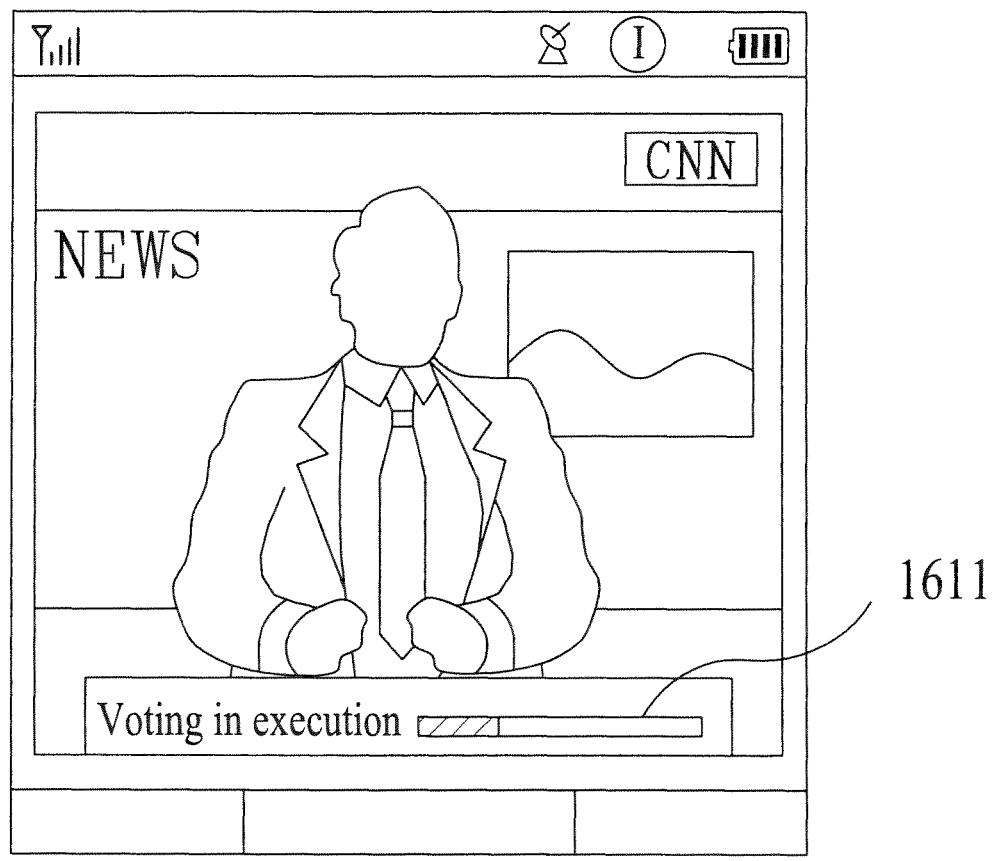

If 'No' 1622 is selected in FIG. 16B, the mobile terminal 100 displays a progress bar 1611 for 'Voting' while continuing to display the different broadcast program as shown in FIG. 16F.

If the start time of the scheduled interactive service 'Voting' is reached in while displaying the different broadcast program, the mobile terminal 100 automatically displays the broadcast program associated with 'Voting' without a separate manipulation.

According to one embodiment of the present invention, the mobile terminal and broadcast controlling method can be implemented in a program as computer-readable codes. The program may be recorded on computer-readable media including ROM, RAM, CD-ROM, magnetic tapes, floppy discs, optical data storage devices, and also include carrier-wave type implementations (e.g., transmission via Internet). The computer can include the controller 180 of the mobile terminal.

The present invention provides several advantages.

First, information on an interactive service associated with a broadcast program can be provided in advance of displaying the broadcast program.

Second, an interactive service associated with a broadcast program can be scheduled in advance prior to displaying the broadcast program.

Third, an interactive service associated with a broadcast program can be executed even if the broadcast program is not displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a wireless communication unit configured to:
receive interactive service information, a broadcast program, and broadcast information, wherein the received interactive service information is matched to broadcast organization information generated using the received broadcast information;

a display configured to:
   display a list of at least one received interactive service information,
   display sorting conditions in an index format, wherein the sorting conditions comprise at least a channel, a time zone, a category, a presence or non-presence of interactive service (IS), an IS type, a use frequency, a preferred channel order and an audience rating order, and
   display content of an interactive service associated with the received broadcast program;
an input unit configured to:
   receive selection of the interactive service using the received interactive service information,
   receive selection of at least one sorting condition, and
   receive an input for scheduling the selected interactive service; and
a controller configured to:
   schedule execution of the selected interactive service according to the received input,
   execute the scheduled interactive service when a start time of the scheduled interactive service is reached, and
   sort the displayed list of the at least one received interactive service information based on the selection of the at least one sorting condition.

2. The mobile terminal of claim 1, wherein the received interactive service information is included in the received broadcast information.

3. The mobile terminal of claim 1, wherein:
the interactive service information is received independent from the broadcast information; and
the controller is further configured to match the received interactive service information to the received broadcast information using at least broadcast identification information, channel identification information, or broadcast time information, each of which is included in the received interactive service information.

4. The mobile terminal of claim 1, wherein the received interactive service information comprises an interactive service type, a detailed description of the interactive service, interconnected broadcast program identification information, and broadcast time information related to an interconnected broadcast program.

5. The mobile terminal of claim 1, wherein:
the display is further configured to display the received broadcast program associated with the selected interactive service and the generated broadcast organization information in response to a generated control signal such that the displayed broadcast program is distinguishable from the displayed broadcast organization information.

6. The mobile terminal of claim 1, wherein the display is further configured to display the received interactive service information matched to the broadcast organization information when the scheduled interactive service is executed.

7. The mobile terminal of claim 1, wherein the display is further configured to display detailed information related to the selected interactive service in response to a generated control signal.

8. The mobile terminal of claim 1, wherein:
the display is further configured to display a list comprising the interactive service in response to a generated control signal; and
the input unit is further configured to receive the selection of the interactive service from the displayed list.

9. The mobile terminal of claim 1, further comprising an alarm configured to indicate results of executing the scheduled interactive service.

10. The mobile terminal of claim 1, further comprising an alarm configured to indicate a broadcast time change or a broadcast cancellation in response to a generated control signal when a broadcast time of the received broadcast program associated with the scheduled interactive service is changed or canceled.

11. The mobile terminal of claim 1, wherein the controller is further configured to reschedule execution of the selected interactive service to a changed broadcast time when a broadcast time of the received broadcast program associated with the scheduled interactive service is changed.

12. The mobile terminal of claim 1, wherein the display is further configured to display an indicator of the scheduled interactive service in response to a generated control signal while displaying the received broadcast program associated with the scheduled interactive service.

13. The mobile terminal of claim 12, wherein the display is further configured to:
display a different broadcast program while the scheduled interactive service is executed; and
display the broadcast program associated with the scheduled interactive service in response to the generated control signal when the different broadcast program is displayed.

14. The mobile terminal of claim 1, wherein the display is further configured to display a virtual broadcast program while receiving the selection of the interactive service.

15. The mobile terminal of claim 1, wherein the display is further configured to:
display the received broadcast program associated with the selected interactive service; and
display an indicator indicating that the selected interactive service is interconnected on a screen while displaying the received broadcast program.

16. The mobile terminal of claim 1, wherein the display is further configured to:
display a list of at least one scheduled interactive service; and
display at least one indicator which indicates a type of the listed at least one scheduled interactive service.

17. The mobile terminal of claim 1, wherein the IS type includes at least one of voting, survey, shopping, quiz and downloading contents.

18. A method of controlling a broadcast in a mobile terminal, the method comprising:
receiving interactive service information, a broadcast program, and broadcast information, wherein the received interactive service information is matched to broadcast organization information generated using the received broadcast information;
displaying the received interactive service information;
displaying content of an interactive service associated with the received broadcast program;
display sorting conditions in an index format, wherein the sorting conditions comprise at least a channel, a time zone, a category, a presence or non-presence of interactive service (IS), an IS type, a use frequency, a preferred channel order and an audience rating order;
receiving selection of the interactive service using the received interactive service information;
receiving an input for scheduling the selected interactive service;
receiving selection of at least one sorting condition;

scheduling execution of the selected interactive service according to the received input;

executing an alarm indicating the scheduled interactive service;

executing the scheduled interactive service when the a start time of the scheduled selected interactive service is reached; and sorting the displayed list of the at least one received interactive service information based on the selection of the at least one sorting condition.

19. The method of claim 18, wherein the received interactive service information is included in the received broadcast information.

20. The method of claim 18, further comprising:

receiving the interactive service information independently from the broadcast information; and matching the received interactive service information to the received broadcast information using at least broadcast identification information, channel identification information, or broadcast time information, each of which is included in the received interactive service information.

21. The method of claim 18, wherein the received interactive service information comprises an interactive service type, a detailed description of the interactive service, interconnected broadcast program identification information, and broadcast time information related to an interconnected broadcast program.

22. The method of claim 18, further comprising:

displaying an indicator of the scheduled interactive service while displaying the broadcast program associated with the scheduled interactive service.

23. The method of claim 22, further comprising:

displaying a different broadcast program while the scheduled interactive service is executed; and displaying the received broadcast program associated with the scheduled interactive service when the different broadcast program is displayed.

24. The method of claim 18, further comprising:

displaying the broadcast program associated with the executed interactive service.

25. The method of claim 18, further comprising:

displaying a virtual broadcast program while receiving the selection of the interactive service.

26. The method of claim 18, further comprising:

displaying the received broadcast program associated with the selected interactive service; and displaying an indicator indicating that the selected interactive service is interconnected on a screen while displaying the received broadcast program.

27. The method of claim 18, further comprising:

displaying a list of the at least one scheduled interactive service; and displaying at least one indicator which indicates a type of the listed at least one scheduled interactive service.

\* \* \* \* \*